US011307361B2

(12) United States Patent
Ruggles

(10) Patent No.: US 11,307,361 B2
(45) Date of Patent: Apr. 19, 2022

(54) METHODS FOR DETECTION OF CONTAMINANTS ON OPTICAL FIBER CONNECTORS

(71) Applicant: CORNING RESEARCH & DEVELOPMENT CORPORATION, Corning, NY (US)

(72) Inventor: Adam James Ruggles, South Corning, NY (US)

(73) Assignee: Corning Research & Development Corporation, Corning, NY (US)

(*) Notice: Subject to any disclaimer, the term of this patent is extended or adjusted under 35 U.S.C. 154(b) by 14 days.

(21) Appl. No.: 16/401,176

(22) Filed: May 2, 2019

(65) Prior Publication Data

US 2019/0339456 A1 Nov. 7, 2019

Related U.S. Application Data

(60) Provisional application No. 62/665,641, filed on May 2, 2018, provisional application No. 62/665,645, filed on May 2, 2018.

(51) Int. Cl.
*G02B 6/38* (2006.01)
*G06T 7/62* (2017.01)
(Continued)

(52) U.S. Cl.
CPC ............. *G02B 6/385* (2013.01); *G01N 21/94* (2013.01); *G01N 21/95607* (2013.01);
(Continued)

(58) Field of Classification Search
None
See application file for complete search history.

(56) References Cited

U.S. PATENT DOCUMENTS 5,179,419 A 1/1993 Palmquist et al.
7,162,073 B1 1/2007 Akgul et al.
(Continued)

FOREIGN PATENT DOCUMENTS

CA 2623130 A1 3/2007
JP 10267635 A 10/1998
JP 2009128252 A 6/2009

OTHER PUBLICATIONS

Shen et al; "End-View Image Processing Based Angle Alignment Techniques for Specialty Optical Fibers"; IEEE Photonics Journal, 2017, vol. 9(2) 9 Pages.
(Continued)

*Primary Examiner* — Jiangeng Sun
(74) *Attorney, Agent, or Firm* — Kapil U. Banakar

(57) ABSTRACT

Methods for detecting contaminants on optical fiber connectors incorporate statistically based routines that include processing of one or more digital images to dynamically determine fiber locations and boundaries, detect contamination in fiber locations, dynamically detect ferrule boundaries, detect contamination in ferrule locations, and collect resulting data. Sequential masking and detection permits detection of contaminants in a first region non-coincident with a first mask image, and in a second region non-coincident with a second mask image. Dynamic determination of locations and boundaries for structures such as fibers, ferrules, and pins or pinhole features address limitations associated with static determination of locations and boundaries for these structures. Specific routines or routines are provided for single- and multi-fiber connectors, including single fiber connectors having physical contact and angled physical contact polishes.

9 Claims, 54 Drawing Sheets

(51) Int. Cl.
  *G01N 21/94* (2006.01)
  *G01N 21/956* (2006.01)
  *G06T 5/20* (2006.01)
  *G06T 7/136* (2017.01)
  *G06T 7/12* (2017.01)
  *G06T 7/11* (2017.01)
  *G06T 7/13* (2017.01)
  *G06T 5/50* (2006.01)
  *G06T 7/00* (2017.01)

(52) U.S. Cl.
  CPC .................. *G06T 5/20* (2013.01); *G06T 5/50* (2013.01); *G06T 7/001* (2013.01); *G06T 7/11* (2017.01); *G06T 7/12* (2017.01); *G06T 7/13* (2017.01); *G06T 7/136* (2017.01); *G06T 7/62* (2017.01); *G06T 2207/20132* (2013.01); *G06T 2207/20216* (2013.01)

(56) References Cited

U.S. PATENT DOCUMENTS

| | | | | |
|---|---|---|---|---|
| 8,306,760 | B1 * | 11/2012 | Koudelka | G01B 9/02087 |
| | | | | 702/35 |
| 9,151,694 | B2 | 10/2015 | Wilson et al. | |
| 2004/0165181 | A1 | 8/2004 | Kume et al. | |
| 2004/0237331 | A1 * | 12/2004 | Sarfaty | G02B 6/25 |
| | | | | 34/218 |
| 2005/0206889 | A1 | 9/2005 | Koudelka et al. | |
| 2013/0138362 | A1 * | 5/2013 | Chen | G02B 6/385 |
| | | | | 702/40 |
| 2014/0124140 | A1 * | 5/2014 | Verheyden | G02B 6/245 |
| | | | | 156/350 |
| 2015/0117751 | A1 | 4/2015 | Theberge et al. | |
| 2015/0177097 | A1 | 6/2015 | Clarke et al. | |
| 2018/0100811 | A1 * | 4/2018 | Yu | H04N 7/181 |

OTHER PUBLICATIONS

International Searching Authority Invitation to Pay Additional Search Fees; PCT/US2019/029080; dated Sep. 5, 2019, 13 Pgs. Europeant Searching Authority.

* cited by examiner

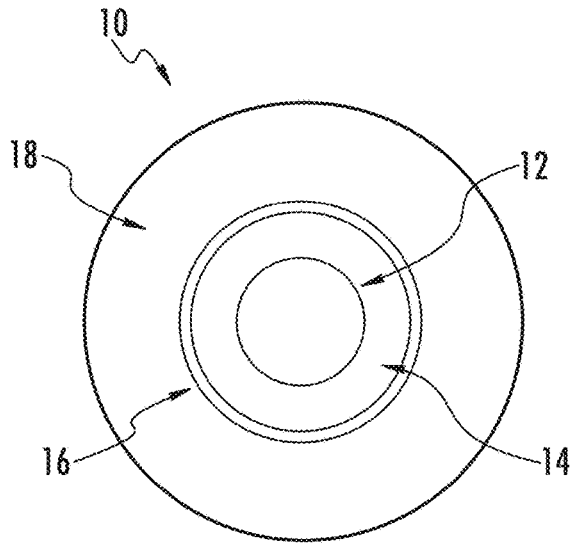
FIG. 1A
(RELATED ART)
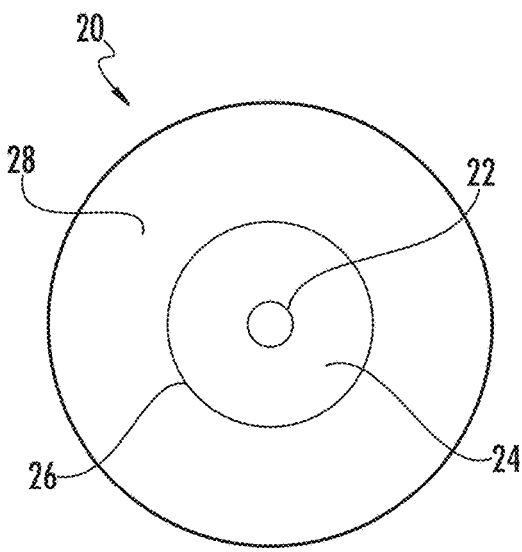
FIG. 1B
(RELATED ART)
| ZONE | MULTIMODE POLISHED CONNECTORS ||
| | SCRATCHES | DEFECTS |
|---|---|---|
| CORE | NO LIMIT ≤ 3 μm<br>NONE > 3 μm | 4 ≤ 5 μm<br>NONE > 5 μm |
| CLADDING | NO LIMIT ≤ 5 μm<br>NONE > 5 μm | NO LIMIT < 2 μm<br>5 FROM 2 μm TO 5 μm<br>NONE ≥ 5 μm |
| ADHESIVE | NO LIMIT | NO LIMIT |
| CONTACT | NO LIMIT | NONE ≥ 10 μm |
FIG. 2A
(RELATED ART)

| ZONE | SINGLEMODE POLISHED CONNECTORS ||
| --- | --- | --- |
| | SCRATCHES | DEFECTS |
| CORE | NONE | NONE |
| CLADDING | NO LIMIT ≤ 3 μm<br>NONE > 3 μm | NO LIMIT < 2 μm<br>5 FROM 2 μm TO 5 μm<br>NONE ≥ 5 μm |
| ADHESIVE | NO LIMIT | NO LIMIT |
| CONTACT | NO LIMIT | NONE ≥ 10 μm |
FIG. 2B
(RELATED ART)
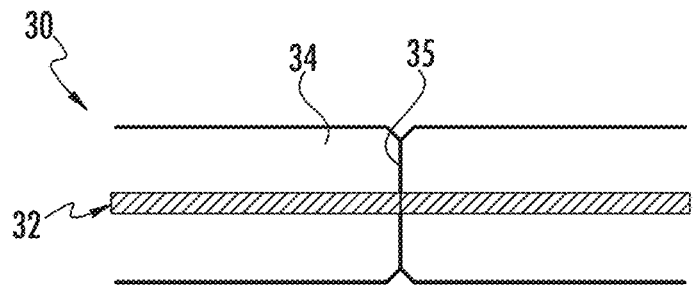
FIG. 3
(RELATED ART)
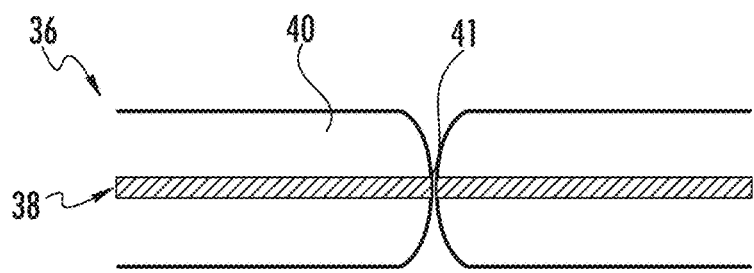
FIG. 4
(RELATED ART)
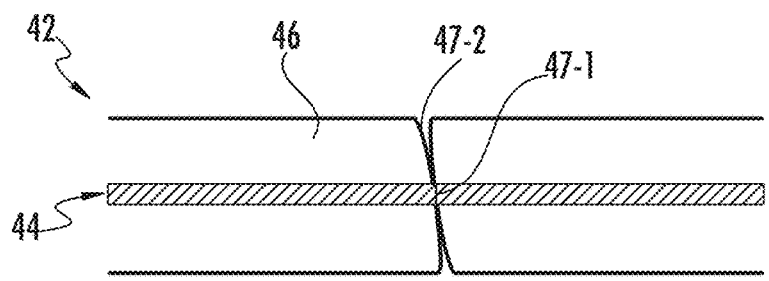
FIG. 5
(RELATED ART)

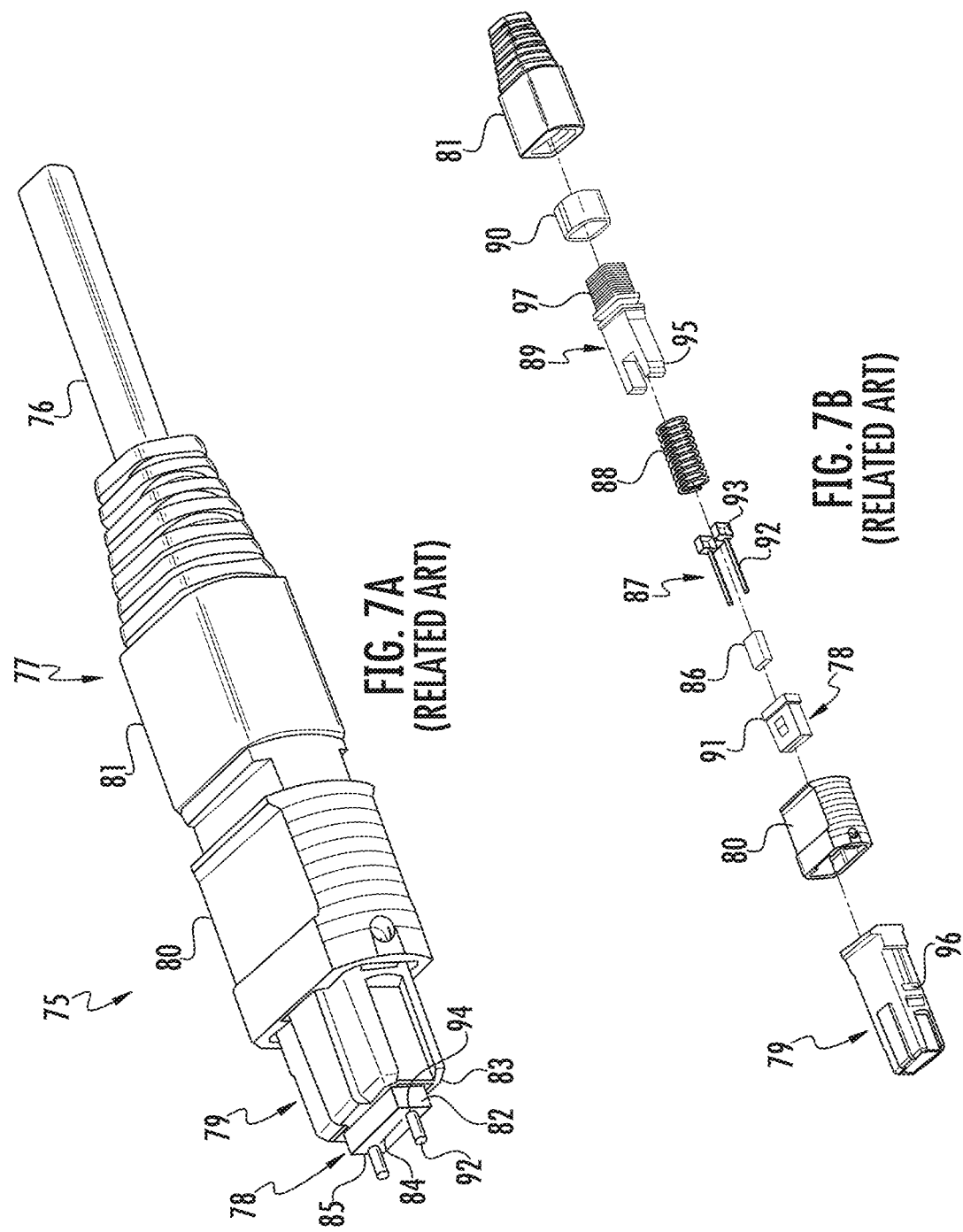

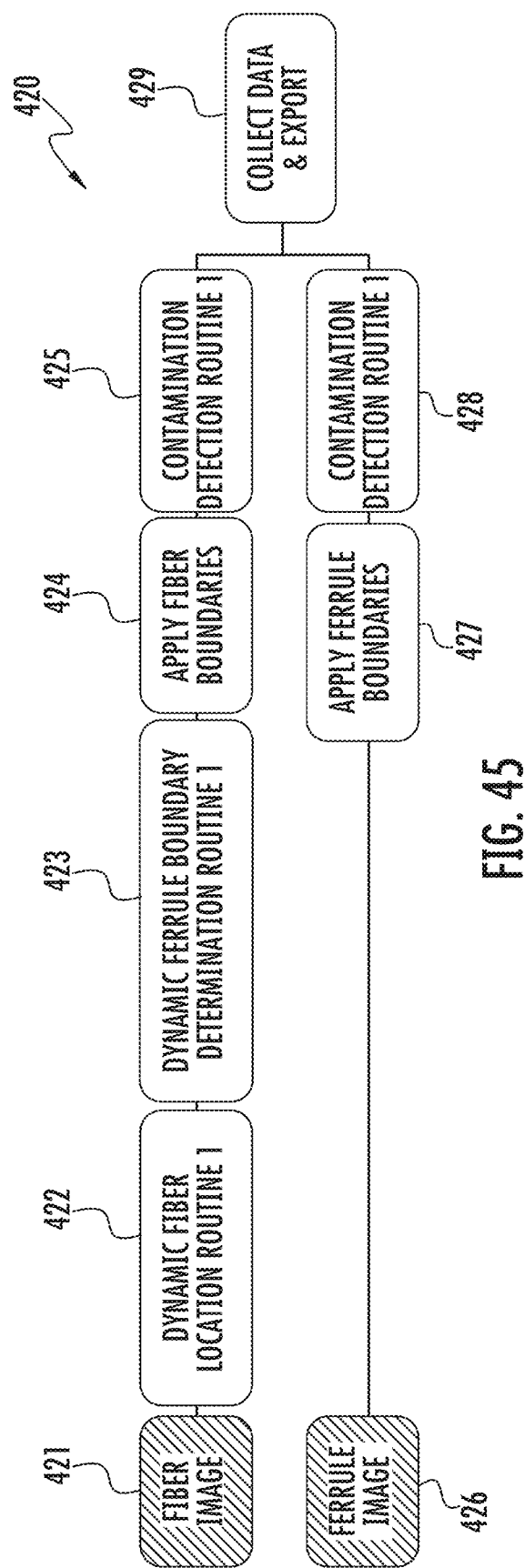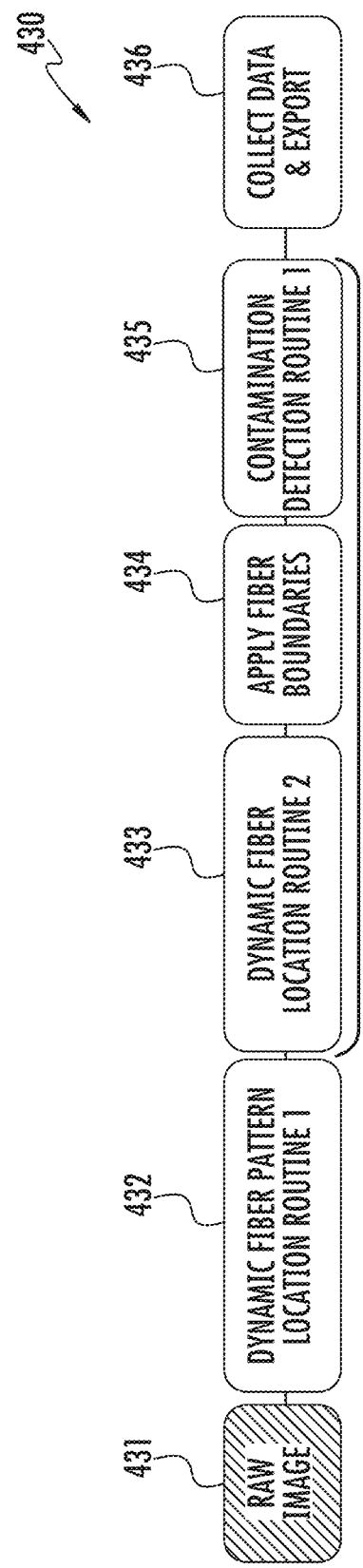

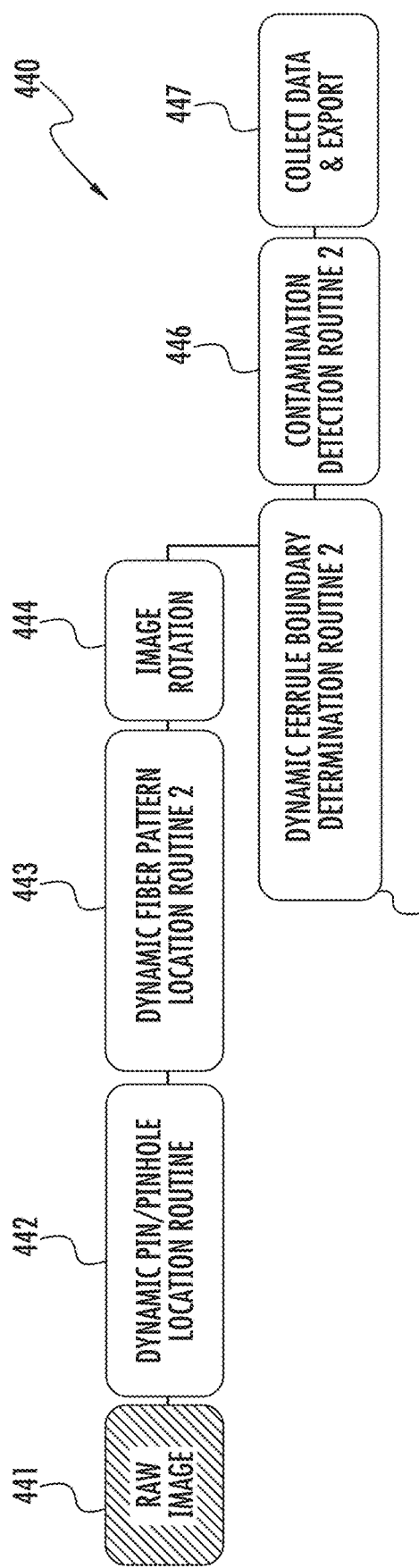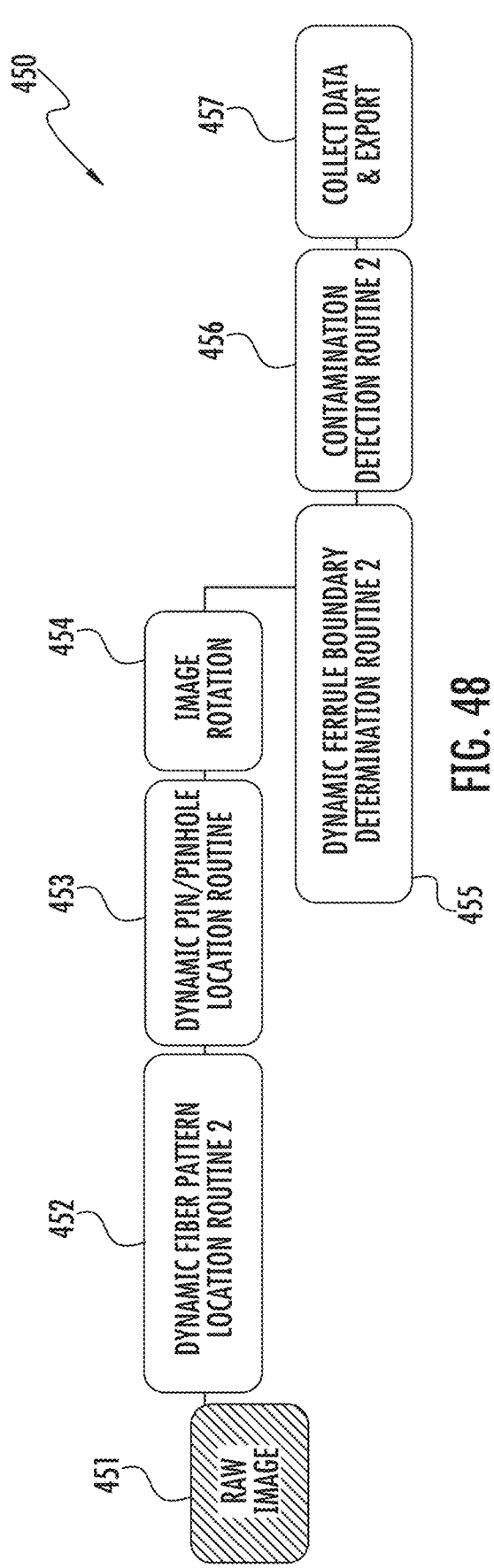

METHODS FOR DETECTION OF CONTAMINANTS ON OPTICAL FIBER CONNECTORS

PRIORITY APPLICATIONS

This application claims the benefit of priority of U.S. Provisional Application No. 62/665,645, filed on May 2, 2018, and U.S. Provisional Application No. 62/665,641, filed on May 2, 2018. The contents of these applications are relied upon and incorporated herein by reference in their entirety.

BACKGROUND

This disclosure relates generally to detection of contaminants on optical fiber connectors, and more specifically to methods for processing digital microscopy images of ends of optical fiber connectors to enhance confidence in detection of contaminants thereon.

Optical fibers are useful in a wide variety of applications, including the telecommunications industry for voice, video, and data transmissions. Benefits of optical fiber include extremely wide bandwidth and low noise operation. In a telecommunications system that uses optical fibers, there are typically many locations where fiber optic cables carrying the optical fibers connect to equipment or other fiber optic cables. To conveniently provide these connections, fiber optic connectors are often provided on the ends of fiber optic cables.

A fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), the optical fiber in the ferrule is positioned in a known, fixed location relative to the housing. This allows an optical connection to be established when the optical fiber is aligned with another optical fiber in the mating connector.

At interconnections between fiber optic connectors, light exiting one or more optical fibers of a first fiber optic connector (of a first fiber optic cable) is introduced into core of one or more optical fibers within an adjacent, second fiber optic connector (of a second fiber optic cable). The light travels in respective cores of the optical fibers. If two optical fiber cores at an interconnection are misaligned, then transmission of a significant fraction of an optical signal from the core of the first optical fiber to the core of the second optical fiber may be inhibited, resulting in signal degradation at the interconnection. Furthermore, and more salient to the present disclosure, if contamination such as one or more pieces of debris is present on an end face of either of the fiber optic connectors that terminate the optical fibers, then transmission of optical signals from the core of the first optical fiber to the core of the second optical fiber optic may be inhibited. Unlike conductive wire cable connectors, dust, dirt, and other contaminants are a particular problem in optical connections because they interfere with the passage of light from one fiber to another, and signals borne by the light may be poorly transmitted, or not transmitted at all. Fiber optic connectors must therefore be kept clean to ensure long life and to minimize transmission loss and optical return loss at connection points.

The degree of inhibition (or attenuation) of signal transmission may depend on the distance of the closest particle from the core, particle size, and the number of particles. Even a single dust particle caught in the core area between two connectors may result in significant or even catastrophic degradation of signal transmission (e.g., increased insertion loss), depending on particle size. Dust particles as small as 1 micrometer ($\mu m$) in diameter at a connection point can significantly degrade performance, whereas particles at least 8 $\mu m$ in diameter at a connection point can cause a complete failure of an optical system.

The IEC 61300-3-35 ("Basic Test and Measurement Procedures Standard for Fiber Optic Interconnecting Devices and Passive Components") describes methods for quantitatively assessing the end face quality of a polished fiber optic connector, and contains specific cleanliness grading criteria to assess pass or fail certification for inspection of a fiber end face. Three basic measurements useful for assessing defects such as scratches or contamination include the location (e.g., distance from the core), size, and quantity. When defects are located in a fiber core, their influence on degradation of optical performance becomes more significant. The criteria in the IEC 61300-3-35 standard are based on the size and quantity scratches and other defects found in four different zones of a connector end face that are defined by the standard—namely, a core, cladding, adhesive, and contact zone. The foregoing four zones are a series of concentric circles that identify areas of interest on a connector end face, with the adhesive zone typically embodying epoxy or another adhesive to secure a glass optical fiber within the bore of a ceramic ferrule on which the contact zone is formed. FIG. 1A illustrates an end face of a multi-mode fiber connector 10 showing IEC 61300-3-35 zones, namely the fiber core zone 12 (e.g., having a diameter range of 0-66 $\mu m$), the cladding zone 14 (e.g., having a diameter range of 66-120 $\mu m$), the adhesive zone 16 (e.g., having a diameter range of 120-135 $\mu m$), and the contact zone 18 (e.g., having a diameter range of 135-250 $\mu m$). FIG. 1B depicts an end face of a single-mode fiber connector 20 showing the fiber core zone 22 (e.g., having a diameter range of 0-25 $\mu m$), the cladding zone 24 (e.g., having a diameter range of 25-120 $\mu m$), the adhesive zone 26 (e.g., having a diameter range of 120-135 $\mu m$), and the contact zone 28 (e.g., having a diameter range of 135-250 $\mu m$. Given the difference in core size between single-mode and multi-mode optical fibers, IEC 61300-3-35 criteria vary based on connector type and fiber size. For example, FIG. 2A provides a table identifying certification thresholds for presence of scratches and defects in different zones of a multi-mode fiber, while FIG. 2B provides a table identifying corresponding thresholds in different zones of a single-mode fiber.

Assessment of cleanliness for particulate contamination may be done before and after an optical component undergoes a cleaning process by an indirect method or a direct method. An indirect method involves transfer or extraction of particles from a surface under investigation (e.g., by detachment with a fluid medium, stripping, or tape lift), followed by evaluation with an analytical system. A direct method involves examination of surfaces without extraction or transfer of particles, such as by optical microscopy. Comparative advantages of direct analysis include simplicity and avoidance of sampling losses; however, challenges associated with direct analysis include distinguishing particles from a substrate for particles exhibiting low contrast, and the impracticality of identifying contaminants (e.g., particles) on surfaces with complex geometries.

Detection of contaminants on optical fiber connectors may also be complicated by the type (i.e., shape) of polish applied to the respective fiber and ferrule ends. Two main performance attributes influenced by fiber polish are insertion loss (referring to light lost at a connection due to misaligned cores and air gaps at connections) and back reflection (referring to light being reflected back toward the source, due to different refractive qualities of glass and air). The three main types of polishes that are currently in use include physical contact (PC), ultra physical contact (UPC), and angled physical contact (APC). FIG. 3 is a schematic cross-sectional view of an interconnection between two optical fiber connectors 30 each including an optical fiber 32 within a ferrule 34, and each being PC polished at an end 35 thereof with a flat profile. Such polishing causes optical fibers 32 of the respective connectors 30 as well as portions of the ferrules 34 of the respective connectors 30 to be in contact with one another. FIG. 4 is a schematic cross-sectional view of an interconnection between two optical fiber connectors 36 each including an optical fiber 38 within a ferrule 40, and each being UPC polished at an end 41 thereof with a steeply rounded profile. Such polishing causes optical fibers 38 of the respective connectors 36 to be in contact with one another, with little to no contact being made between portions of the ferrules 40 of the respective connectors 36. FIG. 5 is a schematic cross-sectional view of an interconnection between two optical fiber connectors 42, each including an optical fiber 44 within a ferule 46, and each being APC polished at an end thereof. Such polishing forms a fiber end portion 47-1 angled eight degrees from perpendicular (i.e., to reduce back reflection) and forms a ferrule end portion 47-2 that may be rounded, with an end of each connector 42 being asymmetric. The existence of different types of polishes increases the difficulty of adopting a single method for accurately and reliably identifying contaminants on end faces of optical fiber connectors by optical detection. APC polished connectors (e.g., APC polished LC- or SC-type single fiber connectors) are problematic, since the angled surface complicates identification of fiber/ferrule boundaries.

Separate from complications created by the existence of different polishes, contaminant detection is further complicated by the existence of different connector formats (e.g., single fiber and multi-fiber). Although commercially available software purports to inspect and quantify contamination on exposed fiber ends of multi-fiber connectors, to the same software does not inspect and quantify contamination on the ferrule surface of multi-fiber connectors.

Various types of single fiber and multi-fiber connector are known, with examples such as LC- and SC-type single fiber connectors and multi-fiber push-on (MPO)-type connectors being in widespread use. An exemplary SC-type single fiber connector 50 is shown in FIGS. 6A and 6B, and an exemplary MPO-type connector 75 is shown in FIGS. 7A and 7B.

As shown in FIGS. 6A and 6B, the connector 50 includes a ferrule 51, a ferrule holder 52 from which the ferrule 51 extends, a housing 53 having a cavity 60 in which the ferrule holder 52 is received, and a connector body 54 configured to retain the ferrule holder 52 within the housing 53. The ferrule 51 includes a small diameter bore section 55 (or "micro-hole") in which an optical fiber 56 is secured using an adhesive material such as epoxy. The ferrule holder 52 includes a ferrule holder bore 57 from which the ferrule 51 extends. In particular, a rear portion 58 of the ferrule 51 is received in the ferrule holder bore 57 defined in (at least) a first portion 59 of the ferrule holder 52, and is secured therein in a known manner. The ferrule holder 52 is biased to a forward position within the cavity 60 of the housing 53 by a spring 61, which extends over a second portion 62 of the ferrule holder 52 having a reduced width compared to the first portion 59. A rear portion of the housing 53 includes cut-outs or slots 63 on opposing surfaces to define a split shroud. The connector body 54 is generally tubular in shape with a medial shoulder 64 arranged between different diameter portions. Protrusions 65 (which may embody tabs) of the connector body 54 are configured to be snapped into the slots 63 of the housing 53 and retained therein by locking tabs 66 proximate to a leading edge of each slot 63.

When the connector 50 is assembled as shown in FIG. 6A, a front end 67 of the ferrule 51 projects beyond a front end 68 of the housing 53. The front end 67 of the ferrule 51 presents the optical fiber 56 (shown in FIG. 6B) for optical coupling with a mating component (e.g., another fiber optic connector; not shown), with the ferrule 51 serving to generally align the optical fiber 56 in an axial direction along a longitudinal axis 70. The housing 53 includes a generally rectangular cross-sectional shape perpendicular to the longitudinal axis 70, with two adjacent non-beveled corners 72 and two adjacent beveled corners 74 embodying transitions between four outer faces of the housing 53 proximate to the front end 68 of the housing 53.

FIGS. 7A and 7B show the MPO-type connector 75 installed on a fiber optic cable 76 to form a fiber optic cable assembly 77. The MPO-type connector 75 includes a ferrule 78, a housing 79 received over the ferrule 78, a slider or slide lock 80 received over the housing 79, and a boot 81 received over the fiber optic cable 76. The ferrule 78 is spring-biased within the housing 79 so that a front portion 82 of the ferrule 78 extends beyond a front end 83 of the housing 79. Multiple optical fibers (not shown) carried by the fiber optic cable 76 extend through bores 84 (also referred to as micro-holes) defined in the ferrule 78 before terminating at or near a front end face 85 of the ferrule 78. The optical fibers are secured within the ferrule 78 as described above, such as by using an adhesive material (e.g., epoxy). The optical fibers can be presented for optical coupling with optical fibers of a mating component (e.g., another fiber optic connector; not shown) when the housing 79 is inserted into an adapter, receptacle, or the like.

As shown in FIG. 7B, the MPO-type connector 75 also includes a ferrule boot 86, guide pin assembly 87, spring 88, crimp body 89, and crimp ring 90. Optical fibers extend through an aperture defined through the ferrule boot 86. The guide pin assembly 87 includes a pair of guide pins 92 extending from a pin keeper 93. When the connector 75 is assembled, the pin keeper 93 is positioned against a back surface of the ferrule 78, and the guide pins 92 extend through pin holes 94 (shown in FIG. 7A) provided in the ferrule 78 so as to project beyond the front end face 85 of the ferrule 78. Both the ferrule 78 and guide pin assembly 87 are biased to a forward position relative to the housing 79 by the spring 88, which is positioned between the pin keeper 93 and a portion of the crimp body 89. The crimp body 89 includes latching arms 95 that engage recesses 96 in the housing 79. The rear portion 91 of the ferrule 78 defines a flange that interacts with a shoulder or stop formed within the housing 79 for retention of the rear portion 91 of the ferrule 78 in the housing 79. In a manner not shown in the figures, strength members (e.g., aramid yarn) from the fiber optic cable 76 may be positioned over an end portion 97 of the crimp body 89 that projects rearwardly from the housing 79, and the strength members are secured to the end portion 97 by deformation of the crimp ring 90. The boot 81 covers this region, as shown in FIG. 7A, and provides strain relief for optical fibers emanating from the fiber optic cable 76 by limiting the extent to which the connector 75 can bend relative to the fiber optic cable 76.

The cleanliness of fiber optic connectors can be improved using cleaning equipment. In order to assess the cleaning performance of cleaning equipment, various image-based microscope inspection systems from commercial vendors can be used. While the hardware of commercially available microscope inspection systems may be sufficient to visualize contamination, the native analysis software accompanying the microscope inspection systems have shortcomings that can result in numerous deficiencies, including: (a) misidentification or inaccurate identification of a fiber within an image; (b) limited analysis regions; (c) misidentification of region of a ferrule surface as contamination; (d) failure to identify contamination present on a connector; and (e) incomplete contaminant size determination. These deficiencies can result in inaccurate data concerning contamination size and quantity, thereby hindering the assessment of cleaning performance of cleaning equipment. Thus, there is a need for improved methods (e.g., implementable in software) for detecting contaminants on optical fiber connectors.

SUMMARY

Aspects of the present disclosure provide methods for detecting contaminants on optical fiber connectors, employing processing of digital microscopy images of ends of optical fiber connectors to address deficiencies observed with commercially available software for use with optical inspection systems. In at least certain embodiments, methods incorporating statistically based routines include processing of one or more digital images to dynamically determine fiber locations and boundaries, detect contamination in fiber locations, dynamically detect ferrule boundaries, detect contamination in ferrule locations, and collect resulting data. Such methods enable significant improvement in contaminant detection, boundary identification, and contaminant sizing assessment relative to commercially available software. Dynamic determination of locations and boundaries for structures such as fibers, ferrules, and (if provided) pins or pinhole features may address limitations associated with static determination of locations and boundaries for these structures, attributable to slight variations in imaged position of such structures. This may be due to factors such as connector manufacturing tolerances, optical imaging hardware tolerances or vibration, and/or presence of contamination proximate to connector region boundaries. Specific routines or routines may be utilized for different types of connectors, such as single fiber (e.g., LC or SC) connectors versus multi-fiber (e.g., MPO) connectors, and for different polishes (e.g., PC, UPC, or APC).

In an embodiment of the disclosure, a method is provided for identifying contaminants from a digital image of an end of an optical fiber connector that includes one or more optical fibers surrounded by a ferrule, wherein each of the one or more optical fibers includes a respective fiber core and associated fiber cladding. The method comprises defining a first mask image representing a first portion of the end of the optical fiber connector, and detecting contaminants in at least one first region of the digital image, wherein the at least one first region is non-coincident with the first mask image. The method further comprises defining a second mask image representing a second portion of the end of the optical fiber connector, and detecting contaminants in at least one second region of the digital image. According to this embodiment, the at least one second region is non-coincident with the second mask image.

In another embodiment of the disclosure, a method is provided for identifying contaminants from a digital image of an end of an optical fiber connector that includes one or more optical fibers surrounded by a ferrule, wherein each of the one or more optical fibers includes a respective fiber core and associated fiber cladding. The method employs multiple "kernels" (i.e., small matrices) of different sizes. The method comprises, for each kernel size of a plurality of different kernel sizes, performing two-dimensional ensemble averaging and utilizing a result of the two-dimensional ensemble averaging to normalize the digital image to yield an ensemble normalized image. The method further comprises, for each kernel size of the plurality of different kernel sizes, performing two-dimensional median averaging and utilizing a result of the two-dimensional median averaging to normalize the digital image to yield a median normalized image. The method further comprises applying a first universal threshold value across each ensemble normalized image to generate a thresholded ensemble normalized image with a binary representation of contaminants relative to areas devoid of contaminants. The method further comprises applying a second universal threshold value across each median normalized image to generate a thresholded median normalized image with a binary representation of contaminants relative to areas devoid of contaminants. The method further comprises, for each kernel size of the plurality of different kernel sizes, summing the binary representation of contaminants of the thresholded ensemble normalized image and the binary representation of contaminants of the thresholded median normalized image to yield a contamination probability image including a summation of contamination probability. The method further comprises, for each kernel size of the plurality of different kernel sizes, closing boundaries of any continuous contaminant areas that are present in the contamination probability image adjacent to inter-regional edges and/or external edges of the optical fiber connector, and filling any continuous contaminant areas that are present in the contamination probability image. The method further comprises identifying at least one of (i) number of closed and filled continuous contaminant areas, (ii) location of each closed and filled continuous contaminant area, and (iii) size of each closed and filled continuous contaminant area, present in the summed threshold normalized image of any one or more kernel sizes of the plurality of different kernel sizes.

In another embodiment of the disclosure, a method is provided for determining location of a fiber core from a digital image of at least a portion of an end of an optical fiber connector in which the fiber core is surrounded by fiber cladding and by a ferrule having a convex end surface. The method comprises generating a first binary image derived from the digital image of the end of the optical fiber, followed by determining a centroid position of the first binary image. The method further comprises extracting a subregion of the digital image substantially centered on the centroid position to generate a subregion image, with the subregion containing the fiber core. The method further comprises calculating two dimensional spatial gradient magnitude values of the subregion image to identify high intensity boundaries around (i) the fiber cladding and (ii) any contaminants optionally present on the fiber core and/or fiber cladding. The method further comprises applying a self-determining threshold from the two dimensional spatial gradient magnitude values to generate a second binary image including rings corresponding to at least some of the high intensity boundaries. The method further comprises filling the rings of the second binary image to yield filled rings, and comparing the filled rings to identify a position of the fiber cladding. The method further comprises centering a solid subregion of a new, third binary image to the position of the fiber cladding, wherein the solid subregion is matched in shape to the subregion of the digital image. The method further comprises generating a summation of common non-zero pixel values and corresponding pixel locations, and extracting maximum summation values and corresponding pixel locations. The method further comprises identifying location of the fiber core from pixel locations corresponding to the maximum summation values.

In another embodiment of the disclosure, a method is provided for determining a radius of a ferrule outer circular boundary from a digital image of at least a portion of an end of an optical fiber connector in which a fiber core is surrounded by fiber cladding and by a ferrule having a convex end surface. The method comprises calculating two dimensional spatial gradient magnitude values of the digital image to identify an outer high intensity boundary. The method further comprises extracting a radial profile from a center location of the fiber core to the outer high intensity boundary at each angular interval of a plurality of angular intervals. The method further comprises, for each radial profile, identifying a location of maximum two dimensional spatial gradient magnitude, and identifying a distance from said location to the center location to provide an estimated ferrule radius value. The method further comprises statistically filtering the estimated ferrule radius values to exclude all estimated ferrule radius values less than a mean estimated ferrule radius value minus two standard deviations from the mean estimated ferrule radius value, and computing a statistically filtered estimated ferrule radius value. The method further comprises determining a radius of the ferrule outer circular boundary from a difference between the statistically filtered estimated ferrule radius value and a selected distance if necessary to account for illumination roll-off proximate to the ferrule outer circular boundary.

In another embodiment of the disclosure, a method is provided for determining a ferrule outer boundary from a digital image of at least a portion of an end of an optical fiber connector (e.g., an APC polished connector) in which a fiber core is surrounded by fiber cladding and by a ferrule having an end surface non-perpendicular to a longitudinal axis of the fiber core. The method comprises performing ensemble normalization of the digital image to generate an ensemble normalized image. The method further comprises applying a universal threshold value across the ensemble normalized image to generate a binary image of sub-unity value features including an outer high intensity boundary. The method further comprises removing the largest single feature within an interior of the binary image. The method further comprises extracting a radial profile from a fiber core center position to the outer high intensity boundary at each angular interval of a plurality of angular intervals, yielding a plurality of radial profiles for the plurality of angular intervals. The method further comprises, for each radial profile, identifying a radius value for a non-zero pixel value farthest from the fiber core center position, yielding a plurality of radius values for the plurality of radial profiles. The method further comprises median filtering the plurality of radius values to remove outlying radius values and to yield median filtered radius values. The method further comprises polynomially fitting x coordinates of the median filtered radius values, and polynomially fitting y coordinates of the median filtered radius values. The method further comprises identifying an estimated ferrule outer boundary from corresponding pairs of polynomially fitted x and y coordinates. The method further comprises reducing a radial distance from each pair of polynomially fitted x and y coordinates to the fiber core center position by a selected value to yield a plurality of pairs of inset fitted x and y coordinates corresponding to coordinates of the ferrule outer boundary to facilitate contaminant detection.

In another embodiment of the disclosure, a method is provided for determining positions of multiple optical fibers from a digital image of at least a portion of an end of an optical fiber connector (e.g., an MPO connector) in which respective ends of the multiple fibers are arranged in a linear pattern on an end surface of a ferrule in the digital image. The method comprises smoothing the digital image by at least one of 2D ensemble normalization or 2D median normalization to generate a normalized image in which spurious pixels of the end surface of the ferrule exhibit reduced intensity. The method further comprises applying a threshold value across the normalized image, with the threshold value based on a selected percentage of a maximum pixel intensity value to identify a plurality of proposed fiber masks. The method further comprises calculating centroid x, y coordinates of each proposed fiber mask of the plurality of proposed fiber masks, identifying median difference values for centroid x coordinates of the plurality of proposed fiber masks, and identifying median difference values for centroid y coordinates of the plurality of proposed fiber masks. The method further comprises comparing a difference of centroid x and y coordinate values between adjacent proposed fiber masks to the median difference values for centroid x coordinates and centroid y coordinates, and responsive to such comparison: (i) removing any pairs of adjacent fiber masks of the plurality of proposed fiber masks embodying differences between centroid x and y coordinate values greater than a specified threshold than the median difference values for centroid x coordinates and centroid y coordinates, and (ii) spatially validating any other adjacent fiber masks of the plurality of proposed fiber masks embodying differences between centroid x and y coordinate values within a specified threshold of the median difference values for centroid x coordinates and centroid y coordinates to yield spatially validated fiber masks. The method further comprises, for any removed pairs of adjacent fiber masks that lie between spatially validated fiber masks, linearly interpolating positions of replacement fiber masks using the median difference values for centroid x coordinates and centroid y coordinates.

In another embodiment of the disclosure, a method is provided for determining center position of an individual optical fiber from a digital image of at least a portion of an end of an optical fiber connector in which one or more optical fibers is/are arranged in a ferrule, with the image showing a respective end of the one or more optical fibers on an end surface of the ferrule. The method comprises extracting a subregion of the digital image to generate a subregion image containing an individual optical fiber. The method further comprises performing ensemble normalization of the digital image to generate an ensemble normalized image. The method further comprises applying a universal threshold value across the ensemble normalized image to generate a binary image of sub-unity value features embodying a first fiber mask including multiple pixels each having x and y coordinates. The method further comprises for each pixel of the first fiber mask, investigating overlap with the first fiber mask by generating a circular binary mask centered on the pixel being investigated and tabulating a summation of nonzero pixel values in common with the first fiber mask as well as x and y coordinate values of the pixel being investigated. The method further comprises identifying center coordinates for a fiber core of the individual optical fiber as either (i) x and y coordinates for a single pixel being investigated embodying a maximum summation value or (ii) mean x and y coordinates for multiple pixels being investigated embodying equal maximum summation values.

In another embodiment of the disclosure, a method is provided for determining location of a pin or pinhole feature from a digital image of at least a portion of an end of an optical fiber connector (e.g., an MPO connector) in which one or more optical fibers is/are arranged on an end surface of a ferrule in the digital image, and the end surface includes the pin or pinhole features for promoting alignment with a mating optical fiber connector. The method comprises applying a universal threshold value across the digital image to generate a binary image of sub-unity value features. The method further comprises checking size and eccentricity of sub-unity value features to identify preliminary pin or pinhole feature masks each having perimeter pixel coordinates. The method further comprises filling any voids in the preliminary pin or pinhole feature masks by horizontal and vertical interpolation to form interpolated pin or pinhole feature masks. The method further comprises, for each interpolated pin or pinhole feature mask, calculating radial distances from each pixel of multiple pixels within the interpolated pin or pinhole feature mask to perimeter pixels of the interpolated pin or pinhole feature mask, comparing the radial distances to a median radial distance to the perimeter pixels for the multiple pixels, and validating pixels having corresponding radial distances within a specified distance of the median radial distance. The method further comprises, for each interpolated pin or pinhole feature mask, selecting a validated pixel corresponding to a maximum number of validated radial distances within a specified distance of the median radial distance as a center of the pin or pinhole feature.

In another embodiment of the disclosure, a method is provided for determining boundaries of a ferrule from a digital image of at least a portion of an end of an optical fiber connector in which respective ends of multiple optical fibers are arranged in a linear pattern on an end surface of the ferrule in the digital image, with the end surface further including pins or pinhole features. The method for determining boundaries of the ferrule comprises generating a first cropped image from the digital image, with the first cropped image being cropped along two edges thereof in a direction perpendicular to the linear pattern, wherein cropping locations of the first cropped image are determined from locations of the pins or pinhole features. The method further comprises, for each row of pixels of the cropped image perpendicular to the linear pattern, median filtering pixel intensity values to remove outlying pixel intensity values potentially attributable to contamination and to generate a first median filtered pixel intensity profile, followed by calculating gradient magnitude values of the first median filtered pixel intensity profile to generate a first gradient profile, and selecting minimum and maximum values from the first gradient profile to identify a first pair of opposing edges, respectively, of the ferrule. The method further comprises generating a second cropped image from the digital image, with the second cropped image being cropped along two edges thereof in a direction parallel to the linear pattern, wherein cropping locations of the second cropped image are determined from locations of the pins or pinhole features. The method further comprises, for each row of pixels of the cropped image parallel to the linear pattern, median filtering pixel intensity values to remove outlying pixel intensity values potentially attributable to contamination and to generate a second median filtered pixel intensity profile, followed by calculating gradient magnitude values of the second median filtered pixel intensity profile to generate a second gradient profile, and selecting minimum and maximum values from the second gradient profile to identify a second pair of opposing edges, respectively, of the ferrule. According to such method, the first pair of opposing edges and the second pair of opposing edges correspond to lateral boundaries of the ferrule.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 1A illustrates an end face of at least a portion of a multi-mode single fiber connector, showing a fiber core zone, a cladding zone, an adhesive zone, and a contact zone according to an exemplary standard.

FIG. 1B illustrates an end face of at least a portion of a single-mode single fiber connector, showing a fiber core zone, a cladding zone, an adhesive zone, and a contact zone according to an exemplary standard.

FIG. 2A is table identifying certification thresholds according to the IEC 61300-3-35 standard for presence of scratches and defects in different zones of a multi-mode fiber.

FIG. 2B is table identifying certification thresholds according to the IEC 61300-3-35 standard for presence of scratches and defects in different zones of a single-mode fiber.

FIG. 3 is a side cross-sectional view of an interconnection between two (e.g., single-mode) optical fiber connectors, each having a Physical Contact (PC) polish profile at an end thereof.

FIG. 4 is a cross-sectional view of an interconnection between two (e.g., single-mode) optical fiber connectors each having an Ultra Physical Contact (UPC) polish profile at an end thereof.

FIG. 5 is a cross-sectional view of an interconnection between two (e.g., single-mode) optical fiber connectors, each having an Angled Physical Contact (APC) polish profile at an end thereof.

FIG. 7A is a perspective view of an example of a multi-fiber push-on (MPO)-type fiber optic connector incorporating multiple optical fibers retained in linearly arranged bores defined in a ferrule.

FIG. 7B is an exploded view of the fiber optic connector of FIG. 7A.

FIG. 21-1A is a composite image including a portion of the raw image of FIG. 20 inaccurately centered on a fiber positioned second from the left, with superimposed results of contamination detection (depicted with right upwardly-sloping fill or with straight dashed lines) identified from the raw image using a second commercially available contaminant detection software (specifically, software available with the FastMT-200× microscope used to obtain the raw images).

FIG. 21-1B is a composite image including a portion of the raw image of FIG. 20 accurately centered on the fiber positioned second from the left, with superimposed results of contamination detection (depicted with right upwardly-sloping fill) identified from the raw image using software implementing method steps according to the present disclosure.

FIG. 21-2A is a composite image of the same type as FIG. 21-1A, but including a portion of the raw image of FIG. 20 inaccurately centered on a fiber positioned fourth from the left.

FIG. 21-2B is a composite image of the same type as FIG. 21-1B, but including a portion of the raw image of FIG. 20 accurately centered on the fiber positioned fourth from the left.

FIG. 21-3A is a composite image of the same type as FIG. 21-1A, but including a portion of the raw image of FIG. 20 inaccurately centered on a fiber positioned sixth from the left.

FIG. 21-3B is a composite image of the same type as FIG. 21-1B, but including a portion of the raw image of FIG. 20 accurately centered on the fiber positioned sixth from the left.

FIG. 21-4A is a composite image of the same type as FIG. 21-1A, but including a portion of the raw image of FIG. 20 inaccurately centered on a fiber positioned eighth from the left.

FIG. 21-4B is a composite image of the same type as FIG. 21-1B, but including a portion of the raw image of FIG. 20 accurately centered on the fiber positioned eighth from the left.

FIG. 21-5A is a composite image of the same type as FIG. 21-1A, but including a portion of the raw image of FIG. 20 inaccurately centered on a fiber positioned tenth from the left, and with superimposed results of contamination detection depicted with right upwardly-sloping fill and gray shaded regions therein.

FIG. 21-5B is a composite image of the same type as FIG. 21-1B, but including a portion of the raw image of FIG. 20 accurately centered on the fiber positioned tenth from the left.

FIG. 21-6A is a composite image of the same type as FIG. 21-1A, but including a portion of the raw image of FIG. 20 inaccurately centered on a fiber positioned twelfth from the left, and with superimposed results of contamination detection depicted with right upwardly-sloping fill and gray shaded regions therein.

FIG. 21-6B is a composite image of the same type as FIG. 21-1B, but including a portion of the raw image of FIG. 20 accurately centered on the fiber positioned twelfth from the left.

FIG. 45 is a flow diagram identifying routines or routines used in a software-implemented multi-step method for identifying contamination on an end of angled physical contact single fiber (e.g., LC-APC or SC-APC) connector, incorporating a dynamic ferrule boundary determination routine.

FIG. 46 is a flow diagram identifying routines or routines used in a software-implemented multi-step method for identifying contaminants only on fiber portions of an end of a multi-fiber (e.g., MPO) connector.

FIG. 47 is a flow diagram identifying routines or routines used in a software-implemented multi-step method for identifying contaminants only on a ferrule surface of an end of a female multi-fiber (e.g., MPO) connector.

FIG. 48 is a flow diagram identifying routines or routines used in a software-implemented multi-step method for identifying contaminants only on a ferrule surface of an end of a male multi-fiber (e.g., MPO) connector.

Figure 49:
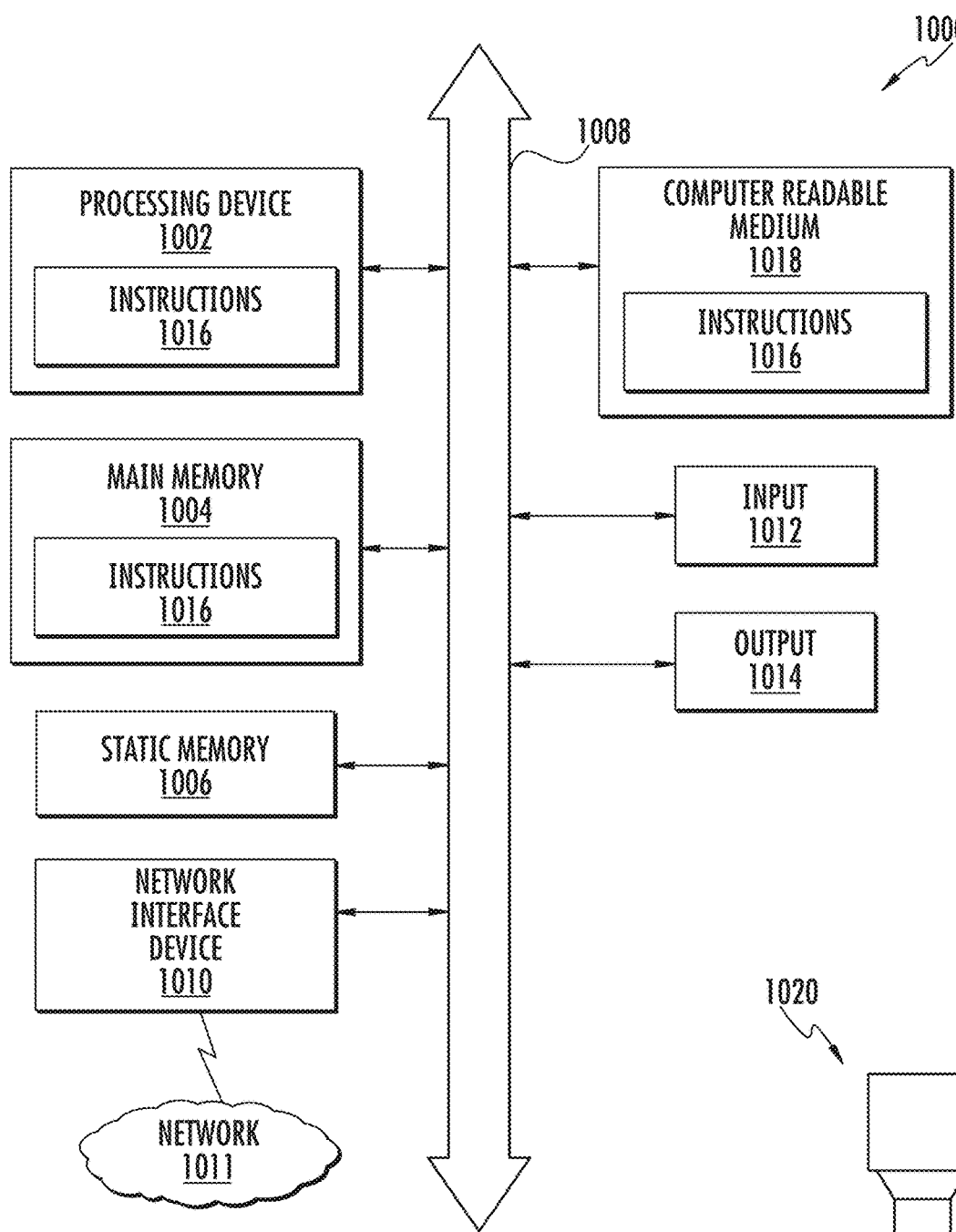

FIG. 49 schematically illustrates a generalized representation of a computing system suitable for executing methods disclosed herein for processing digital microscopy images of ends of optical fiber connectors for detection of contaminants.

Figure 50:
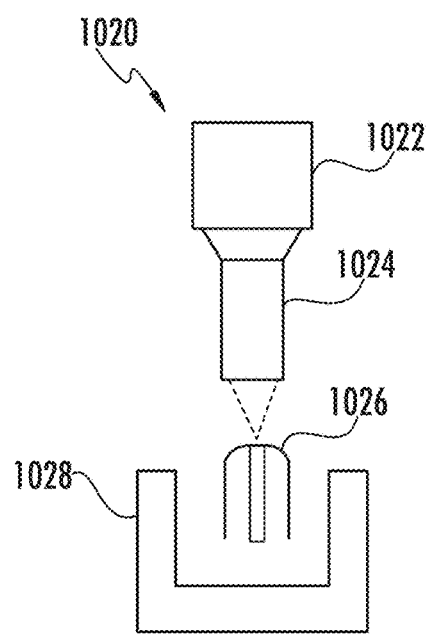

FIG. 50 is a simplified schematic side view of a digital microscope system suitable for capturing digital images of an end of an optical fiber connector.

DETAILED DESCRIPTION

Various embodiments will be further clarified by examples in the description below. As will be discussed in more detail below, the description generally relates to methods for processing digital microscopy images of ends of optical fiber connectors to facilitate detection of contamination. Methods incorporating statistically-based routines include processing of one or more digital images to: dynamically determine fiber locations and boundaries, detect contamination in fiber locations, dynamically detect ferrule boundaries, detect contamination in ferrule locations, and collect resulting data. Specific routines or routines may be utilized for different types of connectors, such as single fiber (e.g., LC or SC) connectors versus multi-fiber (e.g., MPO) connectors, and for different polishes (e.g., PC, UPC, or APC). Certain methods include defining mask images representing different portions of an end of an optical fiber connector, and detecting contaminants in one or more regions non-coincident with a previously-defined mask image. Data corresponding to contaminants detected for different regions may be collected for a single connector and output (e.g., saved, presented to a user, exported, etc.).

Image Processing Terminology and Techniques

Various routines or methods disclosed herein utilize image processing techniques and are described with terminology used in the image processing art. Certain techniques and terminology relevant to the present disclosure are introduced to provide context for principles discussed hereinafter.

Filtering (also referred to herein as "averaging") is a frequently used image processing operation that reduces the amount of intensity variation between one pixel and neighboring pixels.

Ensemble filtering (also known as mean filtering, ensemble averaging, and ensemble normalization) is a technique in which each pixel value in an image is replaced with the mean (i.e., average) value of its neighbors, including itself. This has the effect of eliminating pixel values that are unrepresentative of their surroundings. Ensemble filtering is a form of convolution filtering, based around a "kernel," which represents the shape and size of the neighborhood to be sampled when calculating the mean. Examples of two-dimensional kernel sizes are squares (e.g., boxes) of pixels of sizes such as 3×3, 5×5, 7×7, 9×9, etc. Larger kernel sizes tend to produce more severe smoothing (e.g., exhibiting less noise and less high frequency detail). Ensemble filtering exhibits two main issues. Firstly, a single pixel with a very unrepresentative value can significantly affect the mean value of all pixels in the neighborhood. Secondly, when a filter neighborhood straddles an edge, the filter will interpolate new values for pixels on the edge and will blur that edge. In general, ensemble filtering acts as a low-pass frequency filter that reduces spatial intensity derivatives present in an image.

Median filtering is similar to ensemble filtering, but each pixel value in an image is replaced with the median (instead of the mean) of its neighboring pixels. Median filtering is another form of convolution filtering based around a kernel (e.g., boxes of pixels of sizes such as 3×3, 5×5, 7×7, 9×9, etc.) representing the shape and size of the neighborhood to be sampled when calculating the median value. Median filtering addresses certain issues with ensemble (mean) filtering, but takes longer to compute.

Thresholding is a method of image segmentation, useful for creating binary (black and white) images from a grayscale image. A simple thresholding method involves replacing each pixel in a grayscale image with a black pixel if the image intensity is below some fixed constant, or with a white pixel if the image intensity is greater than the fixed constant.

In the context of a grayscale image, an image gradient represents a directional change in intensity. In mathematical terms, the gradient of a two-variable function such as an image intensity function at each point in the image is a 2D vector with the components given by the derivatives in the horizontal and vertical directions. At each image point, the gradient vector points in the direction of largest possible intensity increase, and the length of the gradient vector corresponds to the rate of change in that direction.

Results Obtained from Embodiments of Software-Implemented Methods

Before describing details of methods for processing digital microscopy images of ends of optical fiber connectors to enhance detection of contaminants, results obtained from embodiments of software-implemented methods according to the present disclosure (referred to as "Software 1" to "Software 6") for detecting contamination on ends of optical connectors will be compared with results obtained from commercially available software. The intention of this approach is to provide context for the present disclosure and to show that shortcomings associated with commercially available software may be overcome using novel software-implemented methods disclosed herein.

Each group of FIGS. 8A-8C, 9A-9C, 10A-10C, and 11A-11C include an image of an end portion of a different single fiber optical connector (specifically, an LC connector with the images showing an end surface or face of a ferrule and an optical fiber). FIGS. 8A, 9A, 10A, and 11A embody raw digital microscope images obtained with a DScope ×4 microscope (available from Data-Pixel SAS, Chavanod, France), each showing a fiber core 100, 105, 110, 116 surrounded by cladding 102, 107, 111, 117 within a ferrule 103, 108, 112, 118, respectively. FIGS. 8B, 9B, 10B, and 11B each embody a composite image including the corresponding raw image (of FIGS. 8A, 9A, 10A, and 11A, respectively) with superimposed results of contamination detection (depicted with left upwardly-sloping fill and right upwardly-sloping fill, respectively) and dashed lines proximate to core and cladding boundaries, identified from the raw image using a first commercially-available contaminant detection software (specifically, Blink software available from Data-Pixel, Chavanod, France). FIGS. 8C, 9C, 10C, and 11C each embody a composite image including the corresponding raw image (of FIGS. 8A, 9A, 10A, and 11A, respectively) with superimposed results of contamination detection (depicted with right upwardly-sloping fill), and dashed lines proximate to core and cladding boundaries, identified from the raw image using software (described hereinafter as in connection with FIG. 43) implementing method steps according to the present disclosure.

With general reference to FIGS. 8B, 9B, 10B, and 11B, problems encountered with the commercial software included contamination identification failure, contamination sizing error, ferrule outer boundary sizing error, and erroneous classification of ferrule boundaries as contamination.

Figure 8A:
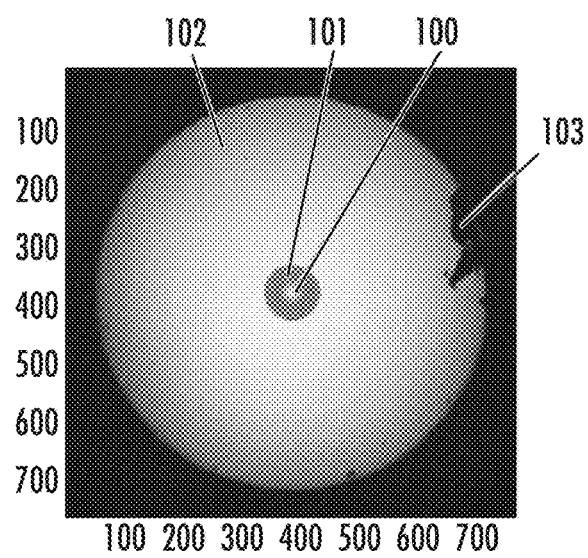
FIG. 8A is a raw digital microscope image obtained with a first commercially available microscope (DScope ×4 from Data-Pixel SAS) of an end portion of a first LC-type single fiber optical connector.
Figure 8B:
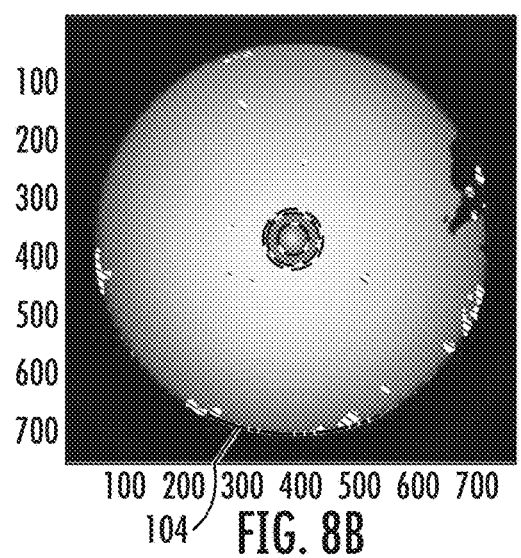
FIG. 8B is a composite image including the raw image of FIG. 8A with superimposed results of contamination detection (depicted with left upwardly-sloping fill and right upwardly-sloping fill, respectively), and dashed lines proximate to core and cladding boundaries, identified from the raw image using a first commercially available contaminant detection software (Data-Pixel Blink software).
Figure 8C:
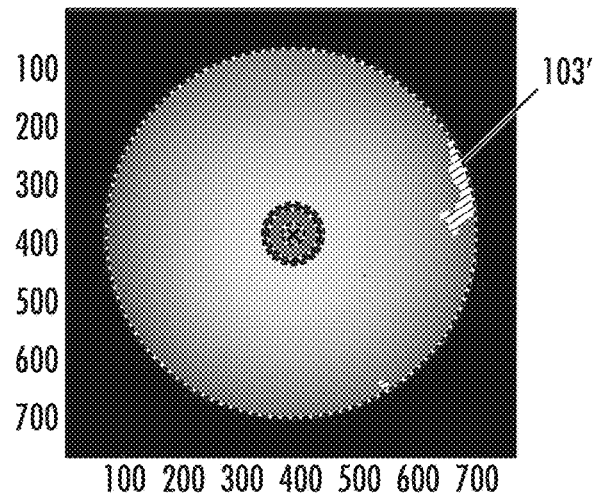
FIG. 8C includes the raw image of FIG. 8A with superimposed results of contamination detection (depicted with right upwardly-sloping fill), and dashed lines proximate to core and cladding boundaries, identified from the raw image using software implementing method steps according to the present disclosure.

As shown in FIG. 8A, a large contamination region 103 appeared at the outer boundary of the ferrule 102 between the two o'clock and three o'clock positions. Referring to FIG. 8B, only a small fraction of the large contamination region 103 of FIG. 8A was identified (depicted with right upwardly-sloping fill) by the commercial software as contamination. Moreover, with continued reference to FIG. 8B, a lower outer boundary of the ferrule (extending roughly between the five o'clock and seven o'clock positions) was depicted with left upwardly-sloping fill, representing erroneous classification of the ferrule boundary as contamination 104. Referring to FIG. 8C, use of method steps as disclosed herein properly identified (by indicating region 103' with left upwardly-sloping fill) the entire large contamination region 103 of FIG. 8A as contamination, and properly did not classify the lower outer boundary of the ferrule as contamination.

Figure 9A:
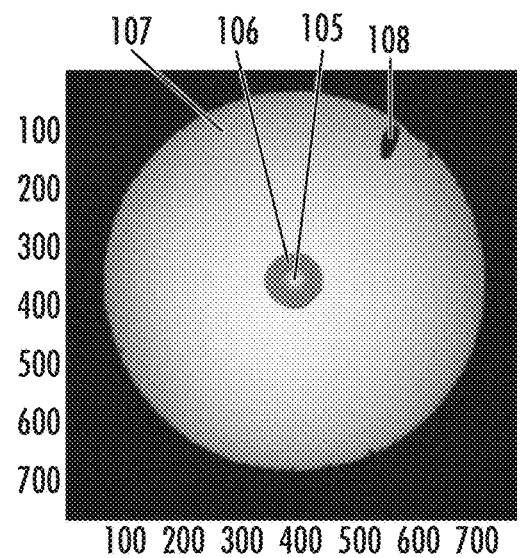
FIG. 9A is a raw digital microscope image of the same type as FIG. 8A, for a second LC connector.
Figure 9B:
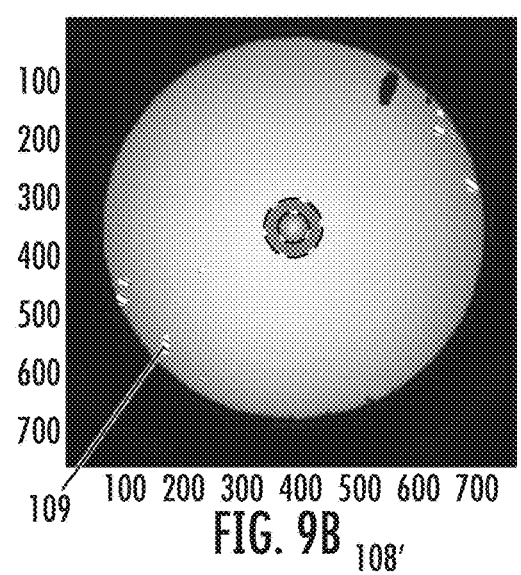
FIG. 9B is a composite image of the same type as FIG. 8B, but derived from the image of FIG. 9A.
Figure 9C:
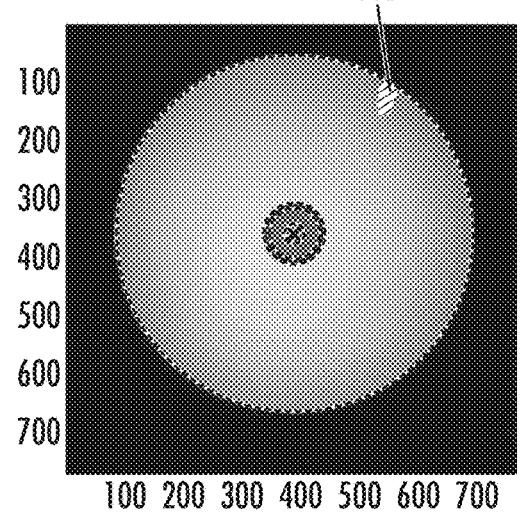
FIG. 9C is a composite image of the same type as FIG. 8C, but derived from the image of FIG. 9A.

Referring to FIG. 9A, a contamination region 108 appeared at near the outer boundary of the ferrule 107 near the one o'clock position. Referring to FIG. 9B, the contamination region of 108 of FIG. 9A appeared black (not having left upwardly-sloping fill), signifying that such region 108 was not identified by the commercial software as contamination. Additionally, a spurious (or spuriously large) contamination region 109 is shown in FIG. 9B, whereas such contamination is not visible (or is not visible to the same extent) in FIG. 9A. Referring to FIG. 9C, use of method steps as disclosed herein properly identified (by indicating region 108' with right upwardly-sloping fill) the entire contamination region 108 of FIG. 9A.

Figure 10A:
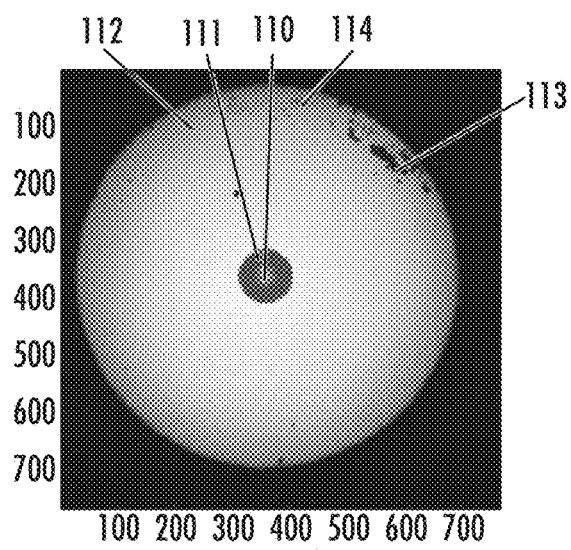
FIG. 10A is a raw digital microscope image of the same type as FIG. 8A, for a third LC connector.
Figure 10B:
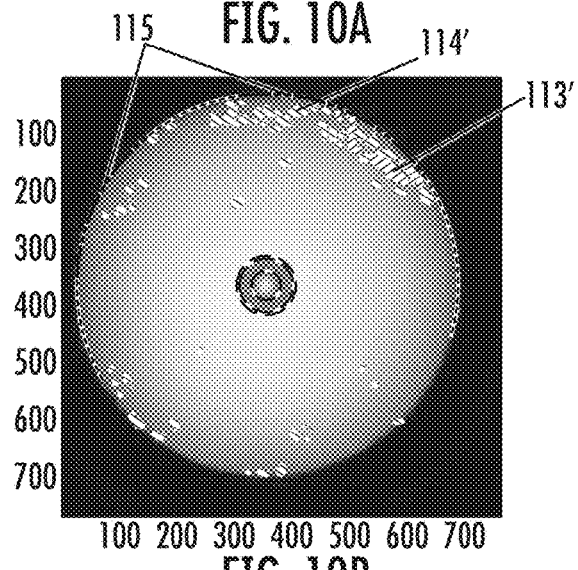
FIG. 10B is a composite image of the same type as FIG. 8B, but derived from the image of FIG. 10A.
Figure 10C:
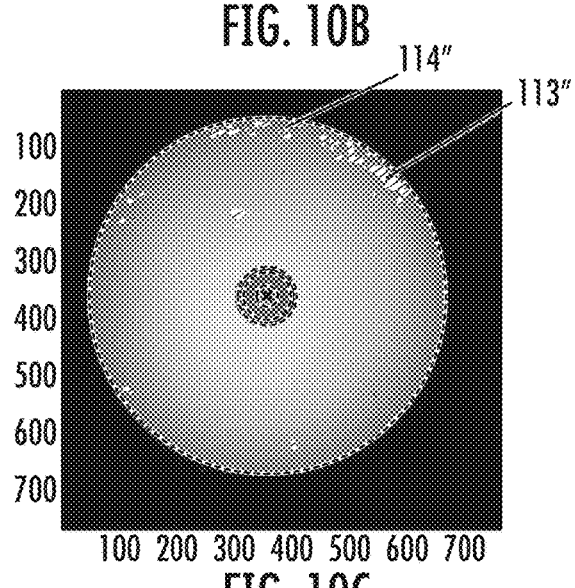
FIG. 10C is a composite image of the same type as FIG. 8C, but derived from the image of FIG. 10A.

FIG. 10A shows a large contamination region 113 appearing near the outer boundary of the ferrule 112 at roughly the two o'clock position, and a smaller contamination region 114 appearing near the ferrule boundary at roughly the twelve o'clock position. Referring to FIG. 10B, a large contamination region 113' appearing somewhat larger than the corresponding region 113 appearing in FIG. 10A was detected by the commercial software, while a smaller contamination region 114' appearing significantly larger than the contamination region 114 in FIG. 10A was detected by the commercial software. Moreover, the commercial software detected spurious edge contamination 115 (depicted with left upwardly-sloping fill in FIG. 10B) around significant margins of the ferrule (e.g., from nine to eleven o'clock, and from twelve o'clock to two o'clock positions). Referring to FIG. 10C, use of method steps as disclosed herein properly identified (by indicating regions 113" and 114" with right upwardly-sloping fill) the corresponding contamination regions 113 and 114 shown in FIG. 10A, without identifying any spurious edge contamination around margins of the ferrule.

Figure 11A:
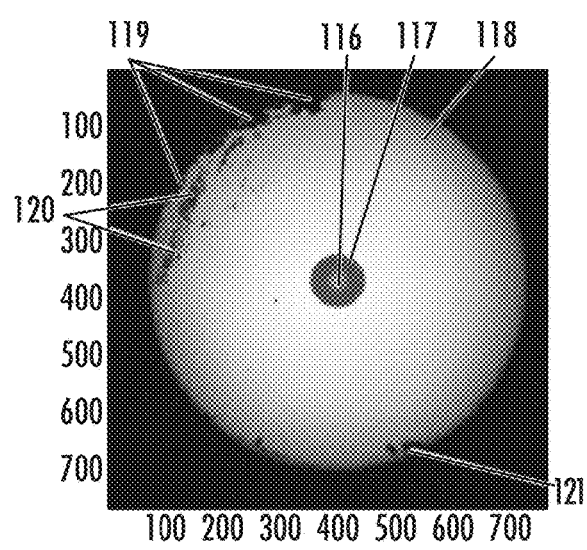
FIG. 11A is a raw digital microscope image of the same type as FIG. 8A, for a fourth LC connector.
Figure 11B:
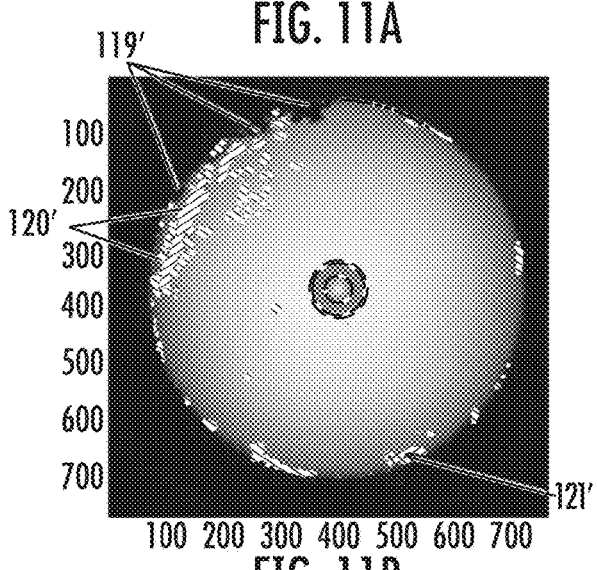
FIG. 11B is a composite image of the same type as FIG. 8B, but derived from the image of FIG. 11A.
Figure 11C:
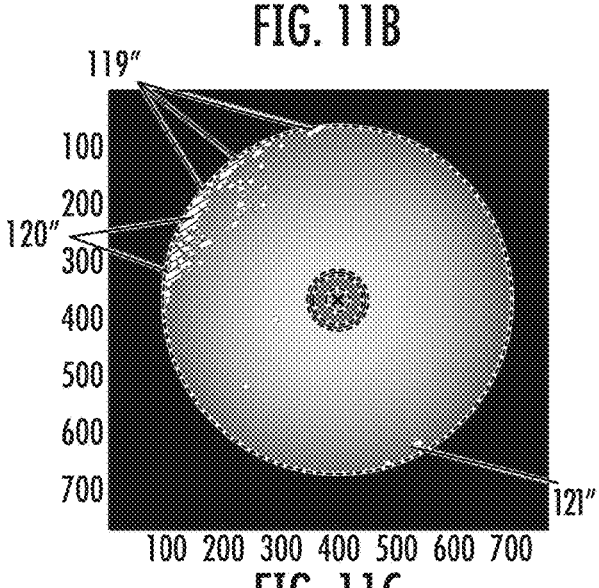
FIG. 11C is a composite image of the same type as FIG. 8C, but derived from the image of FIG. 11A.

FIG. 11A is a raw image depicting multiple contamination regions, including a first contamination region 119 extending from the ten o'clock to twelve o'clock positions at the outer boundary of the ferrule 118, a second contamination region 120 inset from the outer boundary of the ferrule 118 and extending from roughly the nine o'clock to eleven o'clock positions, and a third contamination region 121 positioned at the outer boundary of the ferrule 118 at the five o'clock position. Referring to FIG. 11B, the commercial software was unable to properly detect the ferrule outer boundary or properly identify contamination at the first and third contamination regions 119, 121 of FIG. 11A (as evidenced by the depiction of first regions 119', 121' predominantly in black in FIG. 11B), while the commercial software appeared generally better able to identify at least a portion of the second contamination region 120 of FIG. 11A as contamination (as evidenced by the depiction of first region 120' with right upwardly-sloping fill in FIG. 11B). Referring to FIG. 11C, use of method steps as disclosed herein properly identified the entire ferrule outer boundary (as represented by a dashed line defining the ferrule boundary), and properly identified (by depicting regions 119", 120", and 121" with right upwardly-sloping fill) the corresponding contamination regions 119, 120, and 121 shown in FIG. 11A, without identifying any spurious edge contamination around outer margins of the ferrule.

Each group of FIGS. 12A-12C, 13A-13C, 14A-14C, and 15A-15C include an image of an end portion of a different single fiber optical connector (specifically, an LC connector with the images showing a portion of an end surface or face of a ferrule and an optical fiber. FIGS. 12A, 13A, 14A, and 15A embody raw digital microscope images obtained with a DScope ×4 microscope (available from Data-Pixel SAS, Chavanod, France), each showing a fiber core 122, 128, 132, 137 surrounded by cladding 123, 129, 133, 138 within a ferrule 124, 130, 134, 139, respectively. FIGS. 12B, 13B, 14B, and 15B each embody a composite image including the corresponding raw image (of FIGS. 12A, 13A, 14A, and 15A, respectively) with superimposed results of contamination detection (depicted with right or left upwardly-sloping fill) identified from the raw image using commercially available contaminant detection software (specifically, Blink software available from Data-Pixel SAS, Chavanod, France). FIGS. 12C, 13C, 14C, and 15C each embody a composite image including the corresponding raw image (of FIGS. 12A, 13A, 14A, and 15A, respectively) with superimposed results of contamination detection (depicted with right upwardly-sloping fill) identified from the raw image using software (described hereinafter as in connection with FIG. 43) implementing method steps according to the present disclosure.

With general reference to FIGS. 12B, 13B, 14B, and 15B, problems encountered with the commercial software included contamination identification failure and contamination sizing/placement error.

Figure 12A:
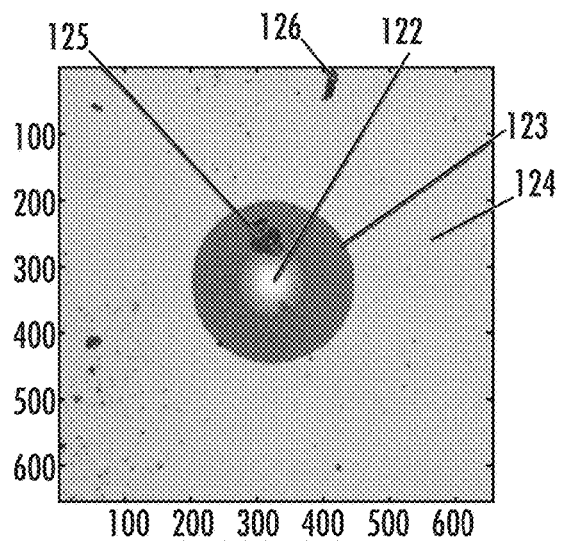
FIG. 12A is a raw digital microscope image obtained with a second commercially available microscope (DScope ×10 from Data-Pixel SAS) of an end portion of a fifth LC connector.
Figure 12B:
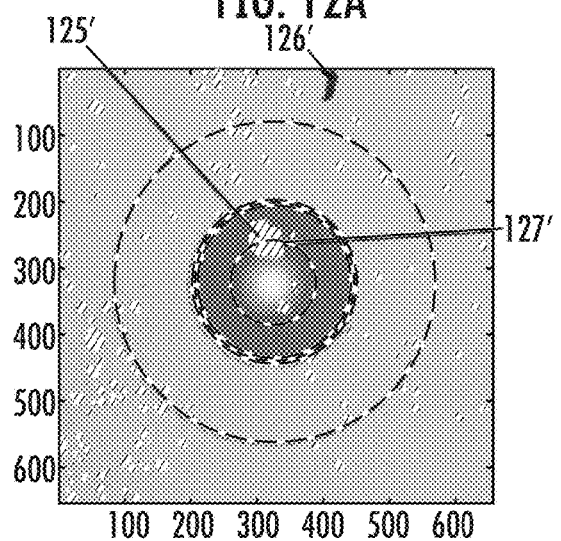
FIG. 12B is a composite image including the raw image of FIG. 12A with superimposed results of contamination detection (depicted with right upwardly-sloping fill) identified from the raw image using the above-mentioned first commercially available contaminant detection software.
Figure 12C:
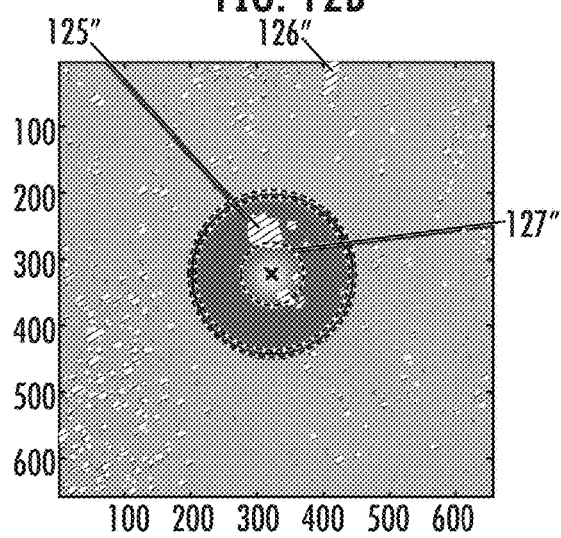
FIG. 12C is a composite image including the image of FIG. 12A with superimposed results of contamination detection (depicted with right upwardly-sloping fill) identified from the raw image using software implementing method steps according to the present disclosure.
Figure 13C:
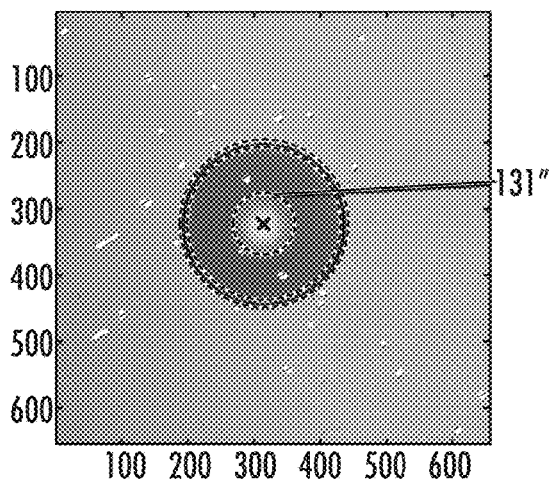
FIG. 13C is a composite image of the same type as FIG. 12C, but derived from the image of FIG. 13A.

Referring to FIG. 12A, a large contamination region 125 is visible near a boundary between the core 122 and the cladding 123, and a smaller contamination region 126 is provided on the ferrule 124 at the upper central boundary of the image. As shown in FIG. 12B, a large contamination region 125' was detected (i.e., depicted with right upwardly-sloping fill) by the commercial software as being bisected by a purported core/cladding boundary 127', while a smaller region 126' being depicted in black (thereby not signifying detection of contamination) at the upper central boundary of the image. In contrast, FIG. 12C shows that software implementing method steps according to the present disclosure identified the large contamination region 125" as contamination (i.e., depicted with right upwardly-sloping fill) only slightly overlapping a (smaller diameter) core/cladding boundary 127", with a majority of the large contamination region 125" being outside this boundary 127". Additionally, FIG. 12C depicts the smaller contamination region 126" as contamination (i.e., depicted with upwardly-sloping fill at the upper central boundary of the image).

Figure 13A:
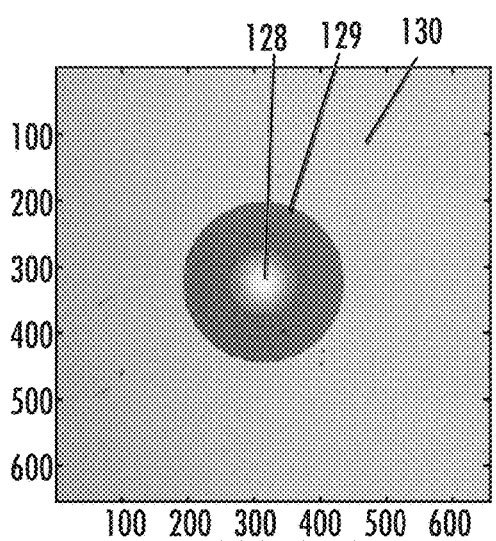
FIG. 13A is a raw digital microscope image of the same type as FIG. 12A, for a sixth LC connector.
Figure 13B:
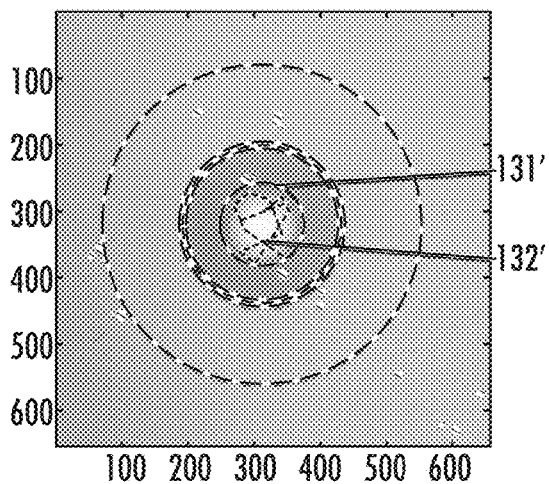
FIG. 13B is a composite image of the same type as FIG. 12B, but derived from the image of FIG. 13A, with superimposed results of contamination detection depicted with left upwardly-sloping fill, and closely dashed lines over the fiber core).

FIG. 13A exhibits relatively little visible contamination. Referring to FIG. 13B, however, a central portion of the connector shows spurious contamination 132' (indicated as closely dashed lines) resembling linear crossing scratch marks within a purported core/cladding boundary 131'. No such contamination is apparent within a core/cladding boundary 131" of FIG. 13C, corresponding to results obtained from software implementing method steps according to the present disclosure.

Figure 14A:
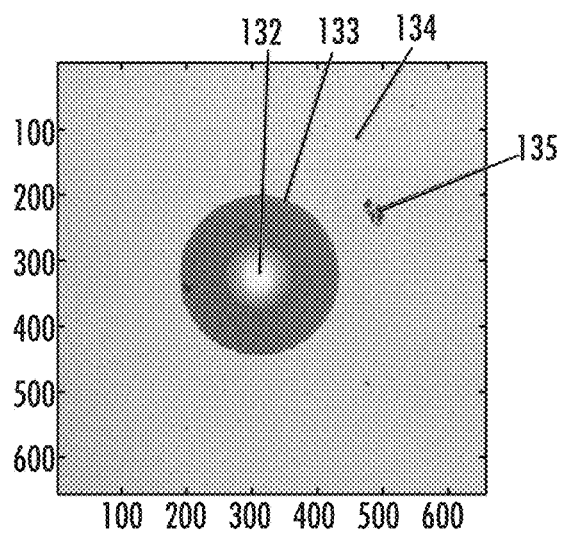
FIG. 14A is a raw digital microscope image of the same type as FIG. 12A, for a seventh LC connector.
Figure 14B:
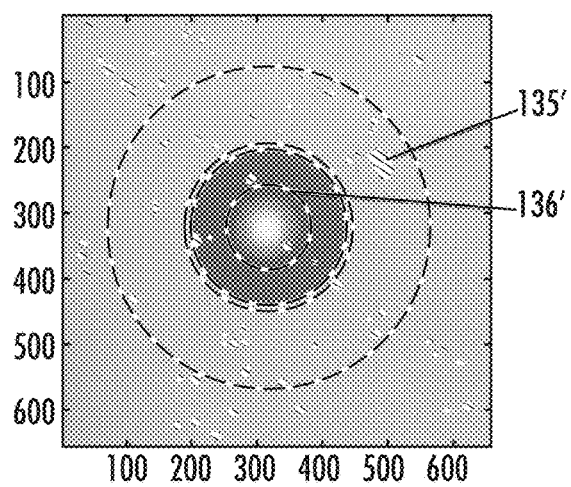
FIG. 14B is a composite image of the same type as FIG. 12B, but derived from the image of FIG. 14A, with superimposed results of contamination detection depicted with left upwardly-sloping fill.
Figure 14C:
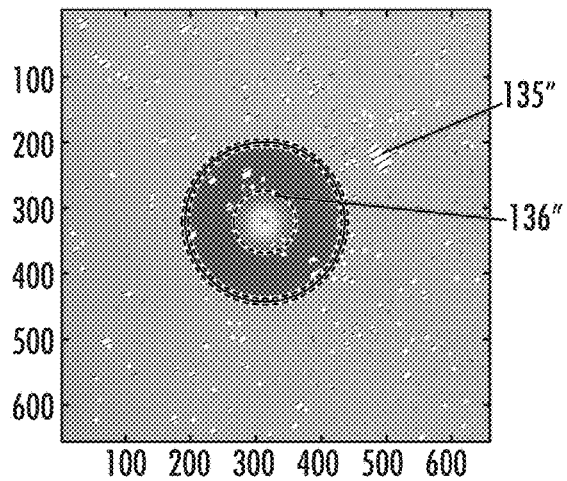
FIG. 14C is a composite image of the same type as FIG. 12C, but derived from the image of FIG. 14A.
Figure 15C:
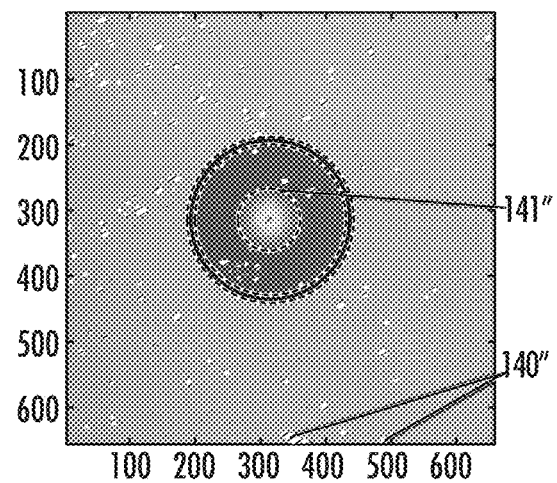
FIG. 15C is a composite image of the same type as FIG. 12C, but derived from the image of FIG. 15A.

As shown in FIG. 14A, a significant contaminant 135 is visible, with the same contaminant being properly detected by the commercial software in FIG. 14B (by depiction of region 135' with left upwardly-sloping fill) and properly detected by use of method steps as disclosed herein as shown in FIG. 14C (by depiction of region 135" with left upwardly-sloping fill). Differences between the commercial software and method according to the present disclosure include location of the core/cladding boundary (represented in FIG. 14B as circle 136' having a larger diameter than the circle 136" shown in FIG. 14C) as well as the number of contaminants detected (appearing as a larger number of left upwardly-sloping fill regions in FIG. 14C than right upwardly-sloping fill regions in FIG. 14C, suggesting non-location-specific contamination identification error).

Figure 15A:
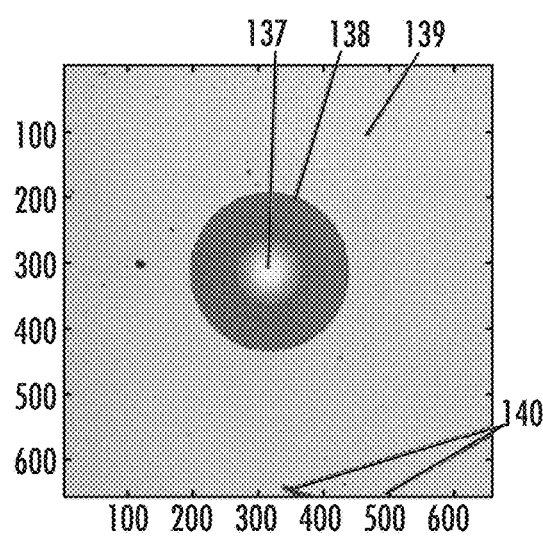
FIG. 15A is a raw digital microscope image of the same type as FIG. 12A, for an eighth LC connector.
Figure 15B:
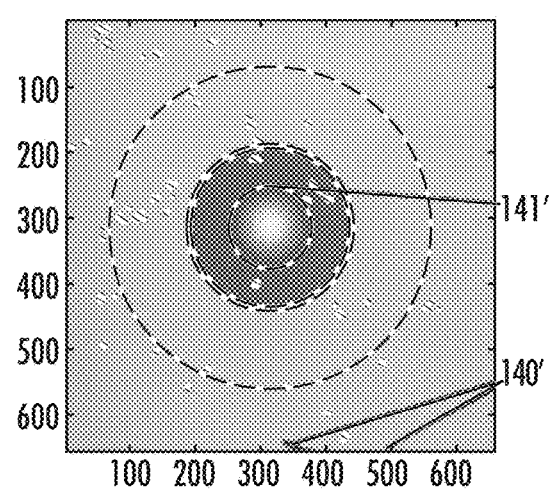
FIG. 15B is a composite image of the same type as FIG. 12B, but derived from the image of FIG. 15A with superimposed results of contamination detection depicted with left upwardly-sloping fill.

FIG. 15A provides a raw image of at least a portion of a ferrule 139 having contamination 140 on the ferrule 139 at edges of the square-shaped raw image. FIG. 15B represents region 140' (corresponding in location to contamination 140 in FIG. 15A) in black, signifying contamination detection error, whereas the contamination 140" was properly identified in FIG. 15C by use of method steps as disclosed herein. Also, the core/cladding boundary 141' in FIG. 15B appears larger in diameter than the core/cladding boundary 141" identified in FIG. 15C.

As noted previously herein, reliably detecting contamination on the entire ferrule surface of an angled physical contact polished connector is challenging, due at least in part to the presence of an angled surface that complicates identification of fiber/ferrule boundaries. Each group of three figures embodied in FIGS. 16A-16C, 17A-17C, 18A-18C, and 19A-19C include a first raw image, a second image masked in a certain way and with superimposed contaminant detection in the unmasked portion, and a third image masked in a different way and with superimposed contaminant detection in the unmasked portion. More specifically, FIGS. 16A, 17A, 18A, and 19A each include a first raw image of an LC connector with APC polish geometry (i.e., an "LC-APC" connector), with both a fiber portion and ferrule portion visible in the image. FIGS. 16B, 17B, 18B, and 19B each include the fiber portion of the raw image with superimposed contaminant detection following masking of the ferrule portion. FIGS. 16C, 17C, 18C, and 19C each include the ferrule portion of the raw image with superimposed contaminant detection following masking of the fiber portion, with the second and third images of each group obtained using software-implemented methods according to the present disclosure.

Figure 16A:
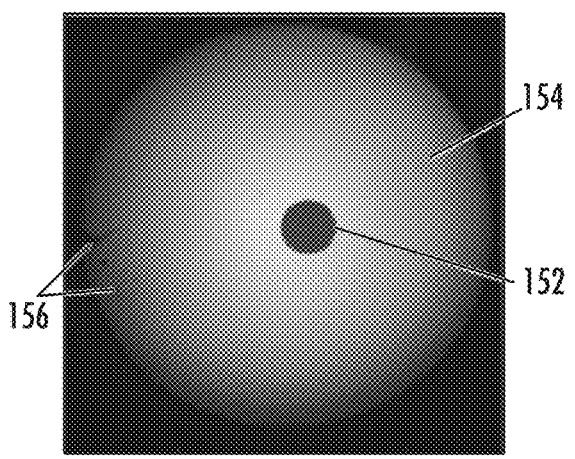
FIG. 16A is a raw digital microscope image obtained with the above-mentioned first microscope (DScope ×4) of an end portion of a first LC-APC single fiber optical connector.
Figure 16B:
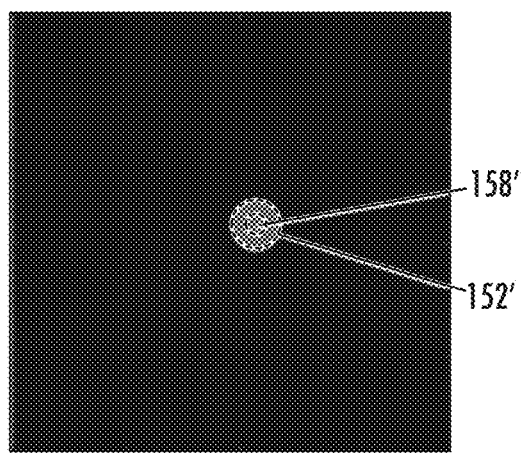
FIG. 16B is a composite image including only a fiber portion of the image of FIG. 16A identified from the raw image using software implementing method steps according to the present disclosure, after removal (e.g., masking) of the ferrule portion of the image of FIG. 16A.
Figure 16C:
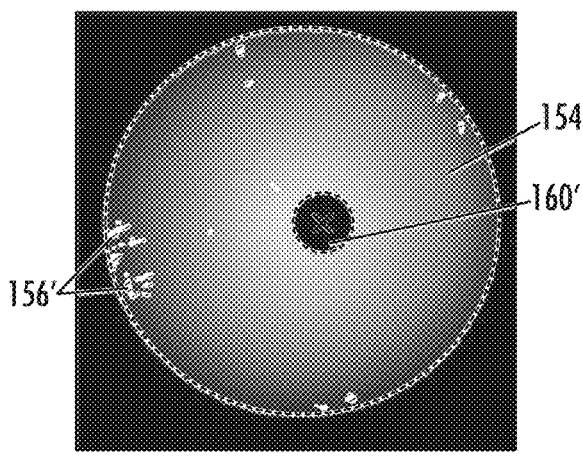
FIG. 16C is a composite image including only the ferrule portion of the image of FIG. 16A with superimposed results of contamination detection (depicted with right upwardly-sloping fill) and dashed lines representing the ferrule and cladding boundaries, respectively, identified from the raw image using software implementing method steps according to the present disclosure, after removal of the fiber portion of the image of FIG. 16A.

FIG. 16A shows a ferrule 154 surrounding an optical fiber 152 of an LC-APC connector, with contamination 156 visible near the ferrule outer boundary between the eight o'clock and nine o'clock positions. FIG. 16B shows a center position 158' and a fiber boundary (e.g., fiber/ferrule boundary) 152' detected using method steps disclosed herein. FIG. 16C shows the ferrule portion 154' of the image of FIG. 16A following removal (i.e., masking) of the fiber portion 160' of the image. Detected contamination 156' (depicted with left upwardly-sloping fill in FIG. 16C) corresponds substantially to the size and shape of contamination 156 shown in FIG. 16A.

Figure 17A:
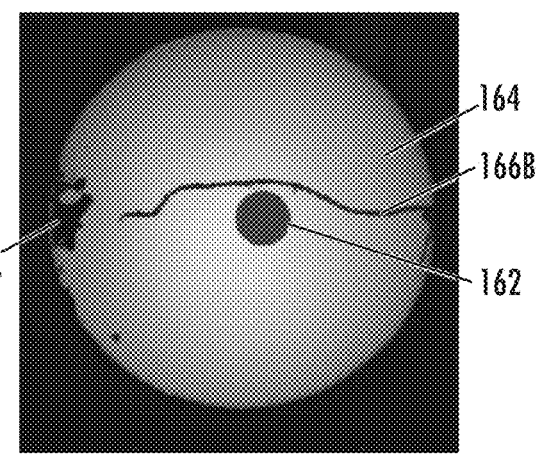
FIG. 17A is a raw digital microscope image of the same type as FIG. 16A, for a second LC-APC single fiber optical connector.
Figure 17B:
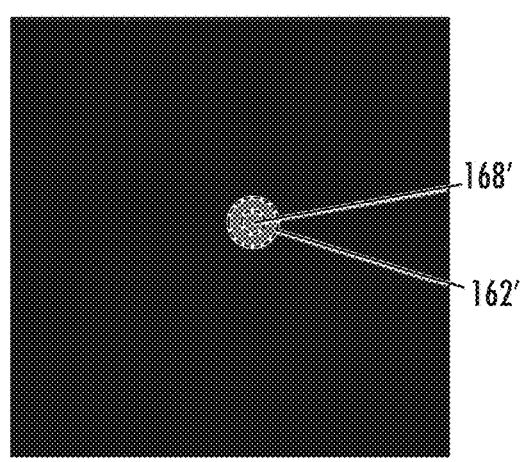
FIG. 17B is a composite image of the same type as FIG. 16B, but derived from the image of FIG. 17A.
Figure 17C:
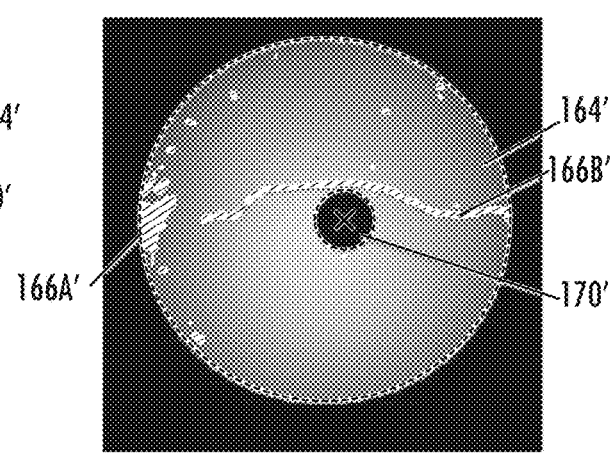
FIG. 17C is a composite image of the same type as FIG. 16C, but derived from the image of FIG. 17A.

FIG. 17A shows a ferrule 164 surrounding an optical fiber 162 of an LC-APC connector, with a first contamination region 166A visible near the ferrule outer boundary at the nine o'clock position, and with a second elongated contamination region 166B extending laterally across the majority of the ferrule 164 above the optical fiber 162. FIG. 17B shows a center position 168' and a fiber boundary (e.g., fiber/ferrule boundary) 162' detected using method steps disclosed herein. FIG. 17C shows the ferrule portion 164' of the image of FIG. 17A following removal (i.e., masking) of the fiber portion 170' of the image. Detected contamination 166A' (depicted with upwardly-sloping fill) corresponds substantially to the size, shape, and position of the first contamination region 166A shown in FIG. 17A, and detected contamination 166B' (depicted with upwardly-sloping fill) corresponds to the size, shape, and position of the second contamination region 166B shown in FIG. 17A.

Figure 18A:
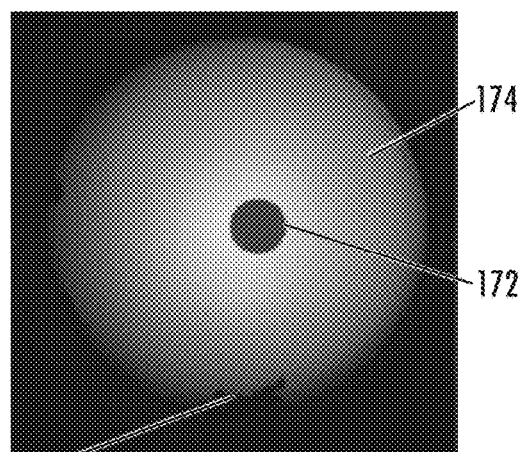
FIG. 18A is a raw digital microscope image of the same type as FIG. 16A, for a third LC-APC single fiber optical connector.
Figure 18B:
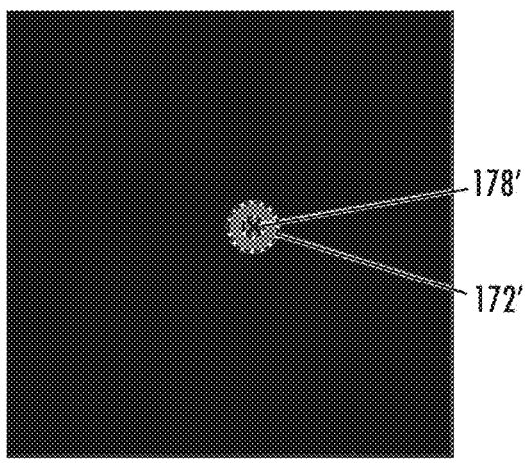
FIG. 18B is a composite image of the same type as FIG. 16B, but derived from the image of FIG. 18A.
Figure 18C:
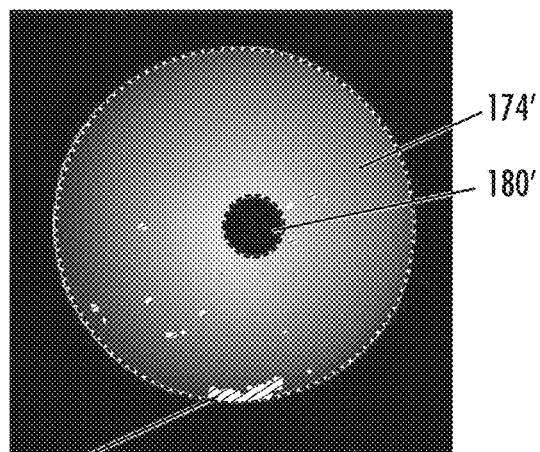
FIG. 18C is a composite image of the same type as FIG. 16C, but derived from the image of FIG. 18A.
Figure 19C:
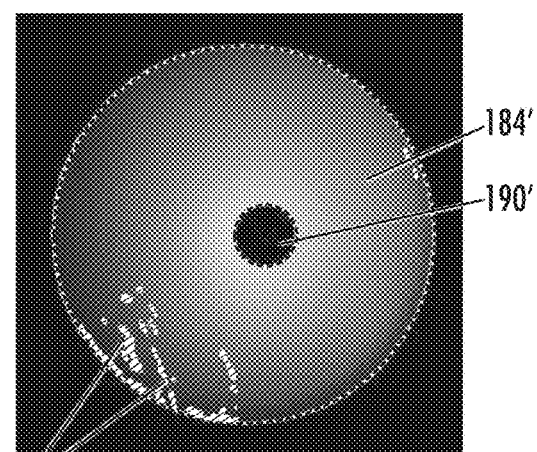
FIG. 19C is a composite image of the same type as FIG. 16C, but derived from the image of FIG. 19A.

FIG. 18A shows a ferrule 174 surrounding an optical fiber 172 of an LC-APC connector, with a contamination region 176 visible near the ferrule outer boundary at the six o'clock position. FIG. 18B shows a center position 178' and a fiber boundary (e.g., fiber/ferrule boundary) 172' detected using method steps disclosed herein. FIG. 18C shows the ferrule portion 174' of the image of FIG. 17A following removal (i.e., masking) of the fiber portion 170' of the image. Detected contamination 176' (depicted with upwardly-sloping fill in FIG. 18C) corresponds substantially to the size and shape of contamination 176 shown in FIG. 18A.

Figure 19A:
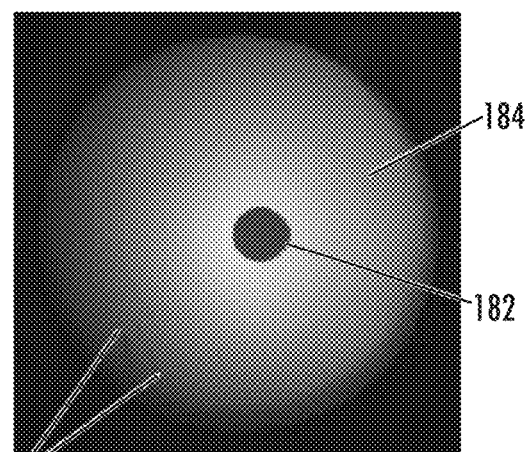
FIG. 19A is a raw digital microscope image of the same type as FIG. 16A, for a fourth LC-APC single fiber optical connector.
Figure 19B:
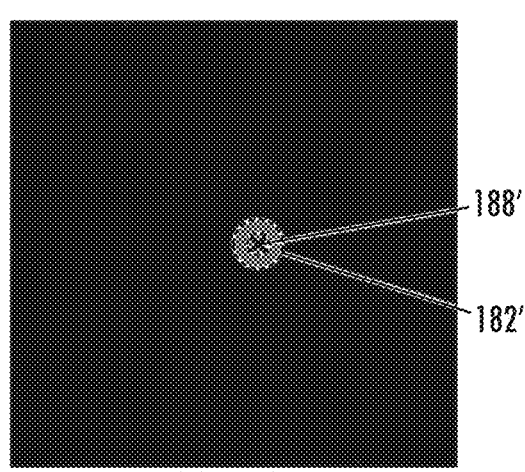
FIG. 19B is a composite image of the same type as FIG. 16B, but derived from the image of FIG. 19A.

FIG. 19A shows a ferrule 184 surrounding an optical fiber 182 of an LC-APC connector, with a contamination region 186 visible near the ferrule outer boundary between the six o'clock and seven o'clock positions. FIG. 19B shows a center position 188' and a fiber boundary (e.g., fiber/ferrule boundary) 182' detected using method steps disclosed herein. FIG. 18C shows the ferrule portion 184' of the image of FIG. 19A following removal (i.e., masking) of the fiber portion 180' of the image. Detected contamination 186' (depicted with upwardly-sloping fill in FIG. 19C) corresponds substantially to the size and shape of contamination 186 shown in FIG. 18A.

Figure 6A:
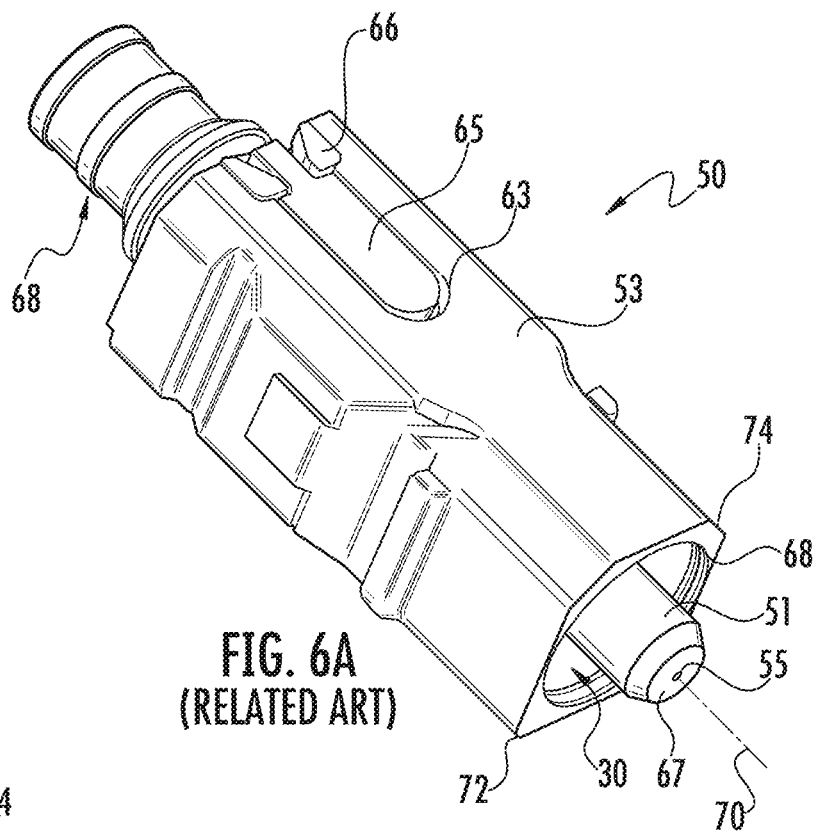
FIG. 6A is a perspective view of an example of a conventional SC-type (single fiber) fiber optic connector incorporating an optical fiber retained in a bore of a ferrule.
Figure 6B:
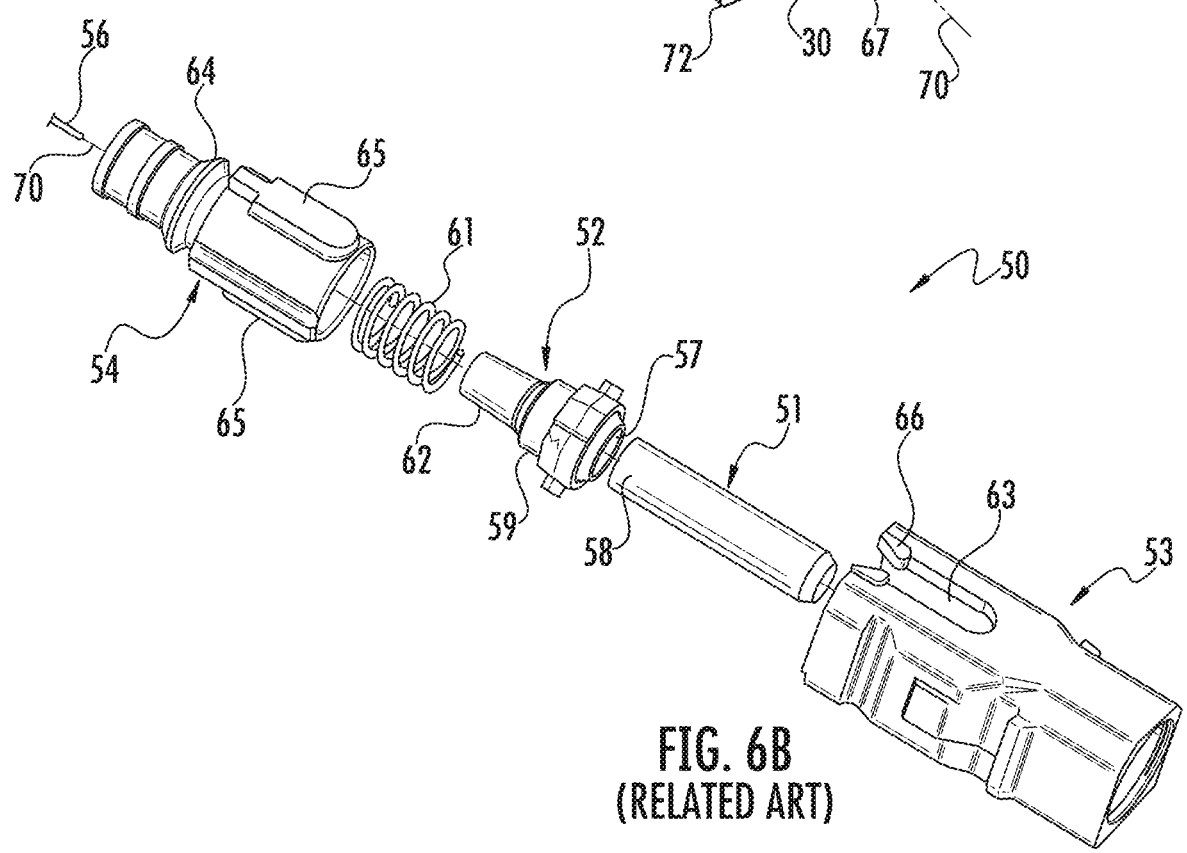
FIG. 6B is an exploded view of the fiber optic connector of FIG. 6A.
Figure 20:
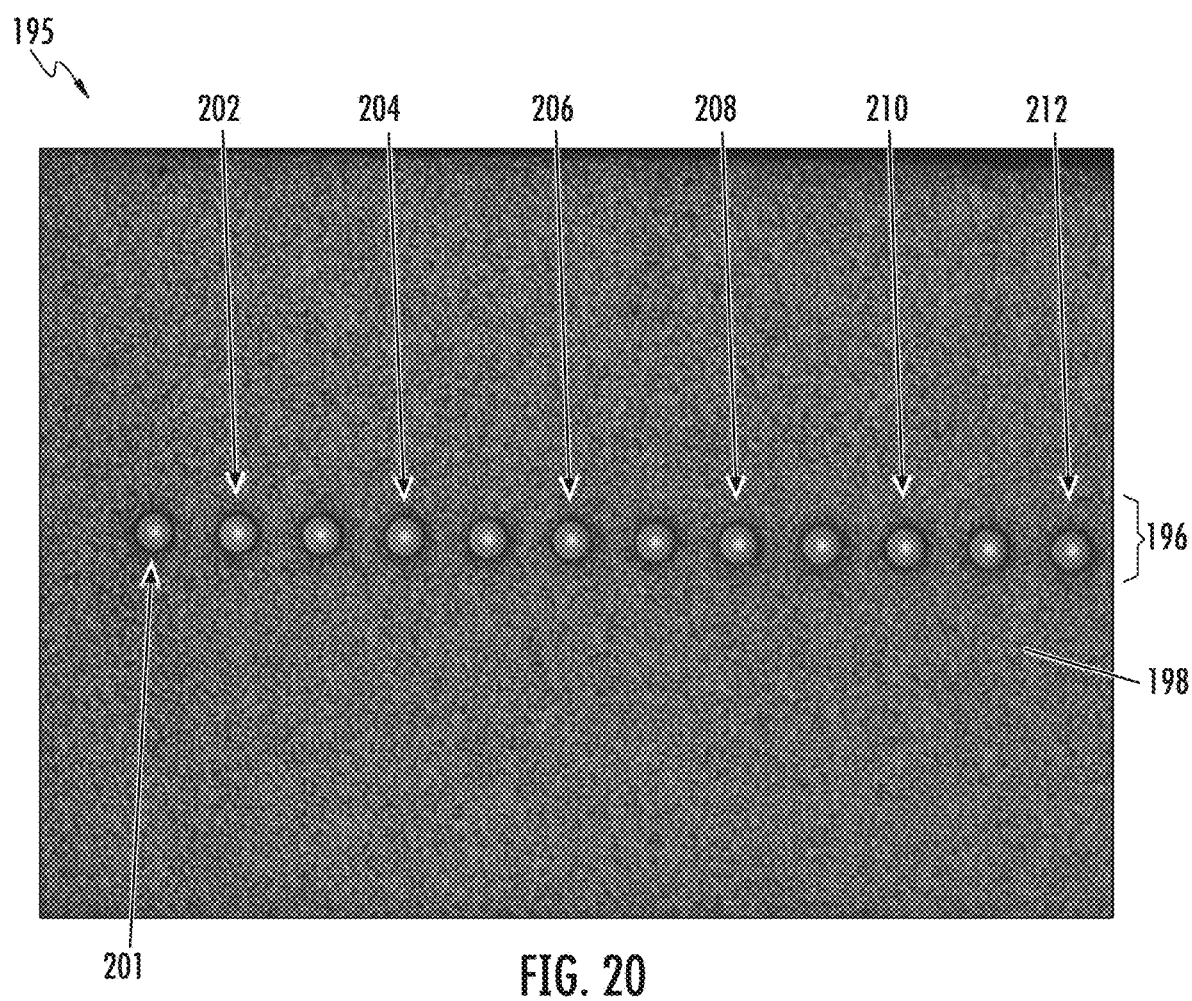
FIG. 20 is a raw digital microscope image obtained with a third commercially available microscope (FastMT-200× from FiberQA, LLC, Old Lyme, Conn.) of a central end portion of an MPO connector.
Figures 1A, 21:
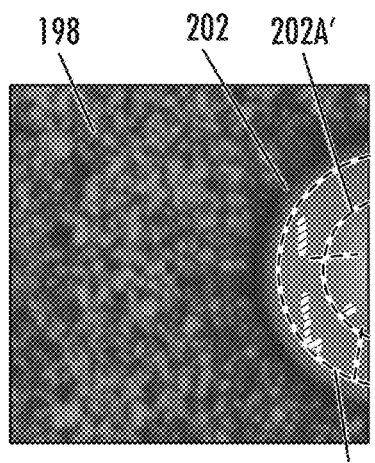
Figures 2A, 21:
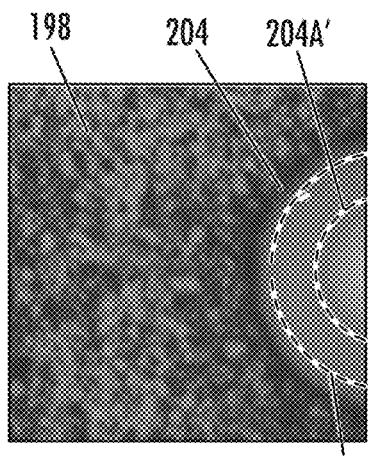
Figures 3A, 21:
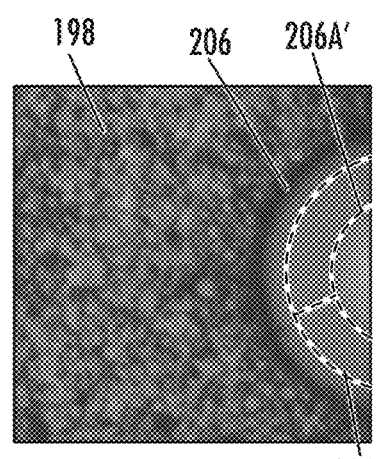
Figures 1B, 21:
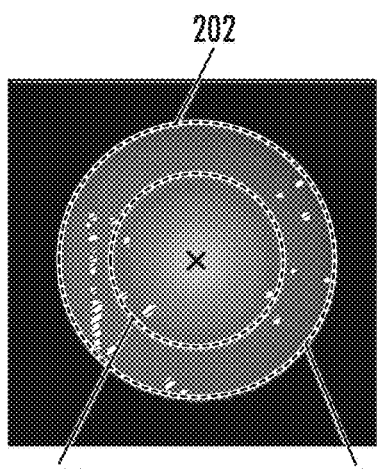
Figures 2B, 21:
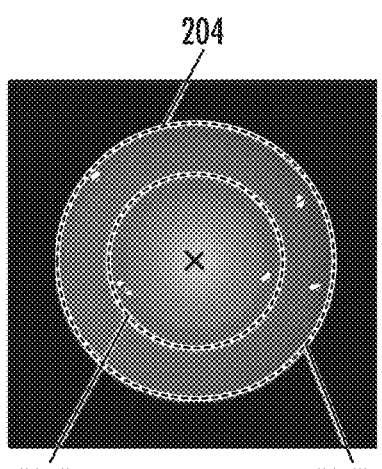
Figures 3B, 21:
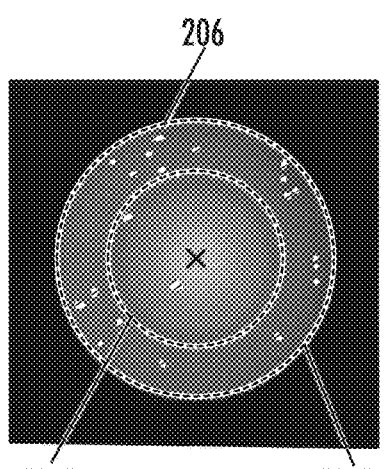
Figures 4A, 21:
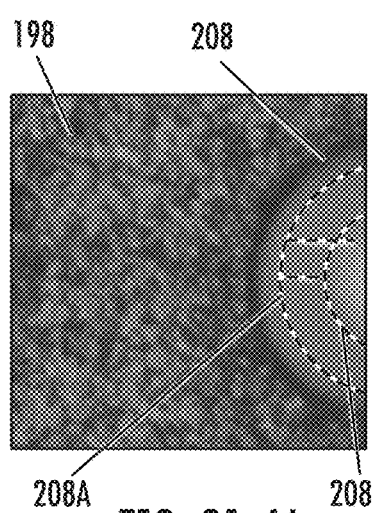
Figures 5A, 21:
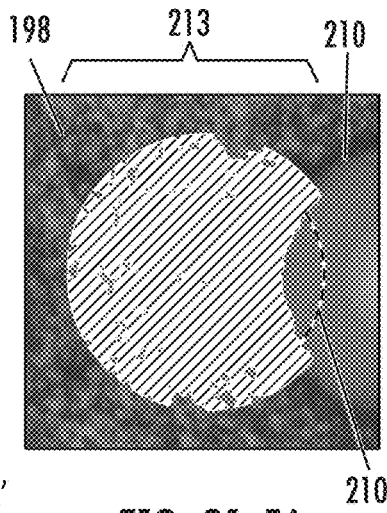
Figures 6A, 21:
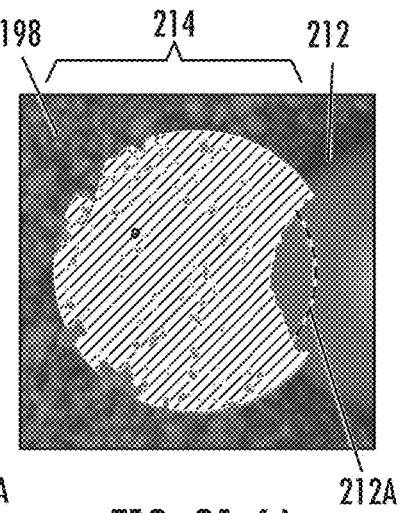
Figures 4B, 21:
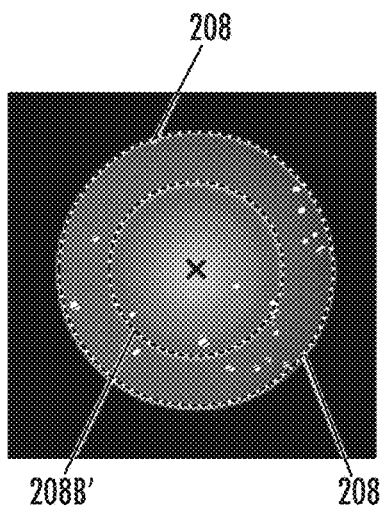
Figures 5B, 21:
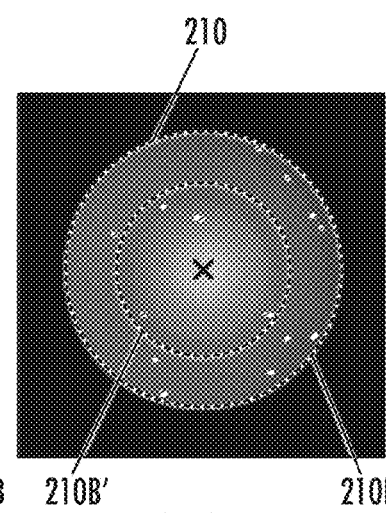
Figures 6B, 21:
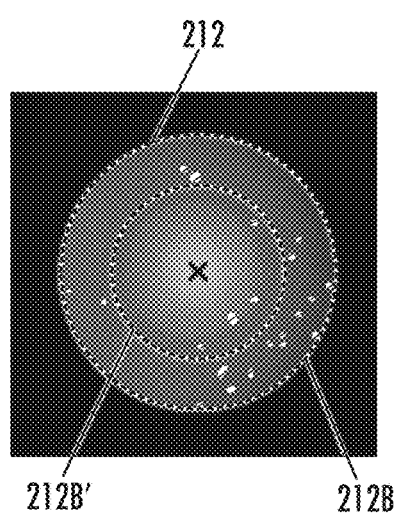
Figure 22A:
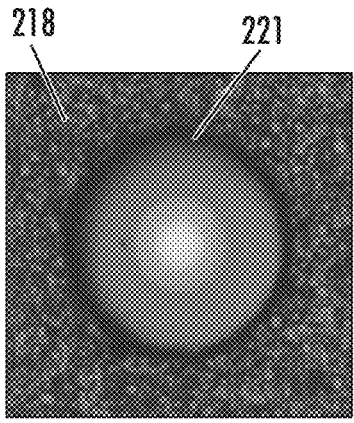
FIG. 22A is a raw digital microscope image obtained with the above-mentioned third microscope (FastMT-200×) of an end portion of an MPO connector centered on one optical fiber.
Figure 23A:
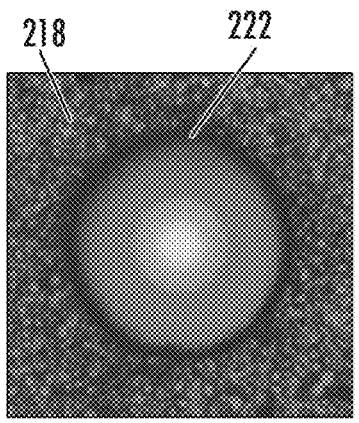
FIG. 23A is a raw image of the same type as FIG. 22A, but including an end portion of an MPO connector centered on another optical fiber.
Figure 24A:
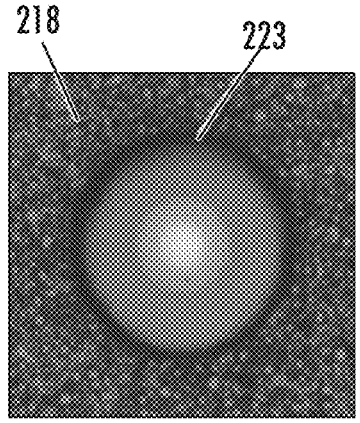
FIG. 24A is a raw image of the same type as FIG. 22A, but including an end portion of an MPO connector centered on yet another optical fiber.
Figure 22B:
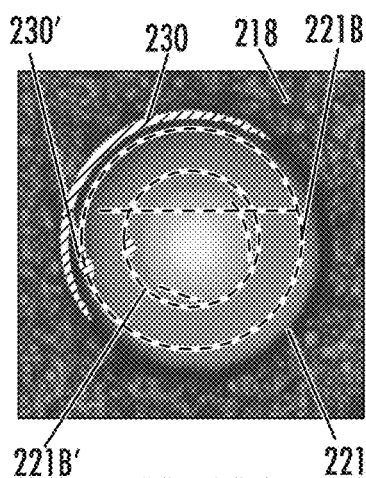
FIG. 22B is a composite image including the raw image of FIG. 22A with superimposed results of contamination detection (depicted with right upwardly-sloping fill or with straight dashed lines) identified from the raw image using the above-mentioned second commercially available contaminant detection software.
Figure 23B:
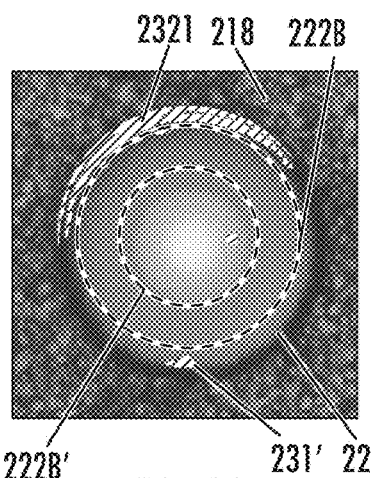
FIG. 23B is a composite image of the same type as FIG. 22B, but derived from the image of FIG. 23A.
Figure 24B:
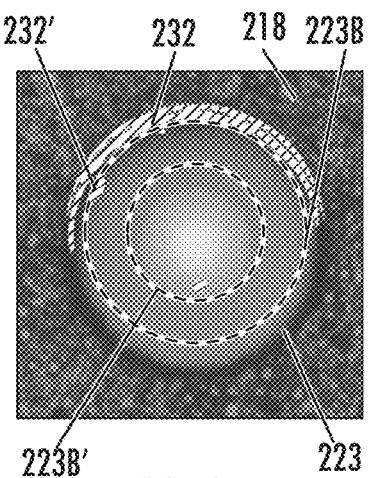
FIG. 24B is a composite image of the same type as FIG. 22B, but derived from the image of FIG. 24A.
Figure 22C:
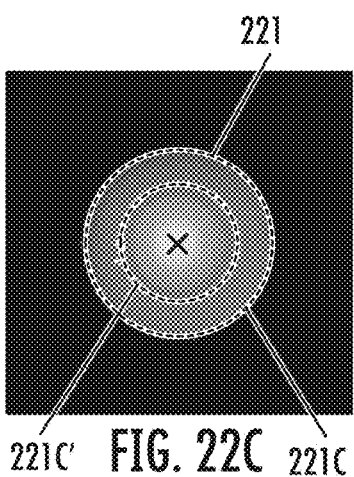
FIG. 22C is a composite image including the raw image of FIG. 22A with superimposed results of contamination detection (depicted with right upwardly-sloping fill) identified from the raw image using software implementing method steps according to the present disclosure.
Figure 23C:
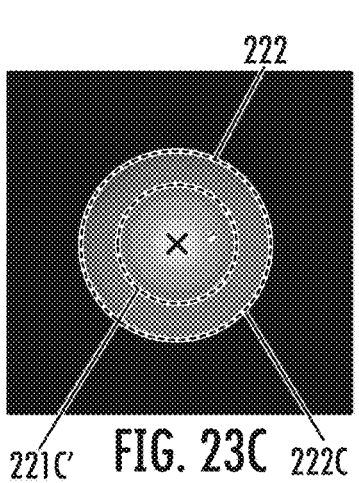
FIG. 23C is a composite image of the same type as FIG. 22C, but derived from the image of FIG. 23A.
Figure 24C:
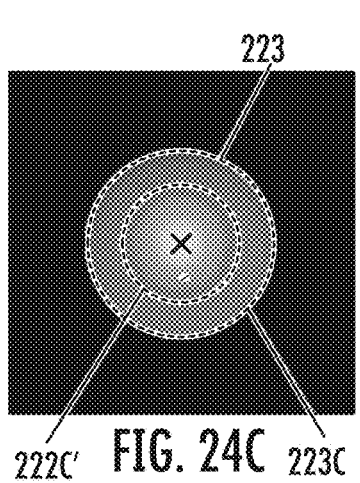
FIG. 24C is a composite image of the same type as FIG. 22C, but derived from the image of FIG. 24A.
Figure 25A:
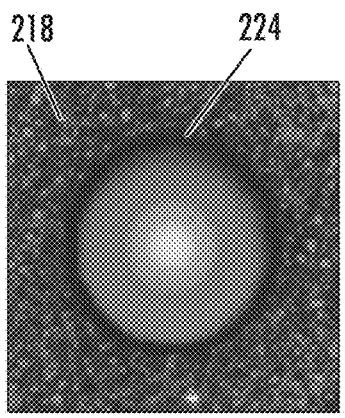
FIG. 25A is a raw image of the same type as FIG. 22A, but including an end portion of an MPO connector centered on still another optical fiber.
Figure 26A:
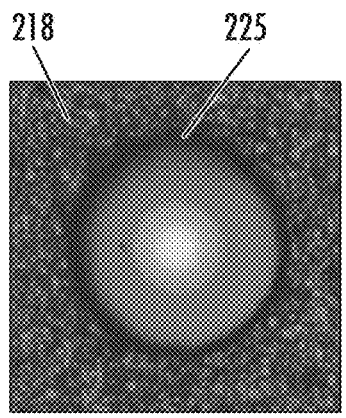
FIG. 26A is a raw image of the same type as FIG. 22A, but including an end portion of an MPO connector centered on yet another optical fiber.
Figure 27A:
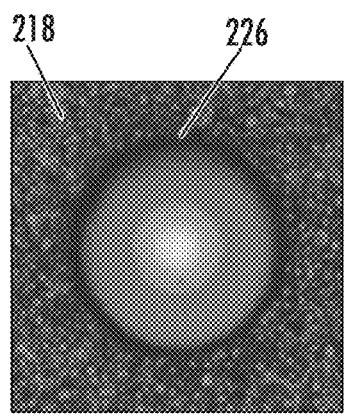
FIG. 27A is a raw image of the same type as FIG. 22A, but including an end portion of an MPO connector centered on yet another optical fiber.
Figure 25B:
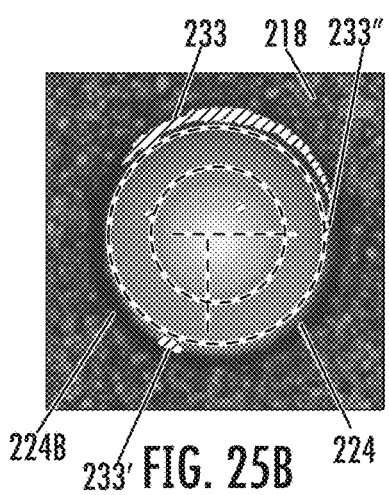
FIG. 25B is a composite image of the same type as FIG. 22B, but derived from the image of FIG. 25A.
Figure 26B:
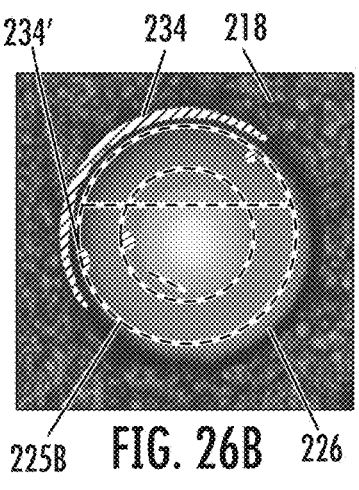
FIG. 26B is a composite image of the same type as FIG. 22B, but derived from the image of FIG. 26A.
Figure 27B:
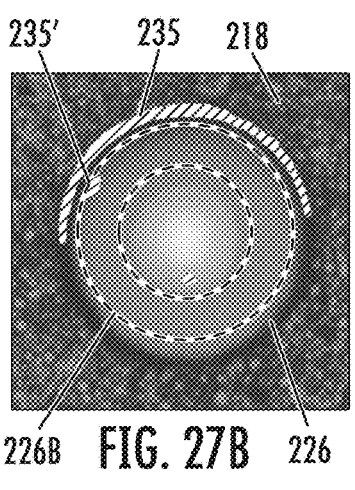
FIG. 27B is a composite image of the same type as FIG. 22B, but derived from the image of FIG. 27A.
Figure 25C:
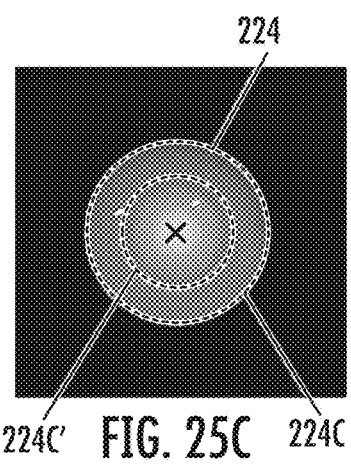
FIG. 25C is a composite image of the same type as FIG. 22C, but derived from the image of FIG. 25A.
Figure 26C:
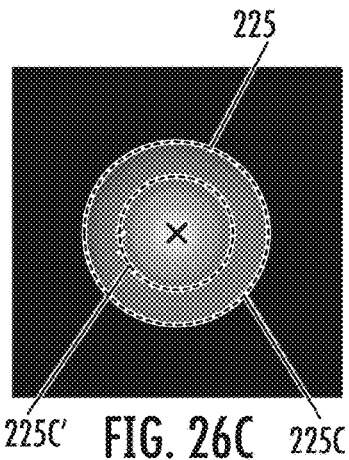
FIG. 26C is a composite image of the same type as FIG. 22C, but derived from the image of FIG. 26A.
Figure 27C:
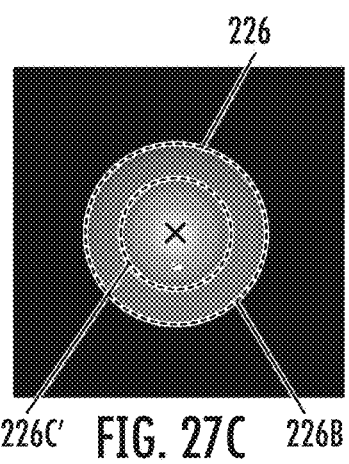
FIG. 27C is a composite image of the same type as FIG. 22C, but derived from the image of FIG. 27A.

One issue that arises in detecting contamination on ends of multi-fiber connectors is fiber pattern identification failure, which may lead to misidentification of contaminants. Such issue may be understood with reference to FIG. 20 and FIGS. 21-1A to 21-6B. FIG. 20 is a raw digital microscope image (obtained with a FastMT-200× microscope, available from FiberQA, LLC, Old Lyme, Conn.) of a central end portion of an MPO connector 195 having a linear array 196 of twelve optical fibers 201-212 arranged along a ferrule surface 198. FIGS. 21-1A, 21-2A, 21-3A, 21-4A, 21-5A, and 21-6A embody composite images of portions of the raw image of FIG. 20 purporting to show six optical fibers 202, 204, 206, 208, 210, and 212, respectively, of the linear array 196 of optical fibers of FIG. 20 and portions of the ferrule surface 198 with superimposed results of contamination detection (depicted with right upwardly-sloping fill or with straight dashed lines) identified from the raw image using contaminant detection software available with the FastMT-200× microscope. FIGS. 22-1B, 22-2B, 22-3B, 22-4B, 22-5B, and 22-6B embody composite images of portions of the raw image of FIG. 20 showing the same six optical fibers 202, 204, 206, 208, 210, 212, respectively, of the linear array 196 of optical fibers of FIG. 20, with masking (removal) of the ferrule surface, and with superimposed results of contamination detection (depicted with right upwardly-sloping fill or with straight dashed lines) identified from the raw image using software implementing method steps according to the present disclosure. Accordingly, each pair of images (FIGS. 21-1A and 21-1B, FIGS. 21-2A and 21-2B, FIGS. 21-3A and 21-3B, FIGS. 21-4A and 21-4B, FIGS. 21-5A and 21-5B, and FIGS. 21-6A and 21-6B) provides a basis for comparing contamination results for the same optical fibers using two different methods. The composite image of FIG. 21-1A is inaccurately centered on the second optical fiber 202, with circular lines showing a detected fiber boundary 202A and a detected core-cladding boundary 202A' generated by the commercial software, and with superimposed contamination depicted with right upwardly-sloping fill. The detected fiber boundary 202A is inset relative to the visible boundary between the optical fiber 202 and the ferrule surface 198, with the detected fiber boundary 202A appearing to be concentric with the visible fiber core. Similar results are shown in FIGS. 21-2A, 21-3A, and 21-4A for the fourth, sixth, and eighth optical fibers 204, 206, 208, respectively. The composite images of each of FIGS. 21-2A, 21-3A, and 21-4A is inaccurately centered on the depicted optical fibers 204, 206, 208, with detected fiber boundaries 204A, 206A, 208A being inset relative to the visible boundaries of the corresponding optical fibers 204, 206, 208, while core-cladding boundaries 204A', 206A', 208A' appear to properly encompass (and to be substantially concentric with) the core of the respective optical fiber 204, 206, 208 in each instance. FIGS. 21-5A and 21-6A show instances of fiber pattern identification failure, in which detected fiber boundaries 210A, 212A are predominantly non-overlapping with visible boundaries of the respective optical fibers 210, 212. The result in each of FIGS. 21-5A and 21-6A is that large contamination regions 213, 214 (depicted with right upwardly-sloping fill and gray shaded regions therein) are returned by the commercial software as purportedly corresponding to the optical fibers 210, 212, when in fact the large contamination regions 213, 214 represent portions of the ferrule surface (i.e., ferrule surface 198 shown in FIG. 20) instead of the optical fibers 210, 212. The commercial software suffered from fiber pattern identification failure, and led to incorrect identification of contamination as overlapping substantially the entire areas bounded by the detected fiber boundaries 210A, 210B.

As shown in FIGS. 21-1B, 21-2B, 21-3B, 21-4B, 21-5B, and 21-6B, methods disclosed herein successfully avoid fiber pattern identification failure. In each instance, detected fiber boundaries 202B, 204B, 206B, 208B, 210B, 212B each correspond closely to the visible boundaries of the corresponding optical fibers 202, 204, 206, 208, 210, 212, while each core-cladding boundary 202B', 204B', 206B', 208B', 210B', 212B' appears to properly encompass (and to be substantially concentric with) the core of the corresponding optical fiber 202, 204, 206, 208, 210, 212.

Separately from fiber pattern identification failure, additional issues that arise in detecting contamination on ends of multi-fiber connectors are fiber location failure and contamination misidentification. Such issues may be understood with reference to FIGS. 22A-27C. FIGS. 22A, 23A, 24A, 25A, 26A and 27A are raw digital microscope images (obtained with a FastMT-200× microscope) of an end portion of an MPO connector having a ferrule surface 218, with each image centered on a different optical fiber 221-226, respectively. FIGS. 22B, 23B, 24B, 25B, 26B, and 27B each embody a composite image including the corresponding raw image (of FIGS. 22A, 23A, 24A, 25A, 26A and 27A, respectively) with superimposed results of contamination detection (depicted with right upwardly-sloping fill or with straight dashed lines) identified from the raw image using contaminant detection software available with the FastMT-200× microscope. FIGS. 22C, 23C, 24C, 25C, 26C, and 27C embody composite images including the corresponding raw image (of FIGS. 22A, 23A, 24A, 25A, 26A and 27A), with masking (removal) of the ferrule surface, and with superimposed results of contamination detection (depicted with right upwardly-sloping fill) identified from the raw image using methods according to the present disclosure. FIGS. 22B, 23B, 24B, 25B, 26B, and 27B each show a detected fiber boundary 221B, 222B, 223B, 224B, 225B, 226B being inset relative to, and being non-concentrically arranged relative to, visible boundaries of the corresponding optical fiber 221-226. Such non-concentricity is also observed between the detected core-cladding boundaries 221B', 222B', 223B', 224B', 225B', 226B' and the visible fiber core of the corresponding optical fiber 221-226. As shown in FIGS. 22B, 23B, 24B, 25B, 26B, and 27B, non-concentricity between a detected fiber boundary 221B, 222B, 223B, 224B, 225B, 226B and the actual boundary of the corresponding fiber 221-226 causes an arc-shaped peripheral portion 230-235 of the ferrule surface 218 proximate to the detected fiber boundary 221B, 222B, 223B, 224B, 225B, 226B to be returned as contamination (evidenced by representation of such areas depicted with right upwardly-sloping fill), and also leads to other instances of spurious detection of contaminants 230', 231', 232', 233', 233", 234', 235' as shown in FIGS. 22B, 23B, 24B, 25B, 26B, and 27B. No such instances of fiber location failure and contamination misidentification are evident in FIGS. 22C, 23C, 24C, 25C, 25C, 26C, and 27C. In each of these figures, detected fiber boundaries 221C, 222C, 223C, 224C, 225C, 226C correspond closely to the visible boundaries of the corresponding optical fibers 221-226, while core-cladding boundaries 221C', 222C', 223C', 224C', 225C', 226C' appear to properly encompass (and to be substantially concentric with) the visible core of the corresponding optical fiber 221-226.

Figure 28A:
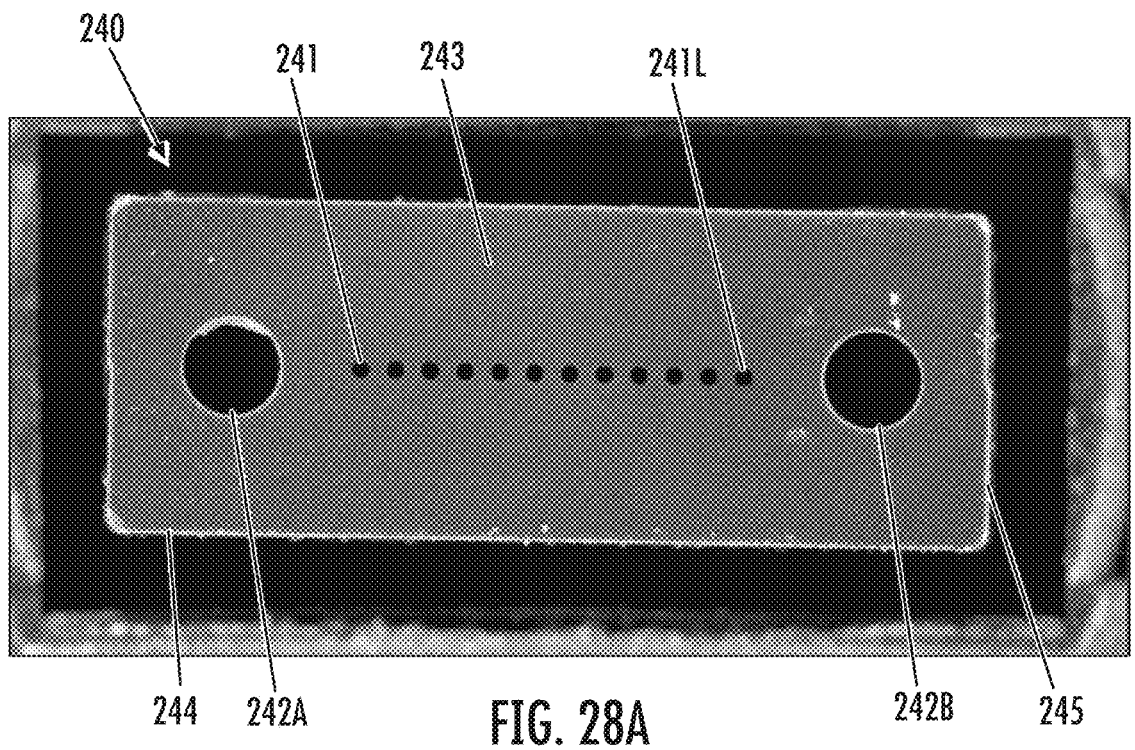
FIG. 28A is a raw digital microscope image obtained with a fourth commercially available microscope (FastMT-80× from FiberQA, LLC) of an end portion of a first female MPO connector.
Figure 28B:
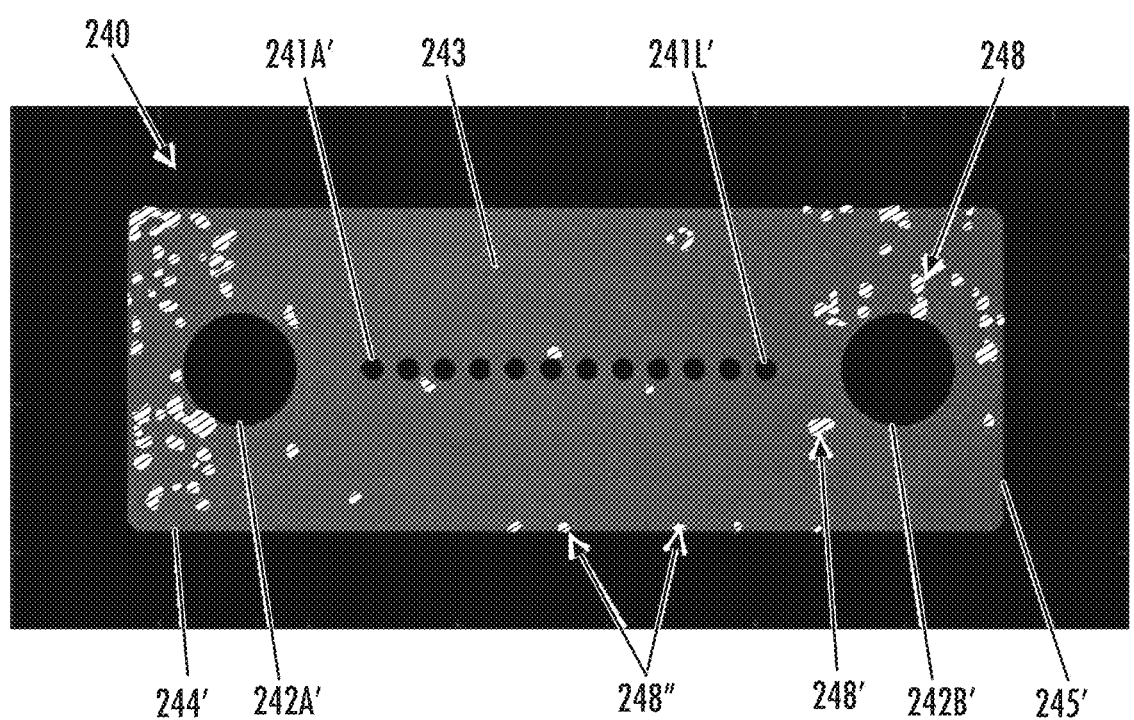
FIG. 28B is a composite image derived from the raw image of FIG. 28A with superimposed results of contamination detection (depicted with right upwardly-sloping fill) identified from the raw image using software implementing method steps according to the present disclosure.
Figure 29A:
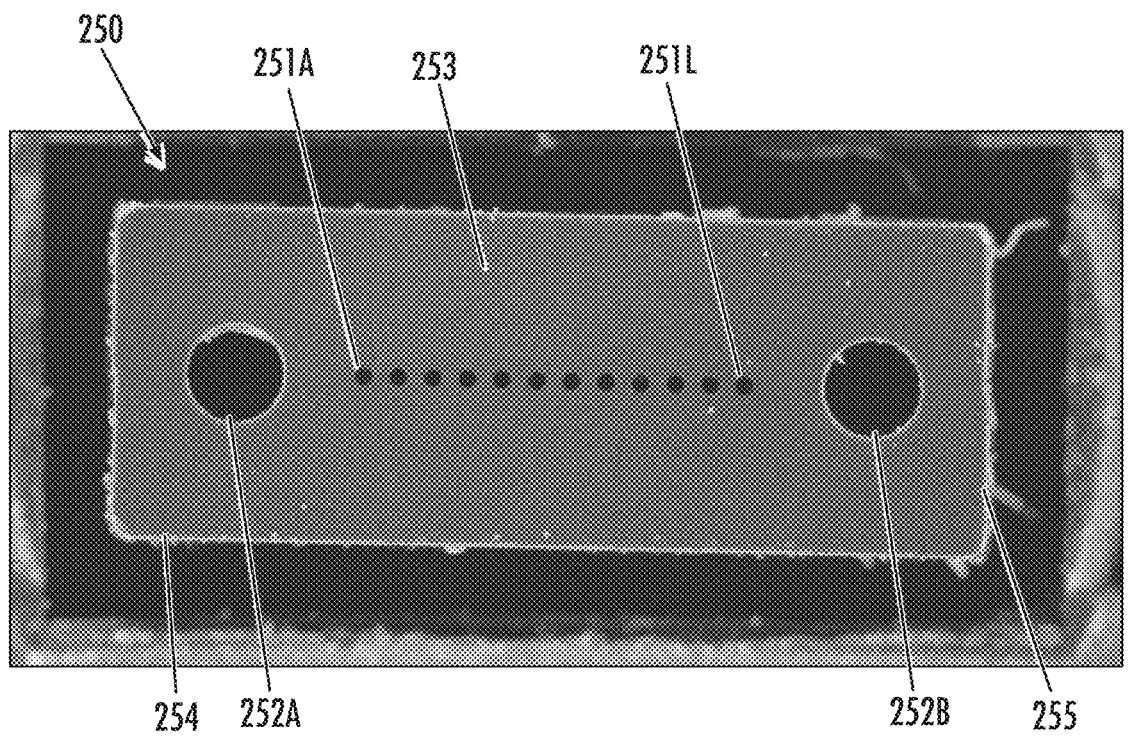
FIG. 29A is a raw digital microscope image of the same type as FIG. 28A, but including an end portion of a second female MPO connector.

As noted previously herein, there is a need for reliably detecting contamination on the entire ferrule surface of a multi-fiber (e.g., MPO) connector. Aspects of the present disclosure address this issue. FIGS. 28A and 29A each provide a raw image of a different female MPO connector 240, 250, while FIGS. 28B and 29B embody composite images derived from the corresponding raw images of FIGS. 28A and 29A, with masking of areas outside the ferrule surface, and with superimposed results of contamination detection (depicted with right upwardly-sloping fill) identified from the raw images using software implementing method steps according to the present disclosure. Likewise, FIGS. 30A and 31A each provide a raw image of a different male MPO connector 260, 270, while FIGS. 30B and 31B embody composite images derived from the corresponding raw images of FIGS. 30A and 31A, with masking of areas outside the ferrule surface, and with superimposed results of contamination detection (depicted with right upwardly-sloping fill) identified from the raw images using software implementing method steps according to the present disclosure.

FIG. 28A is a raw digital microscope image (using a FastMT-80× microscope from FiberQA, LLC) of an end portion of a first female MPO connector 240 having an array of twelve optical fibers 241A-241L and two pinholes 242A, 242B provided on a ferrule end surface 243, which is bounded by a pair of longer walls 244 and a pair of shorter walls 245 that form a rectangular shape. FIG. 28B is a composite image derived from the raw image of FIG. 28A, showing the MPO connector 240 as having been rotated slightly, following masking (i.e., blacking out or removal) to eliminate areas bounded by detected optical fiber boundaries 241A'-241L', areas bounded by detected pinhole boundaries 242A', 242B', and areas beyond the detected wall boundaries 244', 245'. The detected wall boundaries 244', 245' as well as detected pinhole boundaries 242A', 242B' are visibly "cleaner" and appear trimmed of material relative to the walls 244, 245 and pinholes 242A, 242B shown in FIG. 28A. Contamination is depicted with right upwardly-sloping fill in FIG. 28B, including first and second contamination regions 248, 248' proximate to the second pinhole boundary 242B', as well as a third contamination region 248" along a lower detected wall boundary 244'.

Figure 29B:
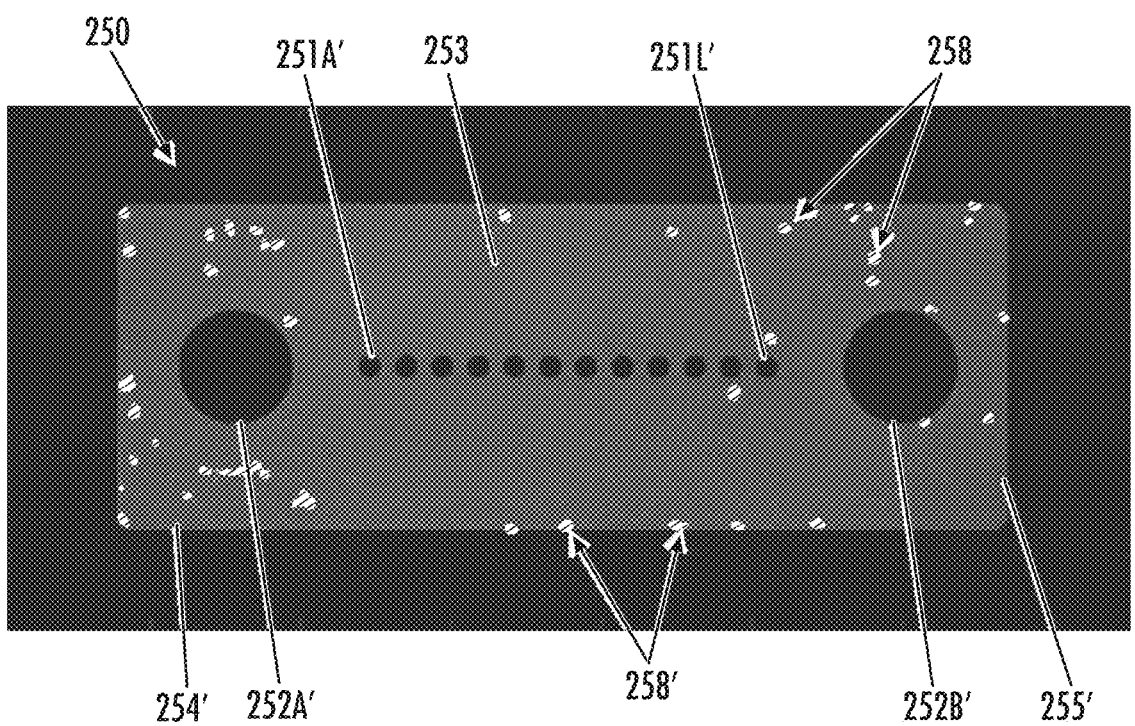
FIG. 29B is a composite image of the same type as FIG. 28B, but derived from the image of FIG. 29A.

FIGS. 29A-29B are similar in character to FIGS. 28A-28B. In particular, FIG. 29A is a raw digital microscope image (again, using a FastMT-80× microscope) of an end portion of a second female MPO connector 250 having an array of twelve optical fibers 251A-251L and two pinholes 252A, 252B provided on a ferrule end surface 253, which is bounded by a pair of longer walls 254 and a pair of shorter walls 255 that form a rectangular shape. FIG. 29B is a composite image derived from the raw image of FIG. 29A, showing the MPO connector 250 as having been rotated slightly, following masking (i.e., blacking out or removal) to eliminate areas bounded by detected optical fiber boundaries 251A'-251L', areas bounded by detected pinhole boundaries 252A', 252B', and areas beyond the detected wall boundaries 254', 255'. Detected wall boundaries 254', 255' as well as detected pinhole boundaries 252A', 252B' are visibly "cleaner" and appear trimmed of material relative to the walls 254, 255 and pinholes 252A, 252B shown in FIG. 29A. Contamination is depicted with right upwardly-sloping fill in FIG. 29B, including a first contamination regions 258 arranged generally above the second detected pinhole boundary 252B', and a second contamination region 258' along a lower detected wall boundary 254' of the connector 250.

Figure 30A:
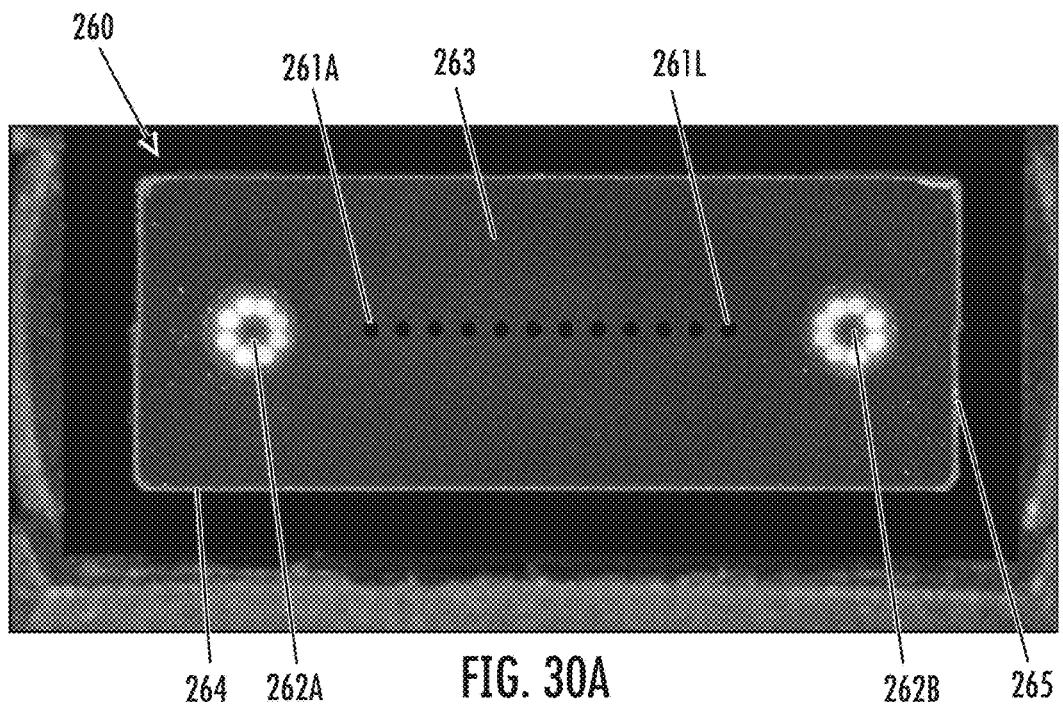
FIG. 30A is a raw digital microscope image of the same type as FIG. 28A, but including an end portion of a first male MPO connector.
Figure 30B:
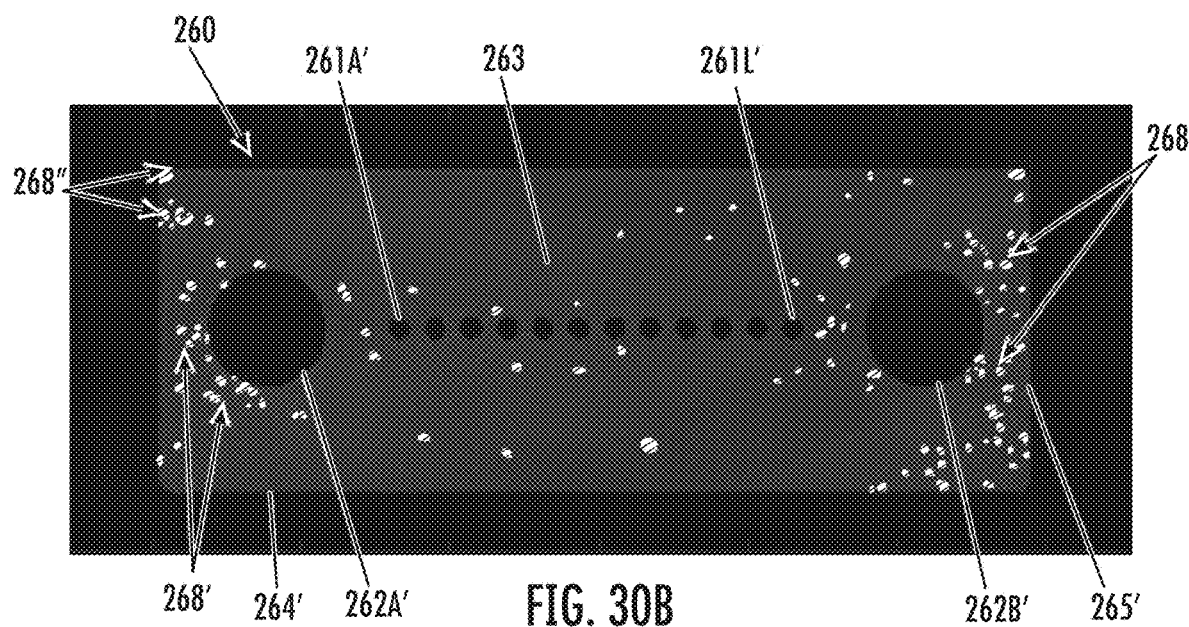
FIG. 30B is a composite image of the same type as FIG. 28B, but derived from the image of FIG. 30A.

FIG. 30A is a raw digital microscope image (again, using a FastMT-80× microscope) of an end portion of a first male MPO connector 260 having an array of twelve optical fibers 261A-261L and two (outwardly protruding) pins 262A, 262B associated with the ferrule end surface 263, which is bounded by a pair of longer walls 264 and a pair of shorter walls 265 that form a rectangular shape. FIG. 30B is a composite image derived from the raw image of FIG. 30A, showing the MPO connector 260 as having been masked to remove areas bounded by detected optical fiber boundaries 261A'-261L', areas bounded by detected pin boundaries 262A', 262B', and areas beyond the detected wall boundaries 264', 265'. Detected wall boundaries 264', 265' as well as detected pin boundaries 262A', 262B' are "cleaner" and appear trimmed of material relative to the walls 264, 265 and pins 262A, 262B shown in FIG. 30A. Contamination is depicted with right upwardly-sloping fill in FIG. 30B, including a first contamination region 268 proximate to the second detected (and masked) pin boundary region 262B', a second contamination region 268' proximate to the first detected (and masked) pin boundary region 262A', and a third contamination region at upper left proximate to a detected lateral boundary 265' of the connector 260.

Figure 31A:
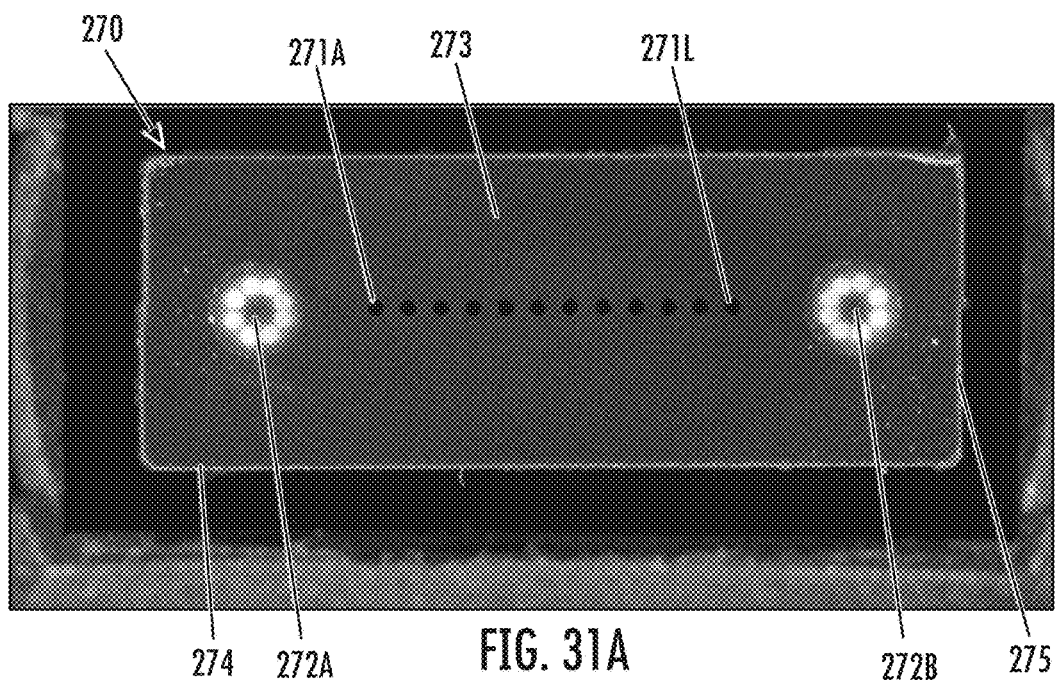
FIG. 31A is a raw digital microscope image of the same type as FIG. 28A, but including an end portion of a second male MPO connector.
Figure 31B:
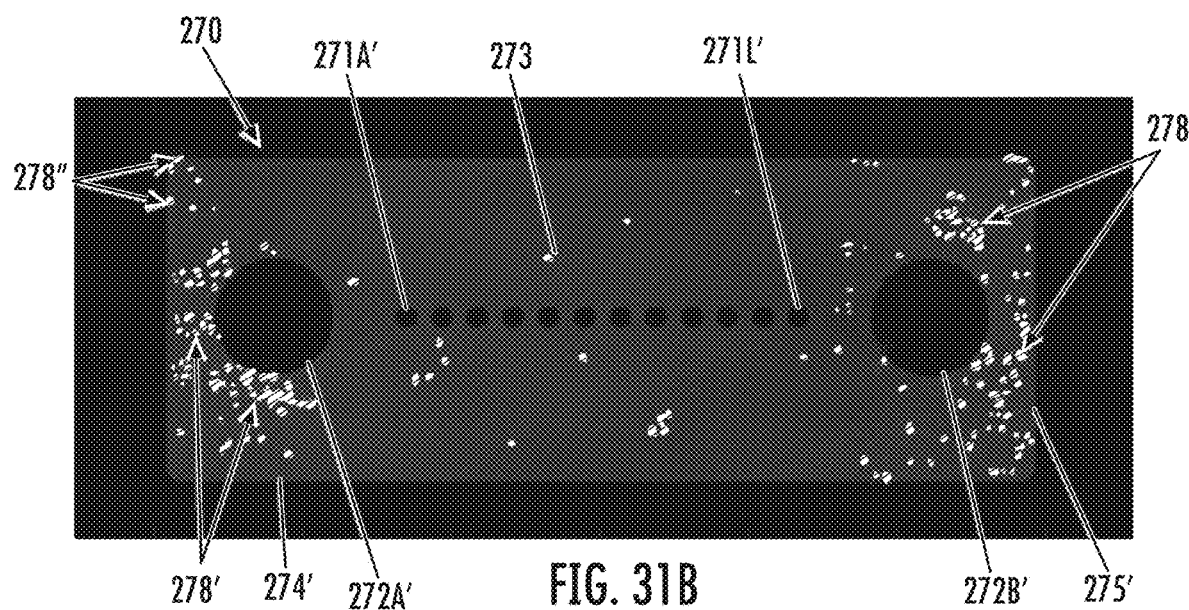
FIG. 31B is a composite image of the same type as FIG. 28B, but derived from the image of FIG. 31A.

FIGS. 31A-31B are similar in character to FIGS. 30A-30B. In particular, FIG. 31A is a raw digital microscope image (again, using a FastMT-80× microscope) of an end portion of a second male MPO connector 270 having an array of twelve optical fibers 271A-271L and two (outwardly protruding) pins 272A, 272B associated with the ferrule end surface 273, which is bounded by a pair of longer walls 274 and a pair of shorter walls 275 that form a rectangular shape. FIG. 31B is a composite image derived from the raw image of FIG. 31A, showing the MPO connector 270 as having been masked to remove areas bounded by detected optical fiber boundaries 271A'-271L', areas bounded by detected pin boundaries 272A', 272B', and areas beyond the detected wall boundaries 274', 275'. Detected wall boundaries 274' and 275' as well as detected pin boundaries 272A', 272B' are "cleaner" and appear trimmed of material relative to the walls 274, 275 and pins 272A, 272B shown in FIG. 31A. Contamination is depicted with right upwardly-sloping fill in FIG. 31B, including a first contamination region 278 proximate to the second detected (and masked) pin boundary region 272B', a second contamination region 278' proximate to the first detected (and masked) pin boundary region 272A', and a third contamination region at upper left proximate to a detected lateral boundary 275' of the connector 270. FIGS. 28A-31B show that methods disclosed herein can detect structures of male and female multi-fiber (e.g., MPO) connectors, mask selected regions (e.g., around optical fibers and pinholes or pins), and detect contaminants over substantially an entire end surface of a ferrule.

Having described different results or effects obtained by utilization of methods disclosed herein relative to method implemented in commercial software, specific routines (i.e., routines of method steps) according to the present disclosure will now be described.

Dynamic Fiber Location Routine 1

A first routine (which may be referred to hereinafter as "dynamic fiber routine 1") is now introduced, with such routine being useful for dynamically identifying the center position of an individual optical fiber from a digital image (e.g., a digital microscope image) of at least a portion of an end of an optical fiber connector in which one or more optical fibers is/are arranged on end surface of a ferrule in the digital image.

Figure 32A:
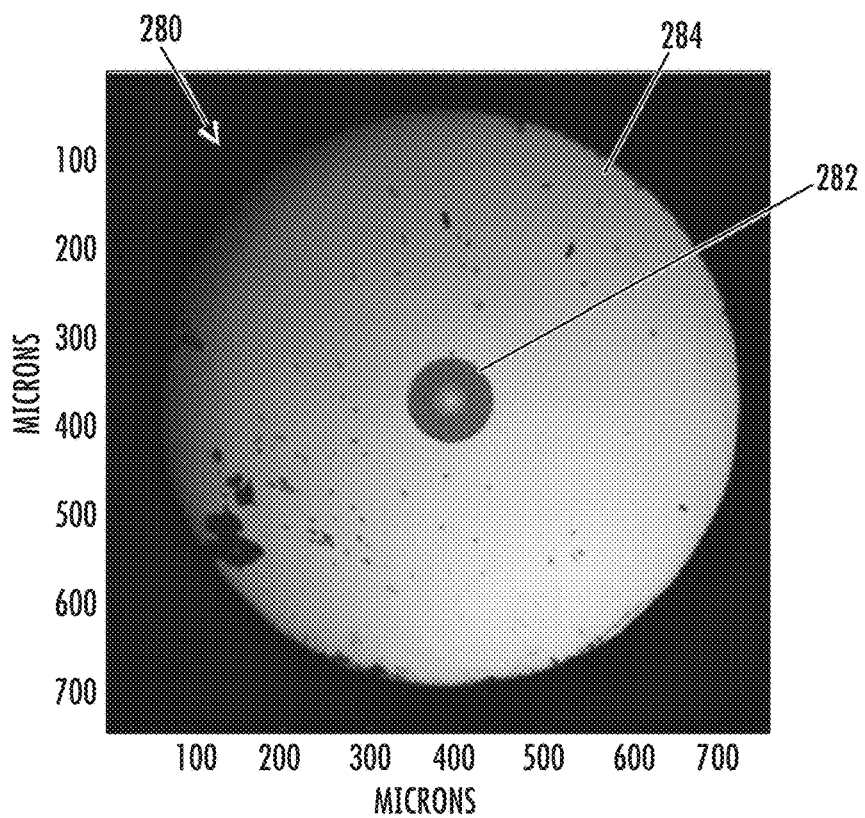
FIG. 32A is a raw digital microscope image obtained with the above-mentioned first microscope of an end portion of an LC connector.
Figure 32B:
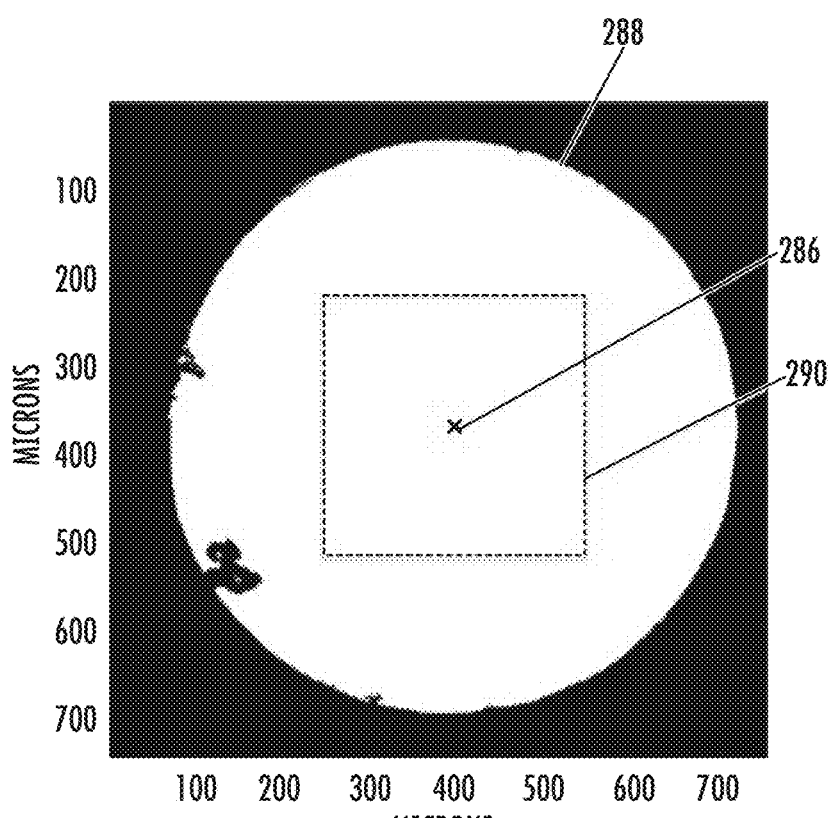
FIGS. 32B-32F provide images derived from the raw image of FIG. 32A, upon execution of steps of a method for dynamically determining the exact center location of the fiber shown in FIG. 32A.
Figure 32C:
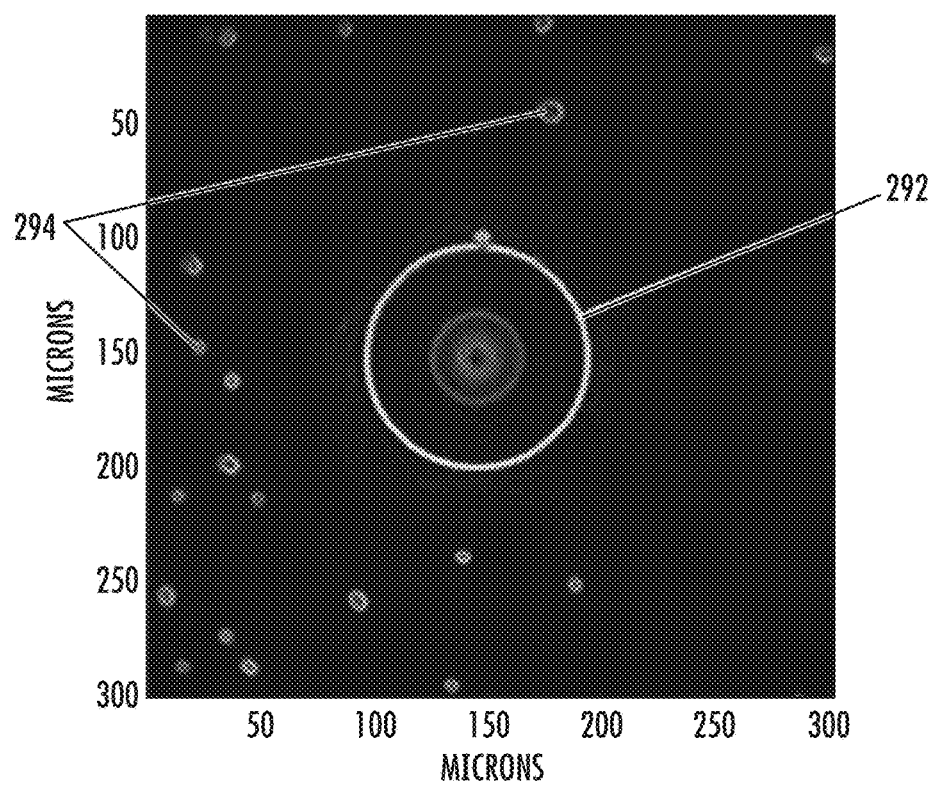
Figure 32D:
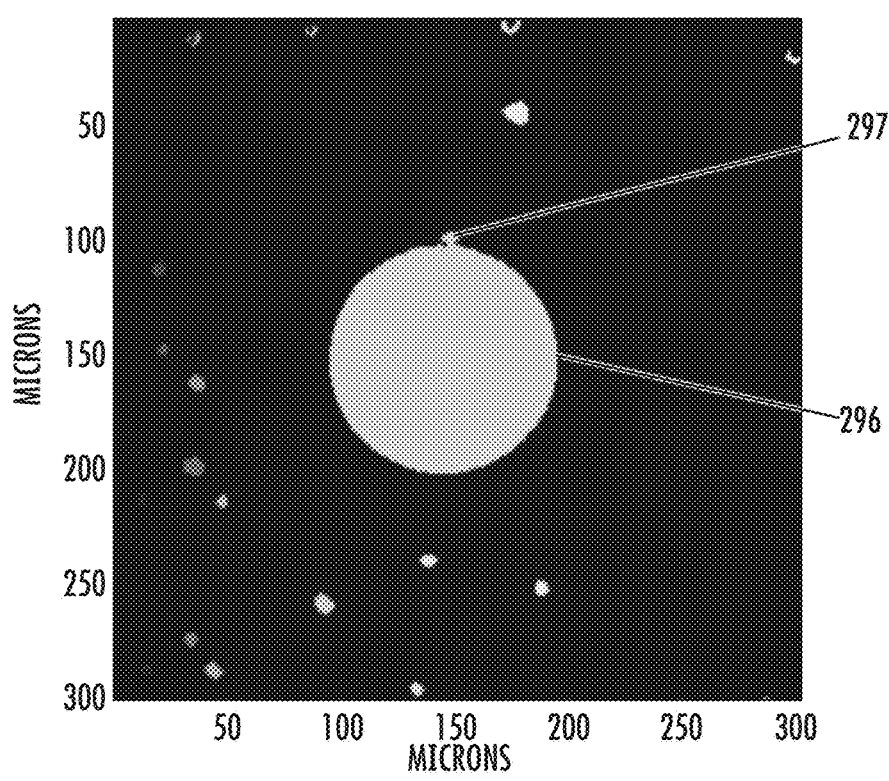
Figure 32E:
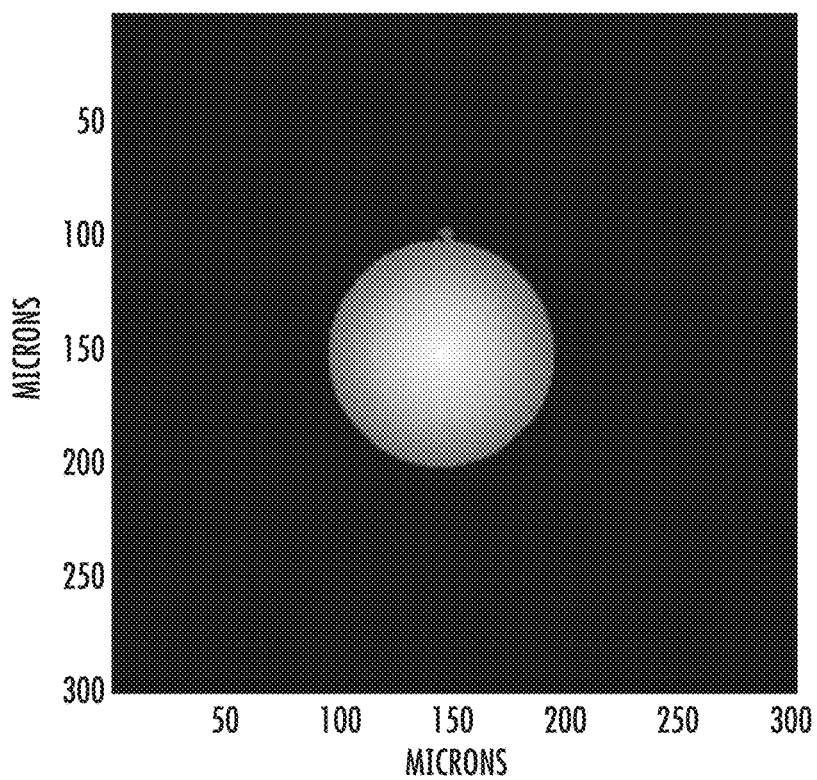
Figure 32F:
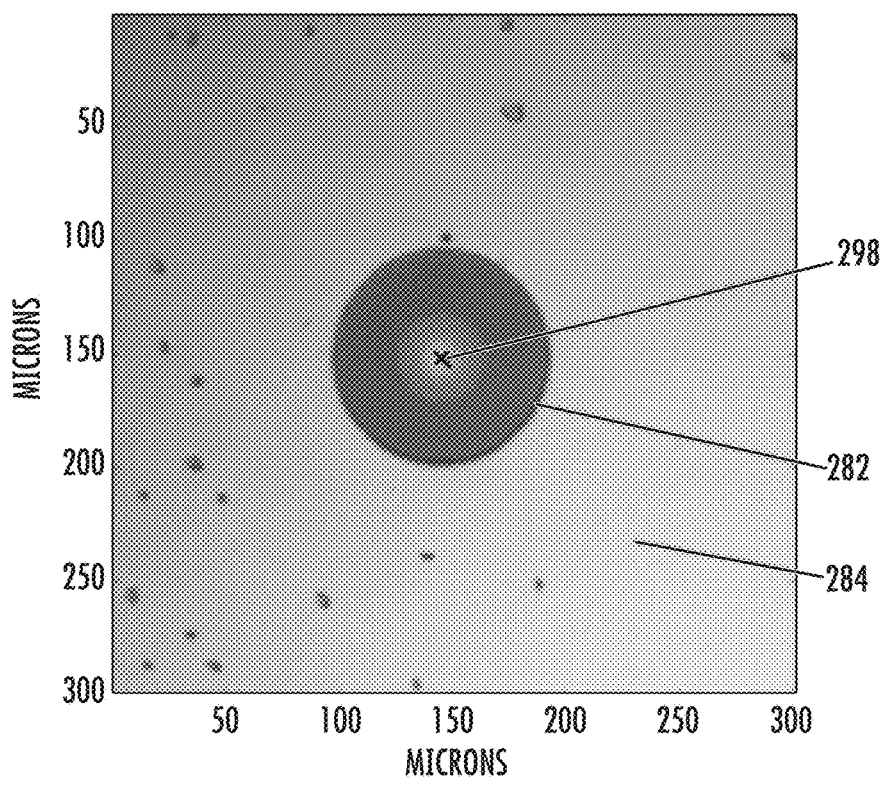

One implementation of the first routine may be understood with reference to FIGS. 32A-32F. FIG. 32A is a grayscale raw digital microscope image (obtained with a DScope ×4 microscope) of an end portion of an LC-type single fiber optical connector 280 (within a frame of 750 microns×750 microns), with the image including an optical fiber 282 surrounded by a ferrule 284. It should be kept in mind that the image is at the magnification level of the microscope (4×), such that distances at this frame size are only one-fourth of what they are in reality. FIG. 32B is a binary image obtained from the raw image of FIG. 32A by application of low level thresholding (in which all pixels having an intensity below a fixed constant are converted to black, and all pixels having an intensity above the fixed constant are converted to white), providing a substantially circular boundary 288 roughly corresponding to the boundary of the ferrule 284 of FIG. 32A. The binary image of FIG. 32B is further overlaid with a centroid marker 286 (with the position calculated based on a circular boundary of the ferrule 284) and a square 290 centered on the centroid marker 286. A square section (having boundaries corresponding to the square 290) of the raw image of FIG. 32A containing the fiber core is extracted, and then a two-dimensional (2D) spatial gradient magnitude of the extracted image is calculated, with the result shown in FIG. 32C. FIG. 32C shows a high intensity boundary 292 corresponding to cladding of the fiber (at a fiber/ferrule interface), and further shows contaminants 294 (e.g., outside the boundary 292). A self-determining threshold value is then derived from the mean plus three standard deviations of the gradient image intensity values. Then, a binary image of rings is created by application of the self-determining threshold value, and such rings are filled to create solid objects (items) that are uniquely identified, as shown in FIG. 32D. The largest single object visible in FIG. 32D is item 296. In order to distinguish the fiber cladding (representing an external boundary of the fiber region) from other (e.g., randomly shaped and sized) contaminants, the area and eccentricity values of all items in FIG. 32D are calculated and then used to identify the fiber cladding region. The item having the greatest area in combination with the least eccentricity (i.e., item 296 shown in FIG. 32D) is likely to be the fiber cladding region. All other, undesired items within the image are then set to zero. It should be noted that at this stage, it is possible that a boundary of the fiber cladding region may be overlapped with a contaminant (e.g., item 297 shown in FIG. 32D) susceptible to being wrongly identified as part of the cladding region. To address this issue and permit accurate identification of the center of the fiber core, a new binary image containing a solid circular region (marginally smaller than the cladding diameter) is created. For every pixel identified as the cladding region (e.g., region 296 in FIG. 32D), the new binary image is centered upon it and then the images (i.e., pixel intensity values at each location) are multiplied together, yielding the image shown in FIG. 32E having highest intensity at the center and intensity that diminishes with radial distance. The summation of the common nonzero pixel values is tabulated along with the x and y pixel location being investigated, and then the maximum summation values and corresponding x and y locations are extracted. These x and y coordinates represent maximum overlap of the cladding binary image (FIG. 32D) and the binary circular image (FIG. 32E), and may be selected as the exact center location 298 of the optical fiber 282 (surrounded by the ferrule 284) as shown in FIG. 32F. If multiple values of x and y coordinates exist, the mean of each of these x and y coordinates is determined, resulting in the final coordinates of the center location of the optical fiber.

The preceding description of FIGS. 32A-32F represents one implementation of the "dynamic fiber routine 1." In certain embodiments, one or more steps described in connection with FIGS. 32A-32F may be modified or omitted. Another implementation of the "dynamic fiber routine 1" is described hereinafter, without reference to specific figures. According to such an implementation, a method for dynamically identifying the center position of an individual optical fiber from a digital image (e.g., a digital microscope image) of at least a portion of an end of an optical fiber connector in which one or more optical fibers is/are arranged on end surface of a ferrule in the digital image includes multiple steps. One step includes extracting a subregion of the digital image to generate a subregion image containing the individual optical fiber. Another step includes performing ensemble normalization of the digital image to generate an ensemble normalized image. A further step includes applying a universal threshold value across the ensemble normalized image to generate a binary image of sub-unity value features embodying a first fiber mask including multiple pixels each having x and y coordinates. Yet another step includes, for each pixel of the first fiber mask, investigating overlap with the first fiber mask by generating a circular binary mask centered on the pixel being investigated and tabulating a summation of nonzero pixel values in common with the first fiber mask as well as x and y coordinate values of the pixel being investigated. A further step includes identifying center coordinates for a fiber core of the individual optical fiber as either (i) x and y coordinates for a single pixel being investigated embodying a maximum summation value or (ii) mean x and y coordinates for multiple pixels being investigated embodying equal maximum summation values.

Dynamic Ferrule Radius Sizing Routine

A second routine (which may be referred to hereinafter as "dynamic ferrule radius sizing routine") is now introduced, with such routine being useful for dynamically determining the radius of the outer circular boundary of a ferrule from a digital image (e.g., a digital microscope image) of at least a portion of an end of an optical fiber connector.

Figure 33A:
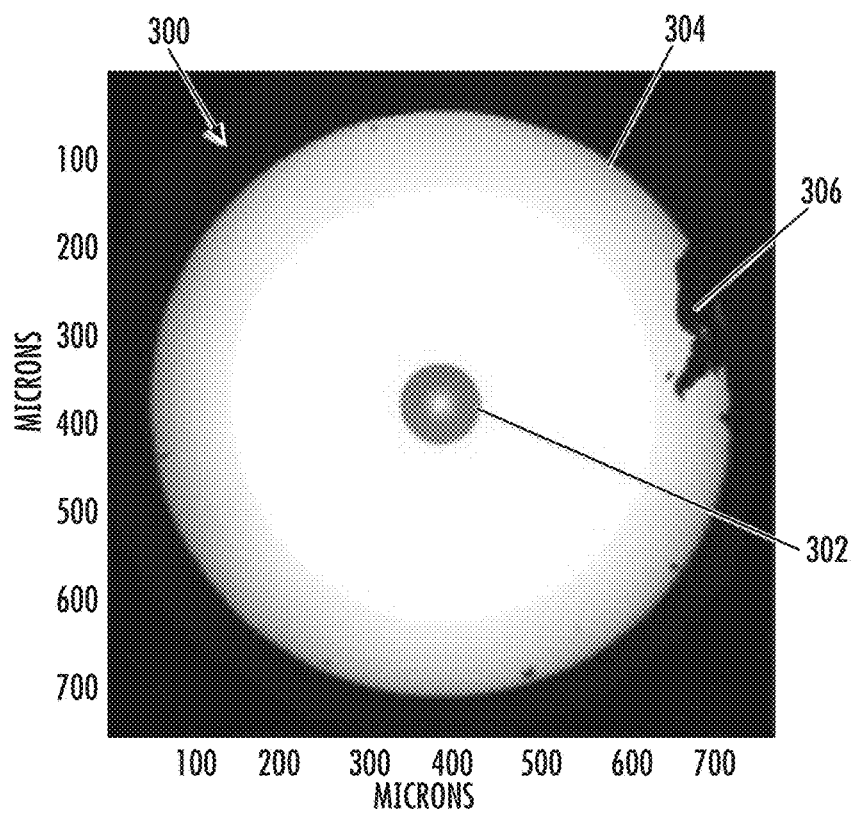
FIG. 33A is a raw digital microscope image obtained with the above-mentioned first microscope of an end portion of another LC connector.
Figure 33B:
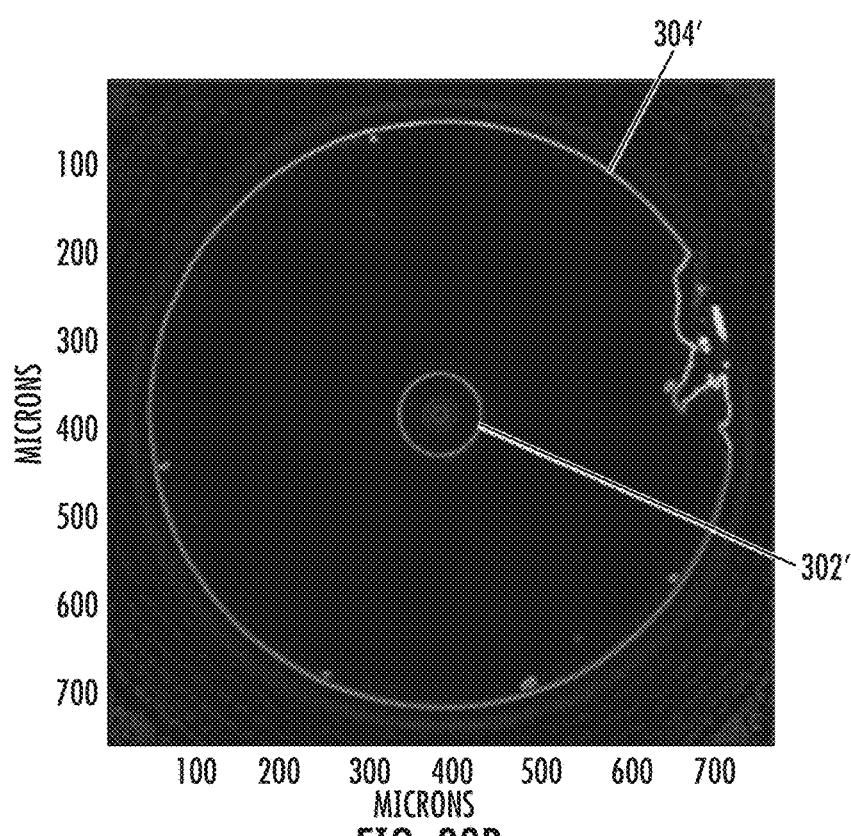
FIGS. 33B-33F provide images derived from the raw image of FIG. 33A, upon execution of steps of a method for dynamically determining the radius of the ferrule outer circular boundary of the connector shown in FIG. 33A, wherein FIG. 33F includes dashed lines around the fiber core, and dashed and dot-dash lines proximate to the ferrule outer boundary.
Figure 33C:
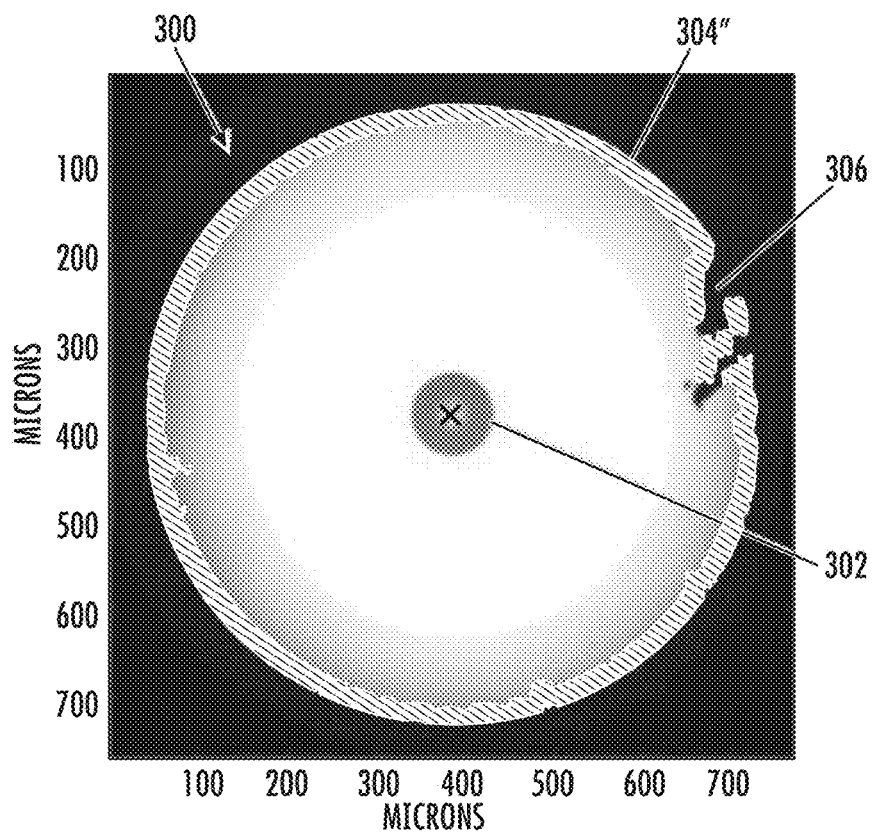

One implementation of the second routine may be understood with reference to FIGS. 33A-33F. FIG. 33A is a raw digital microscope image (obtained with a DScope ×4 microscope) of an end portion of another LC-type single fiber optical connector 300 (within a frame of 750 microns× 750 microns), with the image including an optical fiber 302 surrounded by a ferrule 304, and with a contamination region 306 arranged between the two o'clock and three o'clock positions. Again, it should be kept in mind that the image is at the magnification level of the microscope (4×), such that distances at this frame size are only one-fourth of what they are in reality. The 2D spatial gradient magnitude of the entire image of FIG. 33A is calculated, resulting in the image of FIG. 33B, with representation of the fiber boundary 302' and the ferrule boundary 304'. The region bounded by the fiber boundary 302' is then masked out, and radial profiles are then extracted from the identified fiber core coordinates (e.g., derived by utilization of "dynamic fiber routine 1") to the edge of the image at a multiple intervals (e.g., in certain embodiments, intervals of 1 to 0.1 degree may be used, leading to establishment of 360 to 3600 radial profiles). For each radial profile, the location of maximum pixel gradient value is determined and serves as an estimated radius of the ferrule 304 of FIG. 33A at the selected interval. FIG. 33C shows the raw digital microscope image of the connector of FIG. 33A with a superimposed line having a left upwardly-sloping fill representing maximum gradient locations along radial profiles emanating from the center of the fiber 302. Notably, the maximum gradient location (represented as line having a left upwardly-sloping fill) proximate to the contamination region 306 is inset significantly relative to the maximum gradient locations for the remaining portions of the connector 300.

Figure 33D:
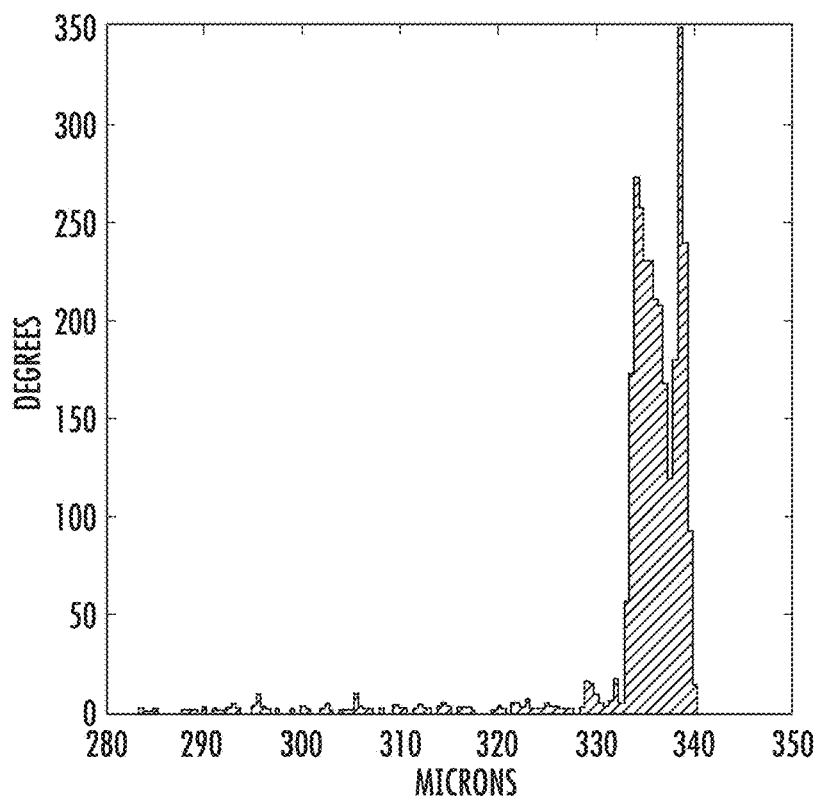
Figure 33E:
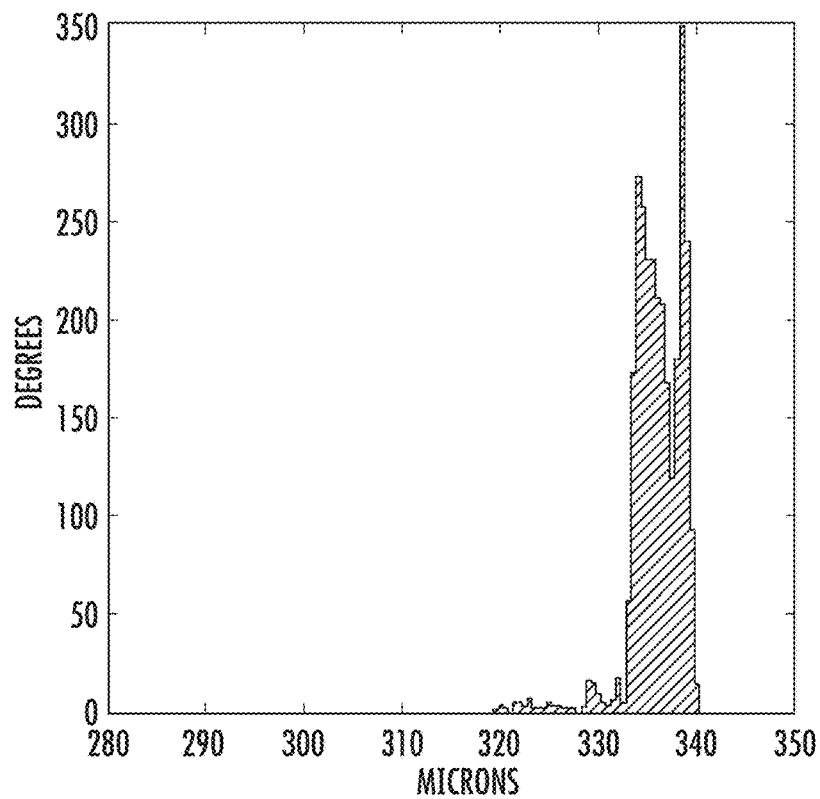
Figure 33F:
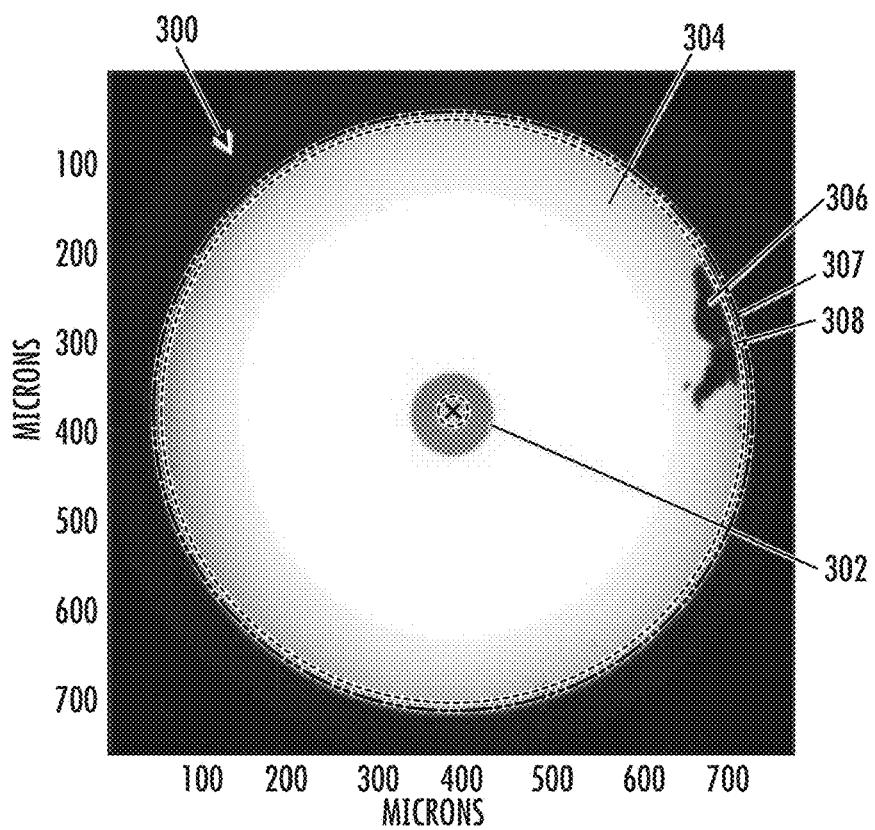

For a ferrule with no contamination, the location of maximum pixel gradient will occur where the ferrule ends; accordingly, a very narrow distribution of radial sizes will be produced where the variance is due to solely eccentricity of the ferrule. With contamination present (such as the contamination region 306 shown in FIG. 33C), and if the intensity gradient at the edge of the contaminant is greater than that at the edge of the ferrule, the radius estimate will incorrectly represent the distance from the fiber center to the contaminant edge. These incorrect estimates will always be less than correct estimates for the remainder of the connector, since contaminants cannot extend beyond the ferrule edge (i.e., contaminants cannot be located farther from the fiber core than the ferrule edge). FIG. 33D is a histogram showing detected estimated radius values (i.e., maximum gradient values) as a function of angular position, corresponding to the line having left upwardly-sloping fill shown along peripheral portions of FIG. 33C. As shown in FIG. 33D, a majority of peak radius values appear to be in a range of from about 333 to about 337 microns, with a much smaller number of radius values appearing to be smaller in size. In order to improve the ferrule radius estimate, this data may be filtered statistically. First, the mean and standard deviation of the radial estimates are determined. Since correct radial estimates are necessarily larger than radial estimates affected by contamination, the smaller radial estimate values are to be excluded from the data set; accordingly, radial estimate values less than the mean minus two standard deviations from the mean (i.e., mean—2σ) are excluded. Following such exclusion, the mean and standard deviation are recalculated, and the process repeated until no values fall outside the range of mean minus two standard deviations from the mean. FIG. 33E is a histogram showing detected estimated radius values (i.e., maximum gradient values) as a function of angular position, following statistical filtering. The mean of the filtered data is then determined to be a calculated radius of the ferrule (i.e., the ferrule 304 shown in FIG. 33A). It is noted that at least an outer portion of the ferrule 304 shown in FIG. 33A has convex surface (due to polishing), such that boundaries of the ferrule 304 appear darker in shading than interior portions thereof, due to illumination roll-off during the imaging process. In order to account for uncertainty in the ferrule boundary due to illumination roll-off, a buffer of approximately 15 microns (about 10 pixels) is subtracted from the calculated radius to yield the returned (final) radius of the ferrule. FIG. 33F includes the raw digital microscope image of FIG. 33A, with superimposed representations of calculated radius 307 (illustrated as a dot-dash line) and final radius 308 (illustrated as a curved dashed line displaced radially inward or inset relative to the dot-dash line) of the ferrule 304 at the magnification level associated with the images (4×).

The preceding description of FIGS. 33A-33F represents one implementation of the "dynamic ferrule radius sizing routine." In certain embodiments, one or more steps described in connection with FIGS. 32A-32F may be modified or omitted. Another implementation of the "dynamic ferrule radius sizing routine" is described hereinafter, without reference to specific figures. According to such an implementation, a method for determining a radius of a ferrule outer circular boundary from a digital image of at least a portion of an end of an optical fiber connector in which a fiber core is surrounded by fiber cladding and by a ferrule having a convex end surface includes multiple steps. One step includes calculating two dimensional spatial gradient magnitude values of the digital image to identify an outer high intensity boundary. Another step includes extracting a radial profile from a center location of the fiber core to the outer high intensity boundary at each angular interval of a plurality of angular intervals. Yet another step includes, for each radial profile, identifying a location of maximum two dimensional spatial gradient magnitude, and identifying a distance from said location to the center location to provide an estimated ferrule radius value. Still another step includes statistically filtering the estimated ferrule radius values to exclude all estimated ferrule radius values less than a mean estimated ferrule radius value minus two standard deviations from the mean estimated ferrule radius value, and computing a statistically filtered estimated ferrule radius value. A further step includes determining a radius of the ferrule outer circular boundary from a difference between the statistically filtered estimated ferrule radius value and a selected distance if necessary to account for illumination roll-off proximate to the ferrule outer circular boundary. In certain embodiments, angular intervals for extraction of radial profiles may be spaced no more than about 1 degree apart (or a different range as specified herein). In certain embodiments, the method may further include defining a mask image representing the fiber core and fiber cladding of the optical fiber, and removing the mask image from the digital image prior to the extraction of radial profiles.

Dynamic Ferrule Boundary Determination Routine 1

A third routine (which may be referred to hereinafter as "dynamic ferrule boundary determination routine 1") is now introduced, with such routine being useful for dynamically determining a non-circular, non-concentric ferrule outer boundary from a digital image of at least a portion of an end of an optical fiber connector (e.g., an angled physical contact polished connector) in which a fiber core is surrounded by fiber cladding and by a ferrule having an end surface non-perpendicular to a longitudinal axis of the fiber core.

Figure 34A:
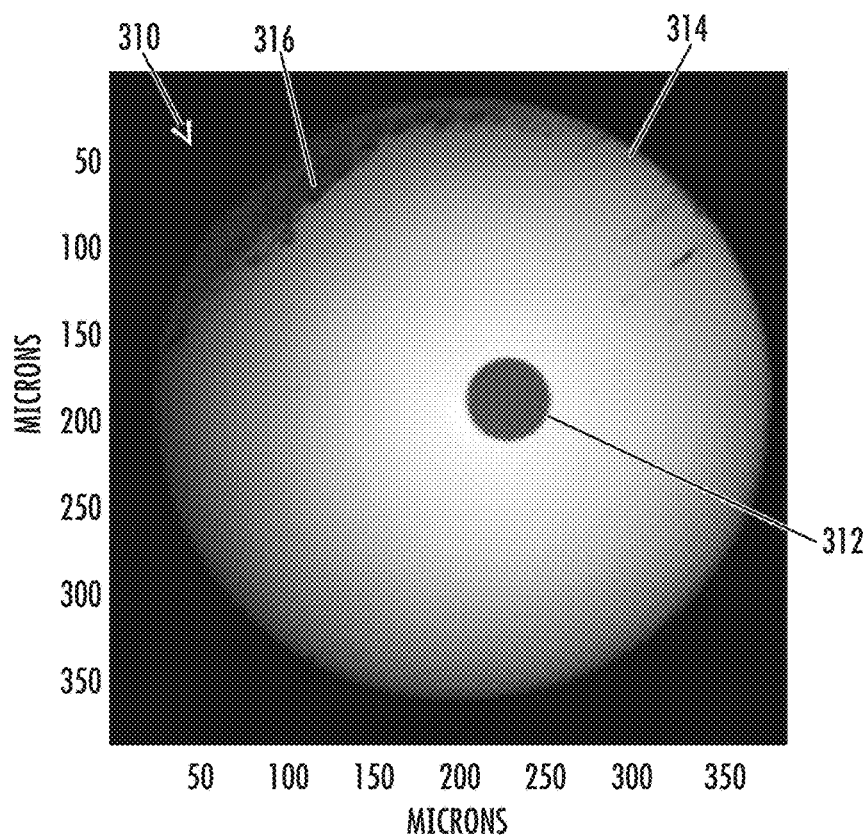
FIG. 34A is a raw digital microscope image obtained with the above-mentioned first microscope of an end portion of an LC-APC connector.
Figure 34B:
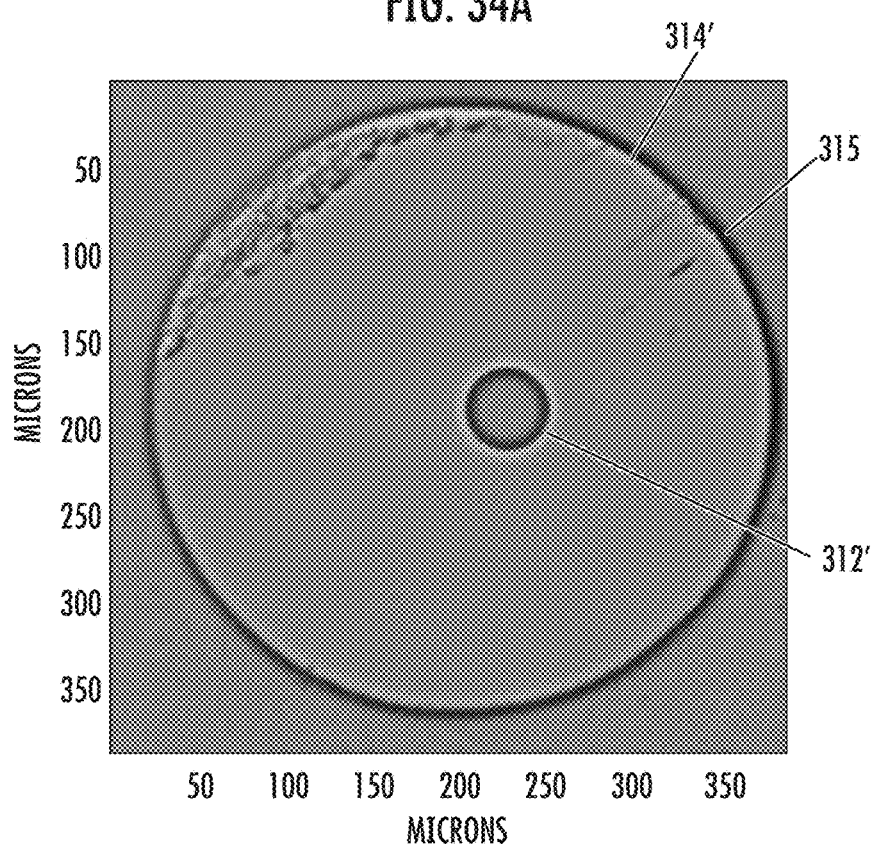
FIGS. 34B-34D and 34G-34H provide images derived from the raw image of FIG. 34A, upon execution of steps of a method for dynamically determining the non-circular, non-concentric ferrule outer circular boundary of the connector shown in FIG. 34A, wherein FIG. 34D includes superimposed left upwardly-sloping fill outside the ferrule boundary, FIG. 34G includes dashed and dot-dash lines proximate to the ferrule outer boundary, and FIG. 34H includes superimposed right upwardly-sloping fill denoting contamination regions.
Figure 34C:
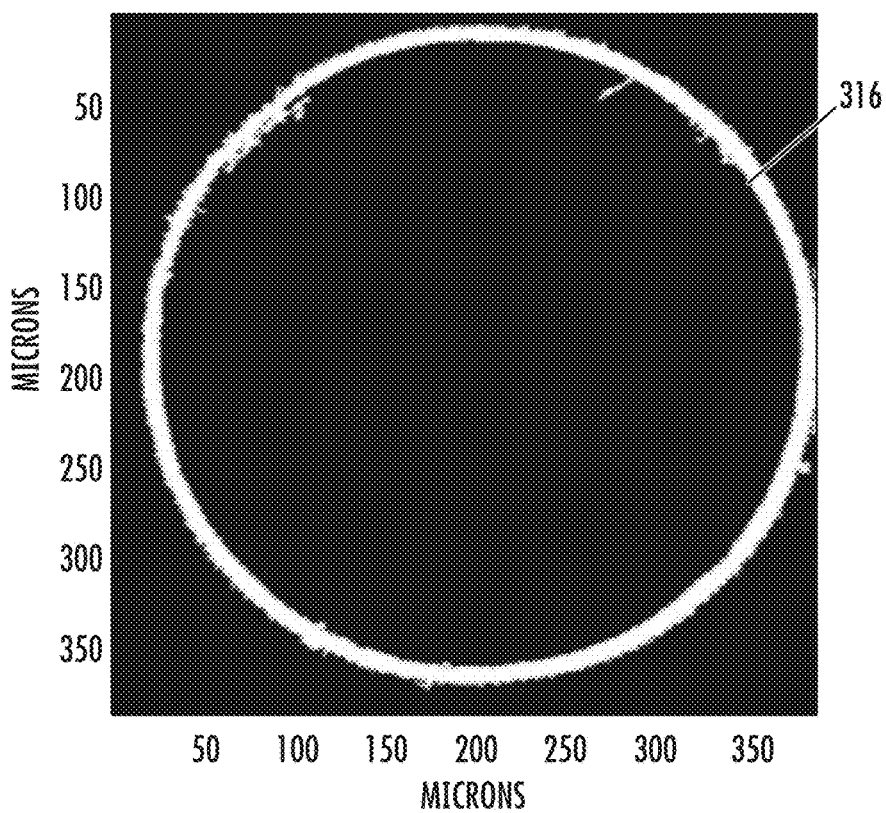
Figure 34D:
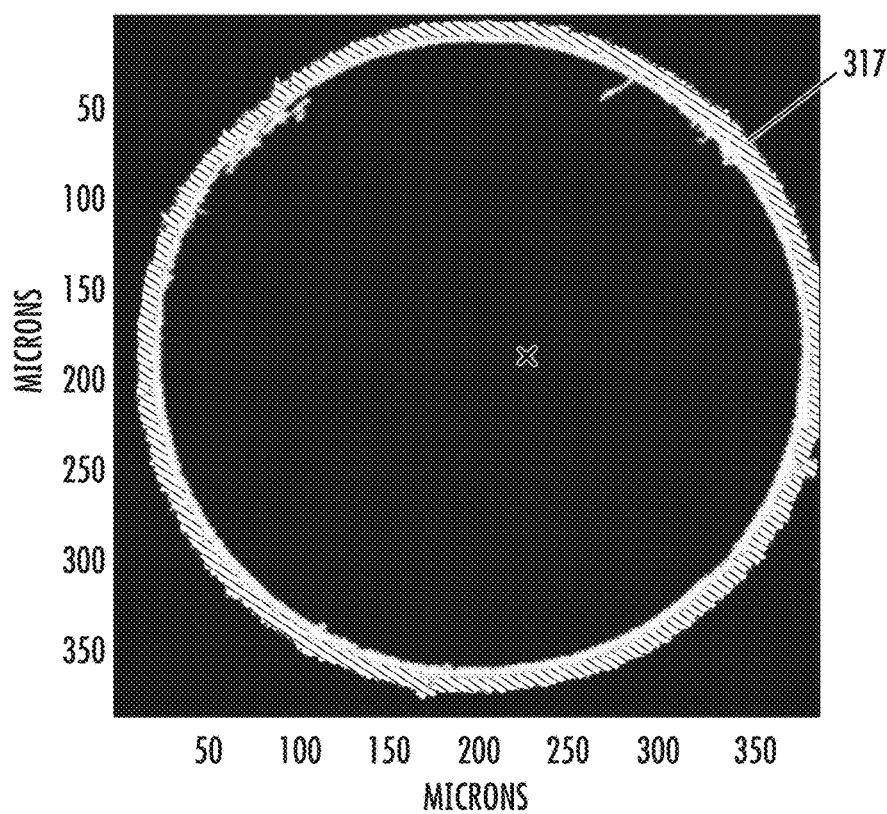
Figure 34E:
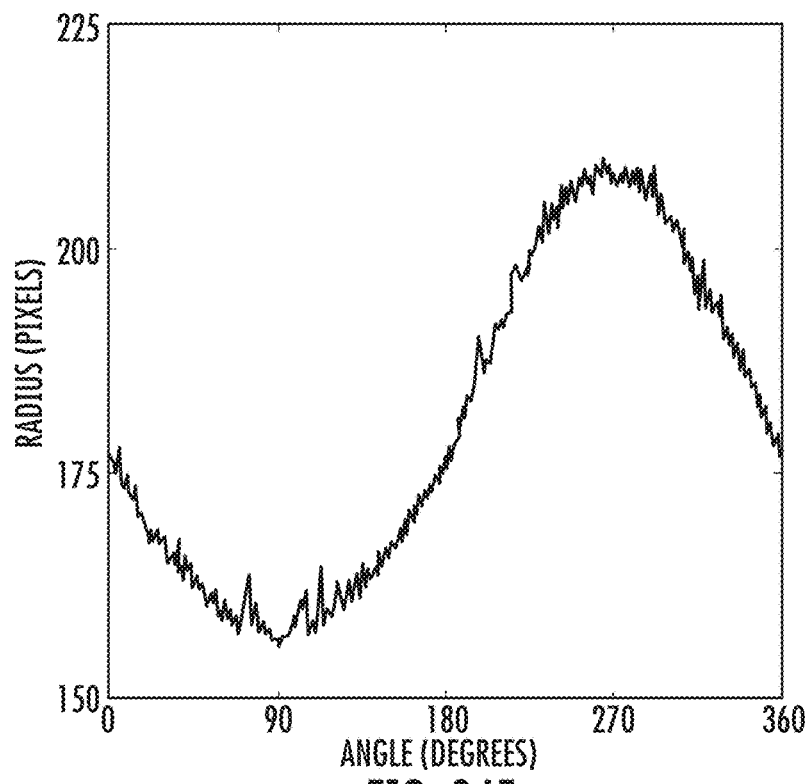
FIG. 34E is a plot of radius (in pixels) versus angle (in degrees) derived from the raw image of FIG. 34A, embodying information useful in performing the method for dynamically determining the non-circular, non-concentric ferrule outer circular boundary of the connector shown in FIG. 34A.
Figure 34F:
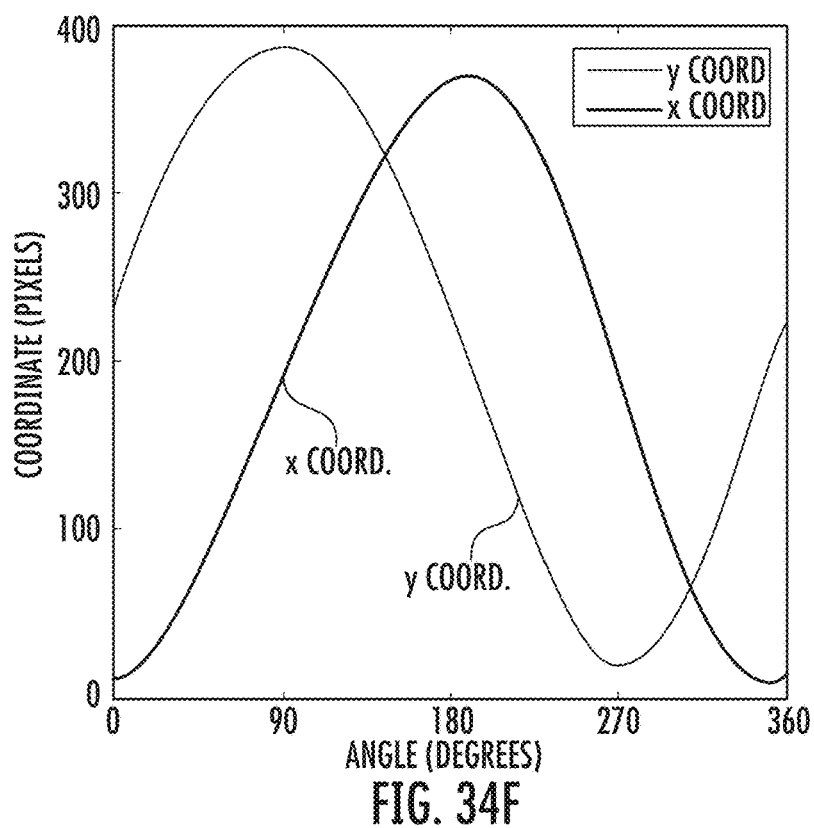
FIG. 34F provides superimposed plots of y coordinate and x coordinate versus angle derived from the raw image of FIG. 34A, embodying information useful in performing the method for dynamically determining the non-circular, non-concentric ferrule outer circular boundary of the connector shown in FIG. 34A.
Figure 34G:
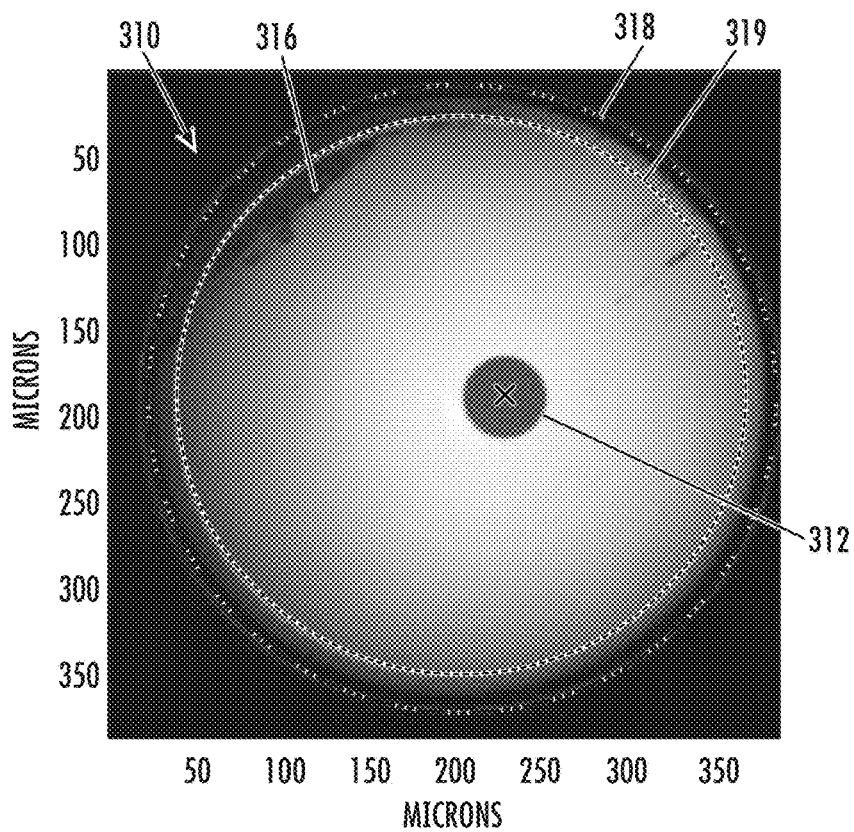
Figure 34H:
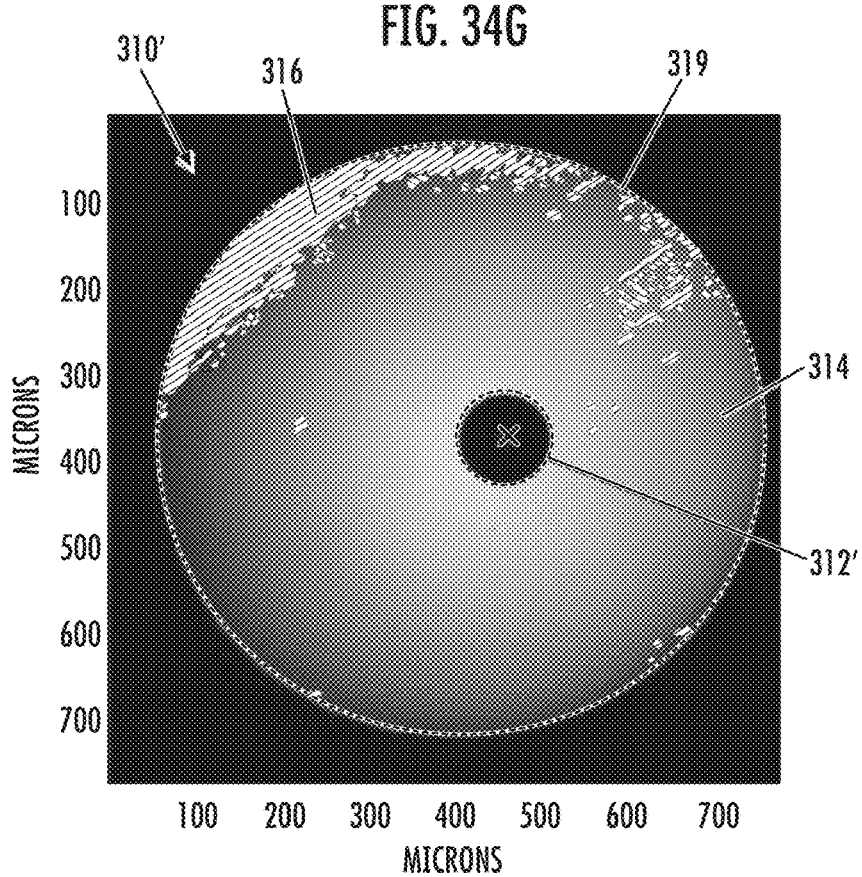

One implementation of the second routine may be understood with reference to FIGS. 34A-34G. FIG. 34A is a raw digital microscope image (obtained with a DScope ×4 microscope) of an end portion of an APC polished LC-type (LC-APC) optical fiber connector 310 within a frame of 375 microns×375 microns. Again, it should be kept in mind that the image is at the magnification level of the microscope (4×), such that distances at this frame size are only one-fourth of what they are in reality. The image includes an optical fiber 312 surrounded by a ferrule 314, and with a contamination region 316 arranged between the nine o'clock and twelve o'clock positions. Due to angled physical contact polishing, the optical fiber 312 appears offset relative to a physical center of the ferrule 314. To initiate determination of the ferrule boundary, the raw image of FIG. 34A is normalized by 2D ensemble averaging to yield the ensemble averaged image shown in FIG. 34B, depicting a sub-unit value ring 315 around an outer boundary 314' of the ferrule. Thresholding is used to create a binary image of sub-unity value features, as shown in FIG. 34C, which depicts a single large circular feature 316. This single large circular feature 316 is identified (as always constituting the ferrule boundary ring), and extracted. From the pre-determined fiber core center, radial profiles are extracted in multiple angular increments (e.g., increments in a range of from 0.1 to 1 degree, or about 0.5 degree). The furthest non-zero pixel value along each profile is determined and tabulated. For each radial profile, the location of maximum non-zero pixel value is determined and serves an estimated radius of the ferrule at the selected interval. FIG. 34D shows the image of FIG. 34C, with an overlaid plot (depicted with left upwardly-sloping fill) of maximum non-zero pixel value 317 for each radial profile. To remove outliers, the maximum non-zero pixel values of the radial profiles are median filtered. FIG. 34E is a plot of radius versus angle for the median filtered radial profiles. Thereafter, the x and y coordinates of the filtered radius values are separately fitted with a polynomial function, as shown in the plots of individual axis (x and y) coordinates versus angle depicted in FIG. 34F. The polynomial functions are then used to determine a calculated ferrule outer boundary. The radial extent of each position is then reduced (i.e., inset) by 10 pixels to yield a final or determined ferrule outer boundary, to exclude the severe signal reduction at the boundary of the polished ferrule surface and account for uncertainty in the ferrule boundary due to illumination roll-off. This non-circular, non-concentric boundary is used as the outer ferrule boundary and facilitates contamination detection. FIG. 34G includes the raw digital microscope image of FIG. 34A, with superimposed representations of the calculated ferrule outer boundary 318 (depicted as a dot-dot-dash line) and the determined (or final) ferrule outer boundary 319 (depicted as a dashed line). FIG. 34H shows identified contamination 316 (depicted with right or left upwardly-sloping fill) on a representation of the connector 310' in which the fiber region 312' has been masked, and in which all portions of the ferrule 314 beyond the determined ferrule outer boundary 319 have also been masked.

The preceding description of FIGS. 34A-34H represents one implementation of the "dynamic ferrule boundary determination routine 1." In certain embodiments, one or more steps described in connection with FIGS. 34A-34H may be modified or omitted. Another implementation of the "dynamic ferrule radius sizing routine" is described hereinafter, without reference to specific figures. According to such an implementation, a method for determining a ferrule outer boundary from a digital image of at least a portion of an end of an optical fiber connector (e.g., an APC polished connector) in which a fiber core is surrounded by fiber cladding and by a ferrule having an end surface non-perpendicular to a longitudinal axis of the fiber core. One step includes performing ensemble normalization of the digital image to generate an ensemble normalized image. Another step includes applying a universal threshold value across the ensemble normalized image to generate a binary image of sub-unity value features including an outer high intensity boundary. Another step includes removing the largest single feature within an interior of the binary image. A further step includes extracting a radial profile from a fiber core center position to the outer high intensity boundary at each angular interval of a plurality of angular intervals, yielding a plurality of radial profiles for the plurality of angular intervals. Still another step includes, for each radial profile, identifying a radius value for a non-zero pixel value farthest from the fiber core center position, yielding a plurality of radius values for the plurality of radial profiles. Another step includes median filtering the plurality of radius values to remove outlying radius values and to yield median filtered radius values. A further step includes polynomially fitting x coordinates of the median filtered radius values, and polynomially fitting y coordinates of the median filtered radius values. The method further comprises identifying an estimated ferrule outer boundary from corresponding pairs of polynomially fitted x and y coordinates. Another step includes reducing a radial distance from each pair of polynomially fitted x and y coordinates to the fiber core center position by a selected value to yield a plurality of pairs of inset fitted x and y coordinates corresponding to coordinates of the ferrule outer boundary to facilitate contaminant detection.

Dynamic Fiber Pattern Location Routine 1

A fourth routine (which may be referred to hereinafter as "dynamic fiber pattern location routine 1") is now introduced, with such routine being useful for dynamically determining position of multiple (e.g., 12 or more) fibers in a linear array.

Figure 35A:
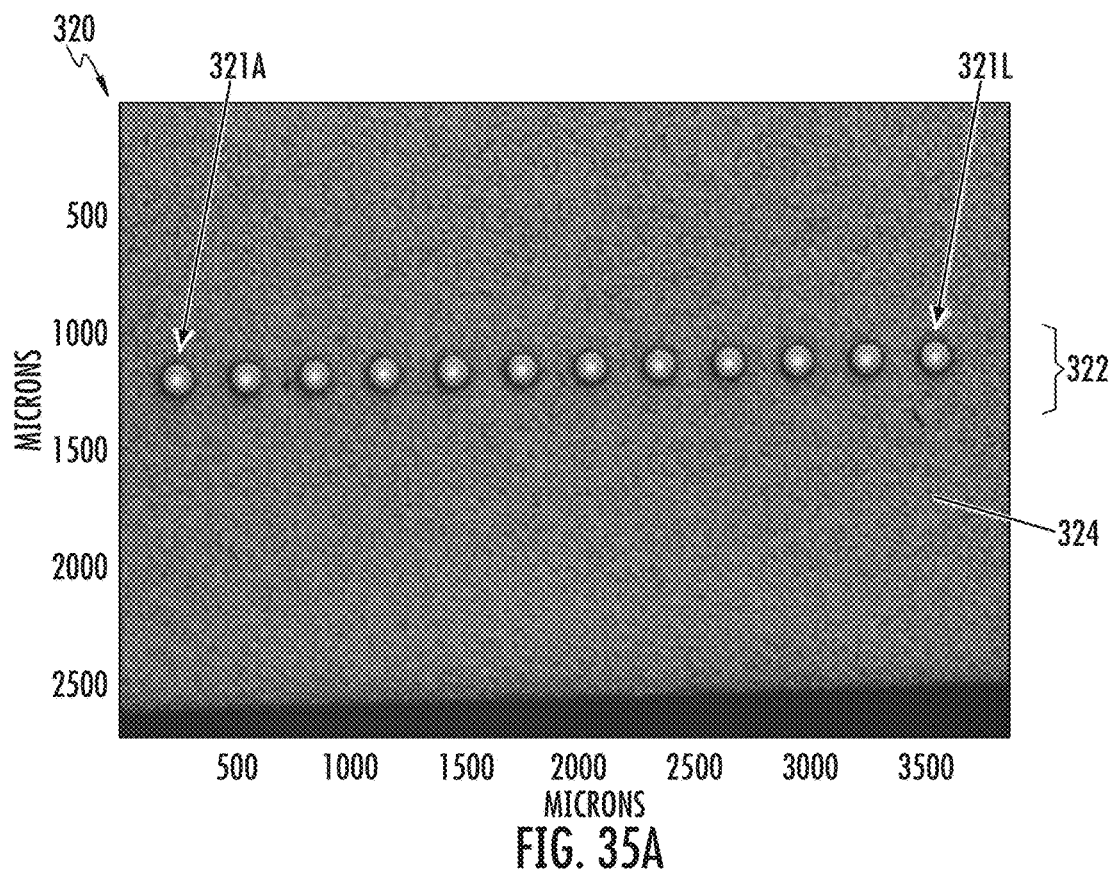
FIG. 35A is a raw digital microscope image obtained with the above-mentioned third microscope (FastMT-200×) of an end portion of an MPO connector including all twelve fibers thereof within the image.
Figure 35B:
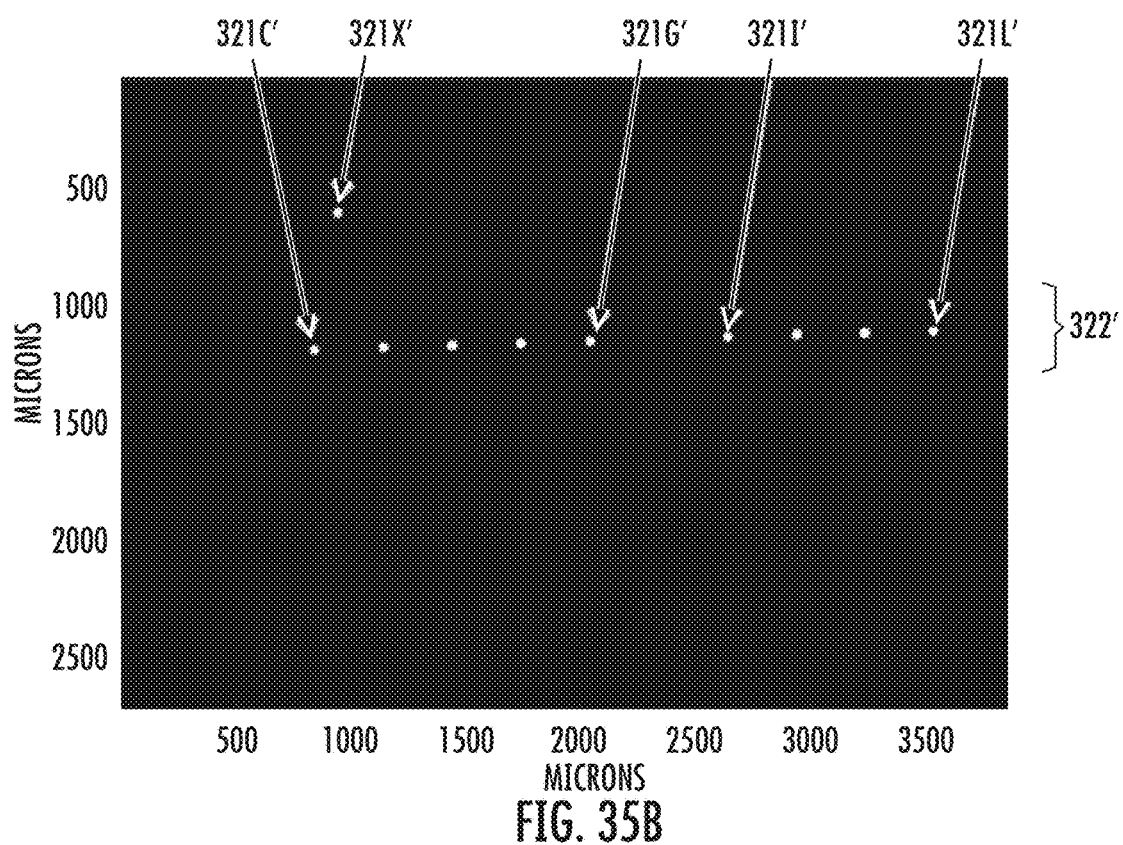
FIGS. 35B-35D provide images derived from the raw image of FIG. 35A, upon execution of steps of a method for dynamically determining the position of multiple (e.g., twelve) optical fibers having respective ends arranged in a linear pattern in the connector shown in FIG. 35A.
Figure 35C:
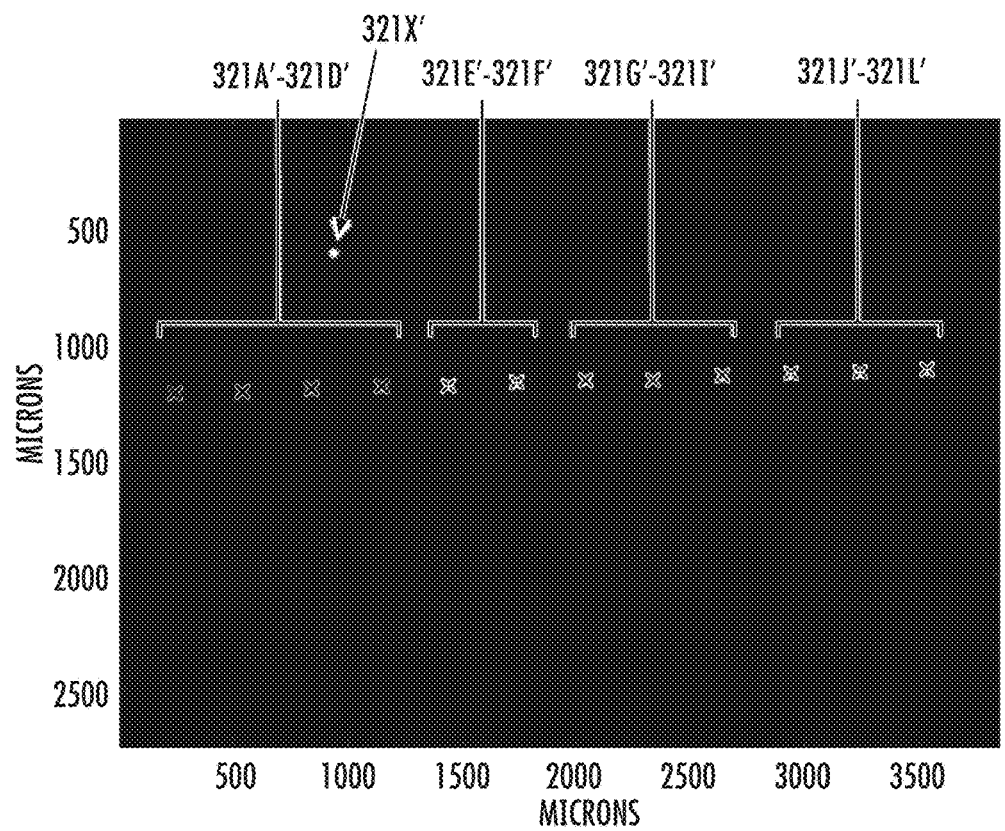
Figure 35D:
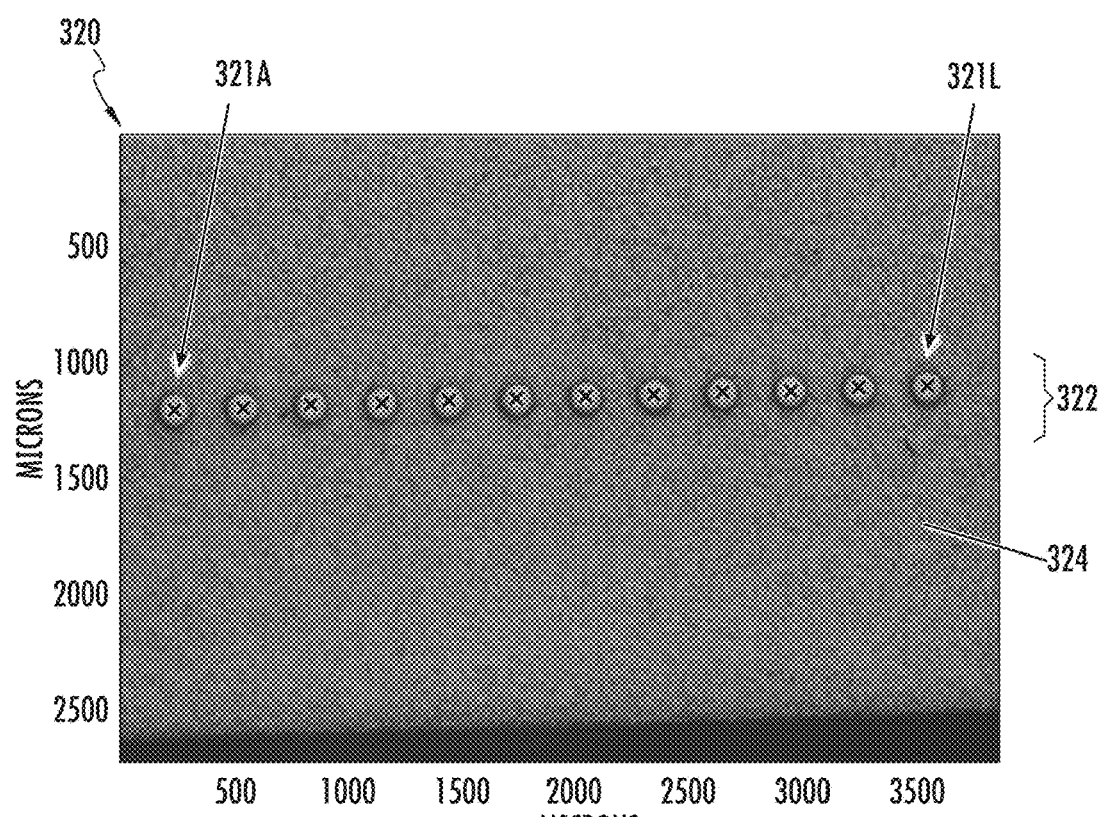

One implementation of the fourth routine may be understood with reference to FIGS. 35A-35D. FIG. 35A is a raw digital microscope image (obtained with a FastMT-200× digital microscope) of an end portion of an MPO connector 320 including twelve optical fibers 321A-321L arranged in a linear array 322, with the image showing ends of the optical fibers 321A-321L and a ferrule end surface 324. To initiate determination of fiber position, the raw image of FIG. 35A is smoothed by either 2D ensemble and/or 2D median averaging to reduce the intensity of spurious pixels of the ferrule end surface 324. If the routine fails with ensemble averaging, then it may be repeated with median averaging at a computational cost. The resultant image is then thresholded using a dynamic value based upon 75% of the maximum (intensity) value. Such thresholding would ideally result in twelve fiber masks (corresponding to all twelve fibers 321A-321L shown in FIG. 35A), however more or less than twelve fiber masks can be returned. FIG. 35B shows multiple fiber masks obtained by thresholding applied to the image of FIG. 35A, including fiber masks arranged in a linear array 322'. To show the robustness of "dynamic fiber pattern location routine 1", the first, second, and eighth masks have been manually removed (leaving the third through seventh masks 321C'-321G' and ninth through twelfth masks 321I'-321L') and a spurious mask 321X' was introduced in a position lacking alignment with the other fiber masks of the linear array 322'. Thereafter, the centroid coordinates of the returned fiber masks are calculated, and the median difference value for both x and y coordinates are calculated. The difference of x and y pixels between adjacent fiber locations are compared to the median values. If the differences are greater than the median values ±3 pixels (approximately 3 µm), then the two individual fiber masks exhibiting the difference are removed (as assumed not to embody valid fiber masks). The absence of the eighth fiber mask in FIG. 35B results in larger-than-median differences being identified for the sixth and seventh fiber masks 321G', 321I' so that such masks are subsequently removed. For removed masks that lie within (i.e., between) spatially validated masks, the removed mask positions are linearly interpolated using the median difference, as indicated by superimposed crosses in FIG. 35C applied to positions for the seventh through ninth fiber masks 321G'-321I'. To both the left and right of the validated fiber masks (i.e., fiber masks 321E'-321F' and 321J'-321L' in FIG. 35C, each indicated with a superimposed cross), fiber mask positions are extrapolated beyond spatially validated positions. These are validated by applying a ±15 pixel (~12.5 µm) interrogation square around the position upon the original raw image normalized by the 2D averaged image. The standard deviation of all pixel values within the interrogation square is calculated and compared to the standard deviation value of the same sized interrogation square positioned around validated fiber masks. Values greater than 0.1 correspond to the ferrule surface and not a genuine fiber. This metric is used to discard false positive, extrapolated fiber positions. In FIG. 35C, the leftmost four fiber masks 321A'-321D' are determined by extrapolation and validated, with positions marked by superimposed crosses. Following the validation steps, the spurious fiber mask 321X' is invalidated and removed. FIG. 35D shows the raw image of FIG. 35A overlaid with twelve superimposed crosses showing all fibers 321A-321L of the array 322 being correctly identified.

The preceding description of FIGS. 35A-35D represents one implementation of the "dynamic fiber pattern location routine 1." In certain embodiments, one or more steps described in connection with FIGS. 35A-35D may be modified or omitted. Another implementation of the "dynamic fiber pattern location routine 1" is described hereinafter, without reference to specific figures. According to such an implementation, a method for determining positions of multiple optical fibers from a digital image of at least a portion of an end of an optical fiber connector (e.g., an MPO connector), with the image showing the multiple fibers having respective ends arranged in a linear pattern on an end surface of a ferrule, is provided. One step includes smoothing the digital image by at least one of 2D ensemble normalization or 2D median normalization to generate a normalized image in which spurious pixels of the end surface of the ferrule exhibit reduced intensity. Another step includes applying a threshold value across the normalized image, with the threshold value based on a selected percentage of a maximum pixel intensity value to identify a plurality of proposed fiber masks. A further step includes calculating centroid x, y coordinates of each proposed fiber mask of the plurality of proposed fiber masks, identifying median difference values for centroid x coordinates of the plurality of proposed fiber masks, and identifying median difference values for centroid y coordinates of the plurality of proposed fiber masks. Still another step includes comparing a difference of centroid x and y coordinate values between adjacent proposed fiber masks to the median difference values for centroid x coordinates and centroid y coordinates, and responsive to such comparison: (i) removing any pairs of adjacent fiber masks of the plurality of proposed fiber masks embodying differences between centroid x and y coordinate values greater than a specified threshold than the median difference values for centroid x coordinates and centroid y coordinates, and (ii) spatially validating any other adjacent fiber masks of the plurality of proposed fiber masks embodying differences between centroid x and y coordinate values within a specified threshold of the median difference values for centroid x coordinates and centroid y coordinates to yield spatially validated fiber masks. A further step includes, for any removed pairs of adjacent fiber masks that lie between spatially validated fiber masks, linearly interpolating positions of replacement fiber masks using the median difference values for centroid x coordinates and centroid y coordinates.

In certain embodiments, the preceding method further includes extrapolating potential fiber mask positions arranged beyond two outermost spatially validated masks by applying interrogation regions to the digital image, comparing standard deviation of pixel values within the interrogation regions to at least one equally sized region positioned around at least one spatially validated fiber mask, and using the standard deviation comparison to validate or invalidate one or more potential fiber mask positions arranged beyond the two outermost spatially validated masks. In certain embodiments, the interrogation regions are square in shape. In certain embodiments, values greater than 0.1 obtained from the standard deviation comparison are used to invalidate one or more potential fiber mask positions arranged beyond the two outermost spatially validated masks. In certain embodiments, the threshold value falls in a range of from 65% to 85% of the maximum pixel intensity value. In certain embodiments, the specified threshold is about 3 pixels or about 3 microns.

Dynamic Fiber Location Routine 2

A fifth routine (which may be referred to hereinafter as "dynamic fiber location routine 2") is now introduced, with such routine being useful for determining center position of an individual optical fiber from a digital image of at least a portion of an end of an optical fiber connector, with the image showing one or more optical fibers arranged on an end surface of a ferrule.

Figure 36A:
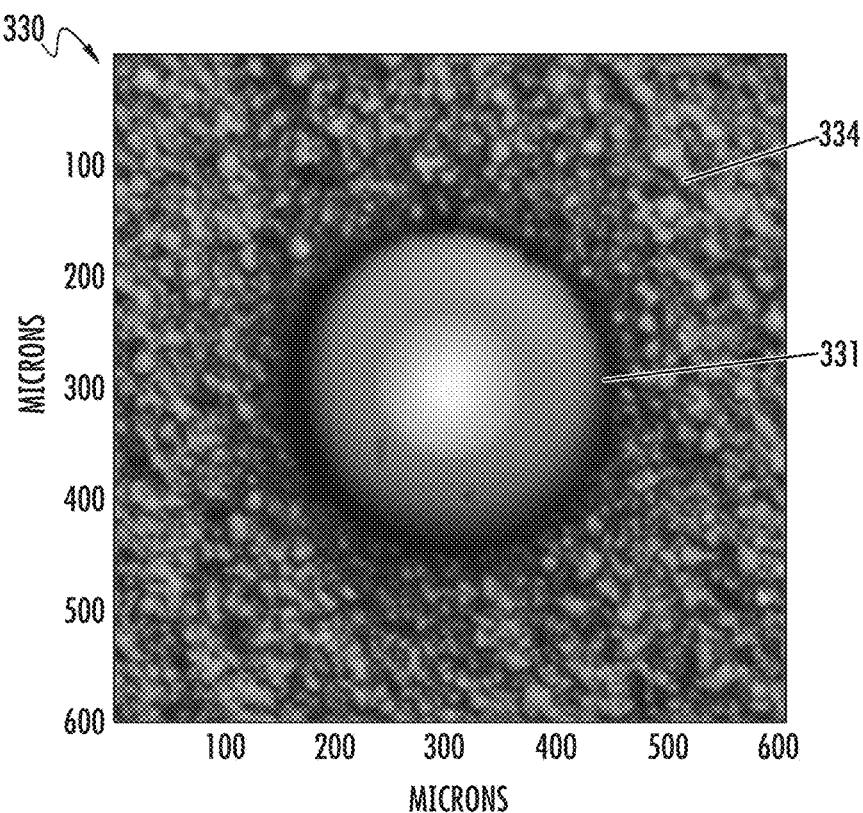
FIG. 36A is a raw digital microscope image obtained with the above-mentioned third microscope (FastMT-200×) of an end portion of an MPO connector centered on a single optical fiber.
Figure 36B:
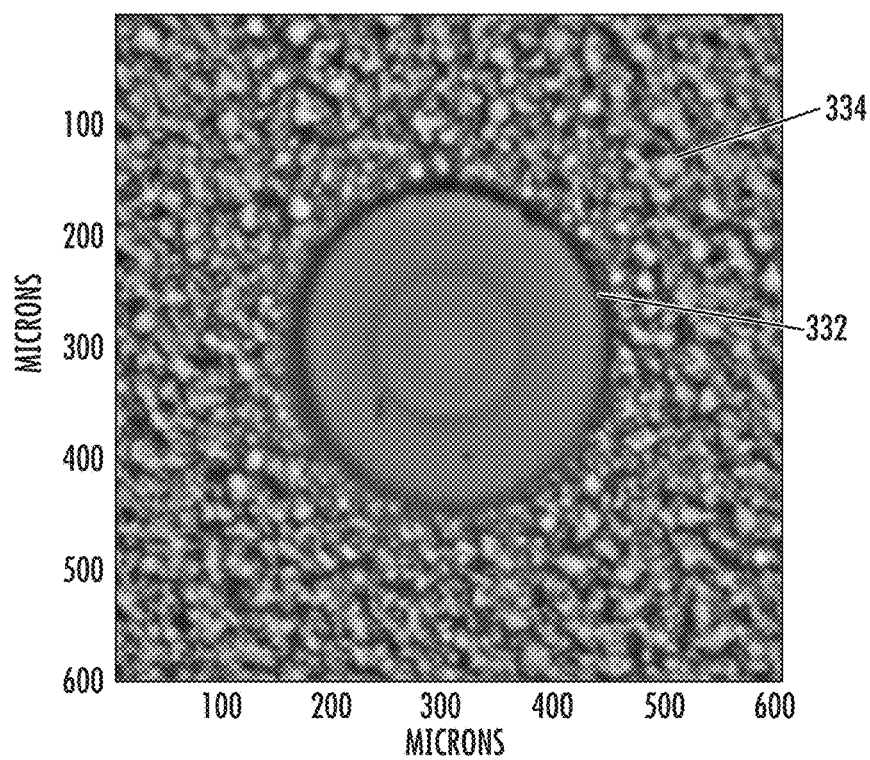
FIGS. 36B-36F provide images derived from the raw image of FIG. 36A, upon execution of steps of a method for dynamically determining the position of individual fibers of a multi-fiber connector.
Figure 36C:
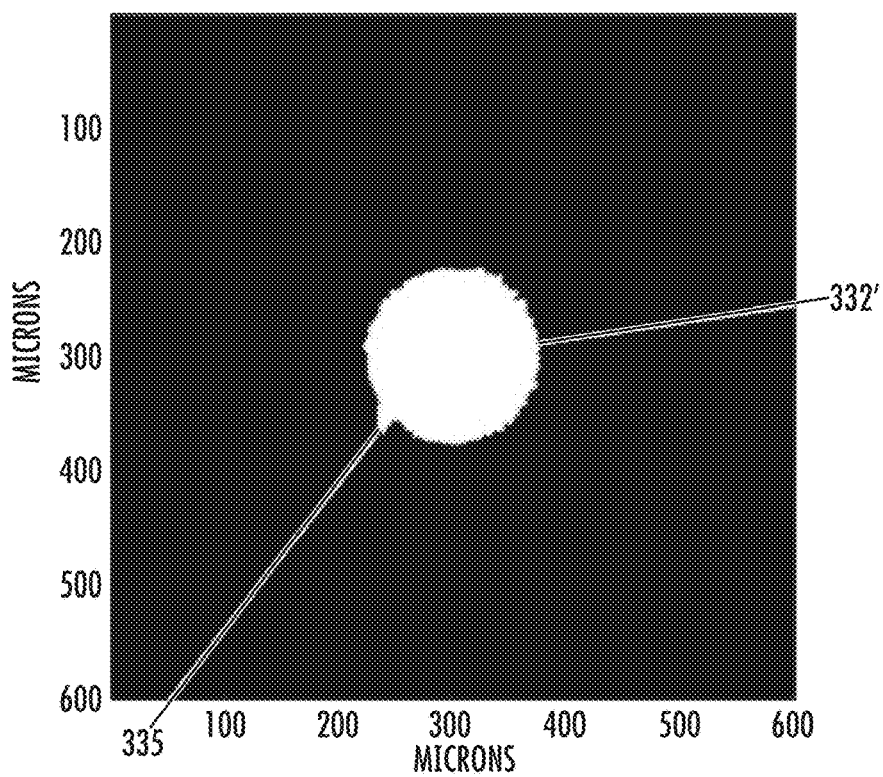
Figure 36D:
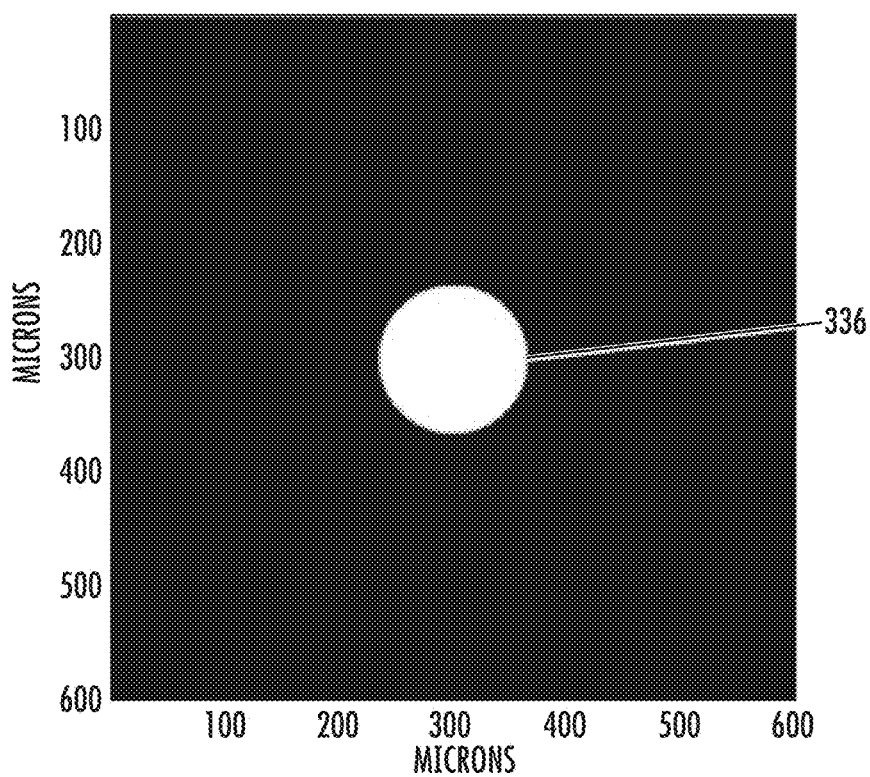
Figure 36E:
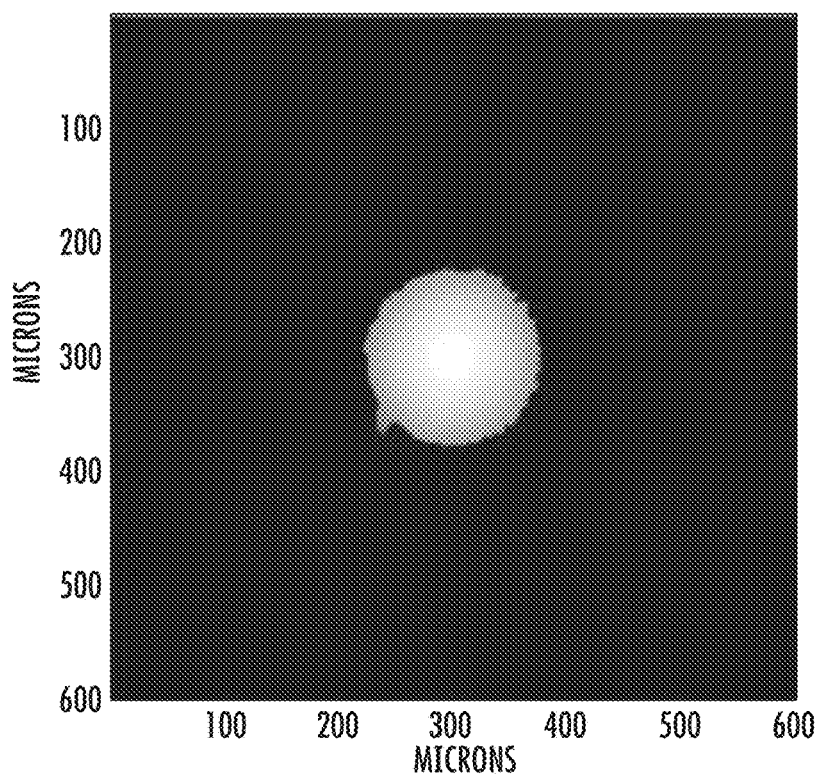
Figure 36F:
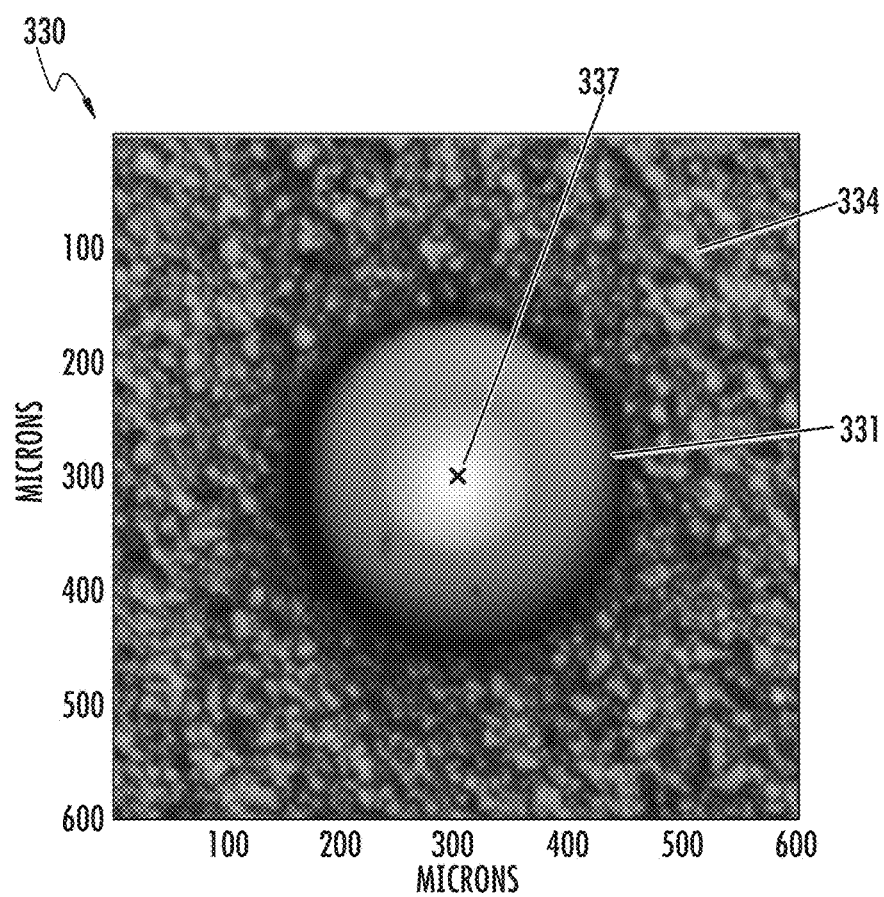

One implementation of the fifth routine may be understood with reference to FIGS. 36A-36F. FIG. 36A is a raw digital microscope image (obtained with a FastMT-200× digital microscope) of an end portion of an MPO connector 330, with the frame centered on a single optical fiber 331 surrounded by a surface of a ferrule 334. The frame location is determined by the approximate location of the fibers having been previously determined, with the frame size being of sufficient size to contain the fiber 331 for precise center determination. The raw image of FIG. 36A is normalized by a 2D ensemble averaging, resulting in a dark (sub-unity) ring 332 surrounded by the ferrule surface 334 and disposed around the high intensity core, as shown in FIG. 36B. Thresholding is then applied to create a binary image (shown in FIG. 36C) that embodies a fiber mask 332'. For each pixel of the fiber mask 332', a circular binary mask 336 having a diameter of 60 pixels is created about the pixel, as shown in FIG. 36D. The summation of the common nonzero pixel values (i.e., between the fiber mask and the circular binary mask) is tabulated, along with the x and y pixel location being investigated. The maximum summation values and corresponding x and y locations are then extracted, embodying positions of maximum overlap returnable as the final core coordinates. If multiple values of x and y coordinates embodying maximum summation values exist, the mean of each is determined, resulting in the final core coordinates. FIG. 36E is a scalar image produced by the center locating routine, showing that the operation is robust despite the included contaminant. FIG. 36F provides the raw image of FIG. 36A with the fiber center 337 identified (shown as a superimposed cross).

The preceding description of FIGS. 36A-36F represents one implementation of the "dynamic fiber location routine 2." In certain embodiments, one or more steps described in connection with FIGS. 36A-36F may be modified or omitted. Another implementation of the "dynamic fiber location routine 2" is described hereinafter, without reference to specific figures. According to such an implementation, a method for determining center position of an individual optical fiber from a digital image of at least a portion of an end of an optical fiber connector, with the image showing one or more optical fibers arranged on an end surface of a ferrule, is provided. One step includes extracting a subregion of the digital image to generate a subregion image containing the individual optical fiber. Another step includes performing ensemble normalization of the digital image to generate an ensemble normalized image. A further step includes applying a universal threshold value across the ensemble normalized image to generate a binary image of sub-unity value features embodying a first fiber mask including multiple pixels each having x and y coordinates. Yet another step includes, for each pixel of the first fiber mask, investigating overlap with the first fiber mask by generating a circular binary mask centered on the pixel being investigated and tabulating a summation of nonzero pixel values in common with the first fiber mask as well as x and y coordinate values of the pixel being investigated. An additional step includes identifying center coordinates for a fiber core of the individual optical fiber as either (i) x and y coordinates for a single pixel being investigated embodying a maximum summation value or (ii) mean x and y coordinates for multiple pixels being investigated embodying equal maximum summation values.

Dynamic Pin/Pinhole Location Routine

A sixth routine (which may be referred to hereinafter as "dynamic pin/pinhole location routine") is now introduced, with such routine being useful for determining position of pins or pinholes (which promote alignment with a mating optical fiber connector) from a digital image of at least a portion of an end of an optical fiber connector.

Figure 37A:
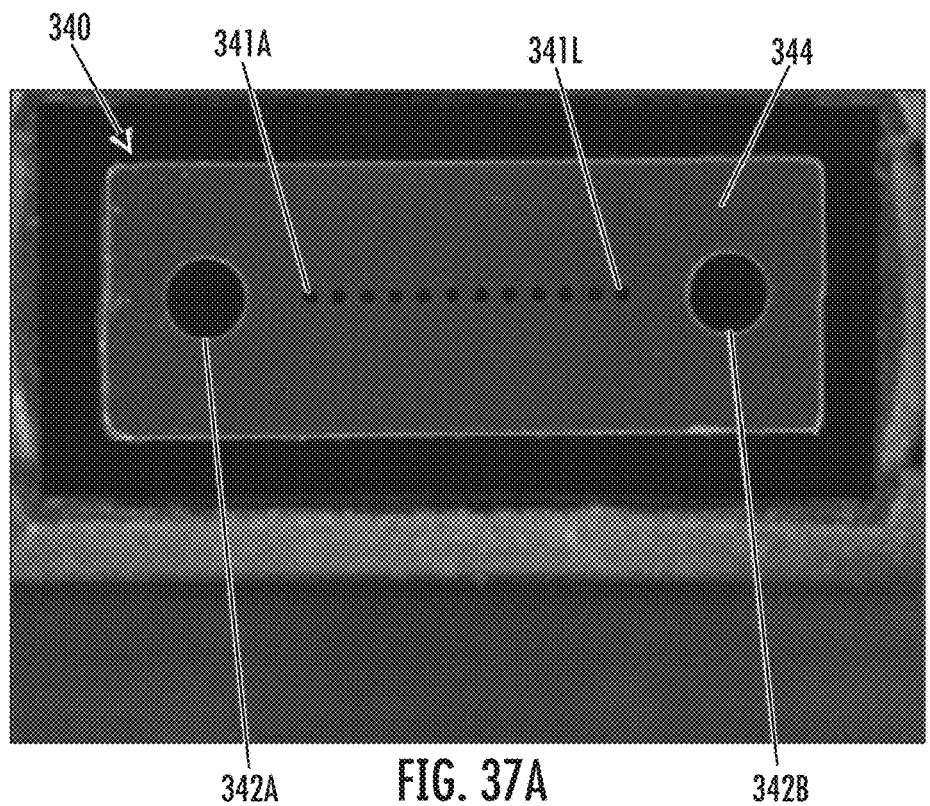
FIG. 37A is a raw digital microscope image obtained with the above-mentioned fourth microscope (FastMT-80×) of an end portion of a female MPO connector showing a ferrule end surface with pinholes arranged proximate to ends of a linear array of twelve optical fiber ends.
Figure 37B:
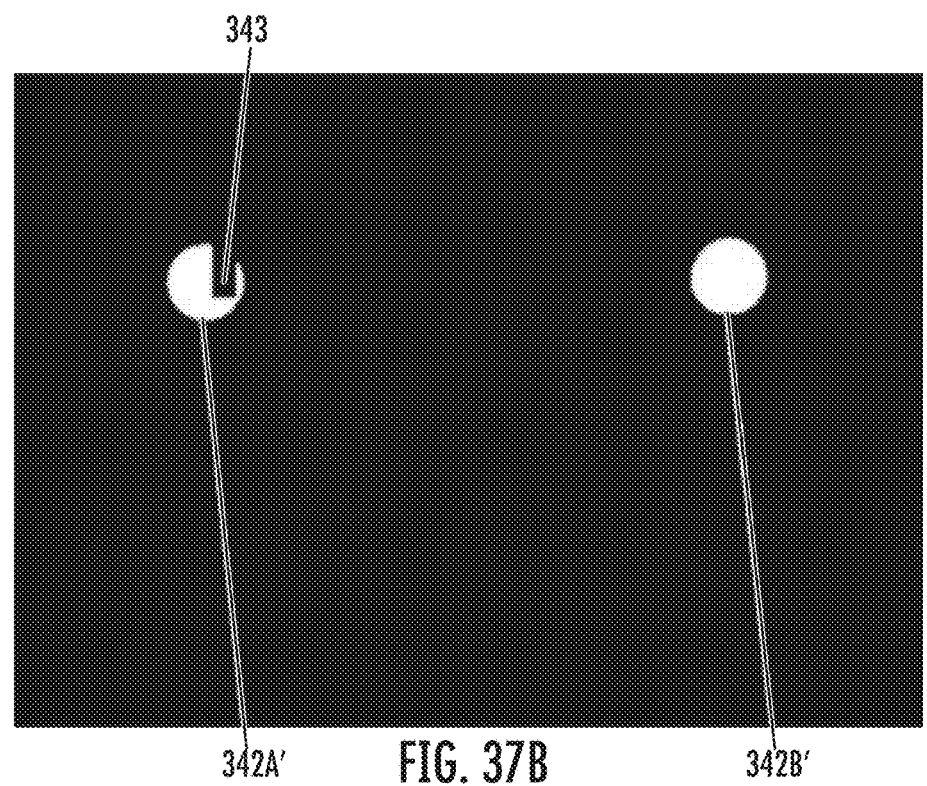
FIGS. 37B-37D and 37F provide images derived from the raw image of FIG. 37A, upon execution of steps of a method for dynamically determining the position of individual fibers of a multi-fiber connector.
Figure 37C:
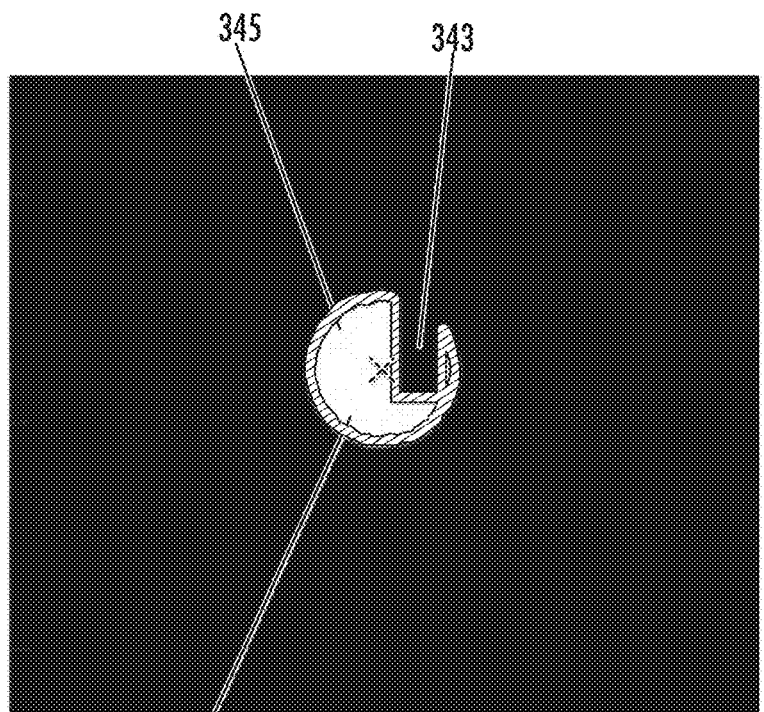
Figure 37D:
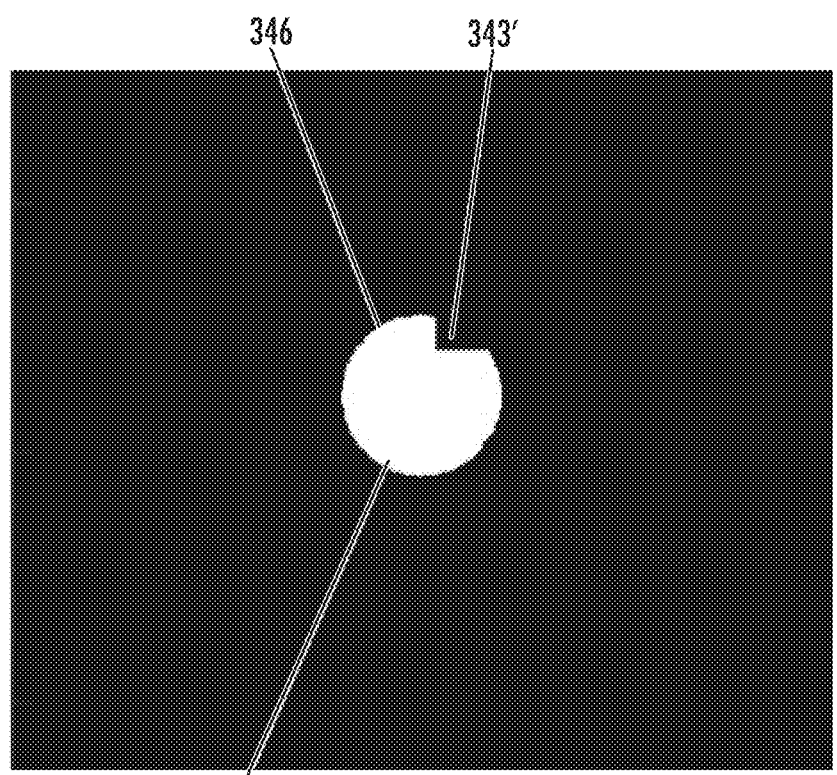
Figure 37E:
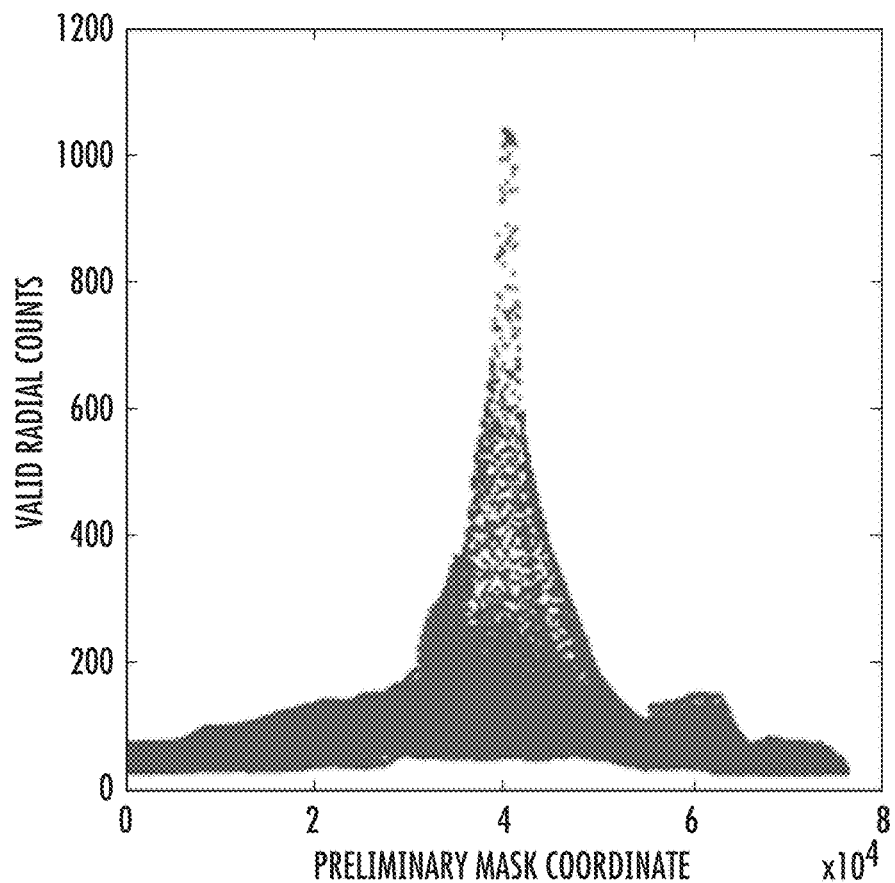
FIG. 37E is a plot of valid radial counts versus preliminary mask coordinate, embodying information useful in performing the method for dynamically determining the position of an individual fiber of a multi-fiber connector described in connection with FIGS. 37A-37D and 37F.
Figure 37F:
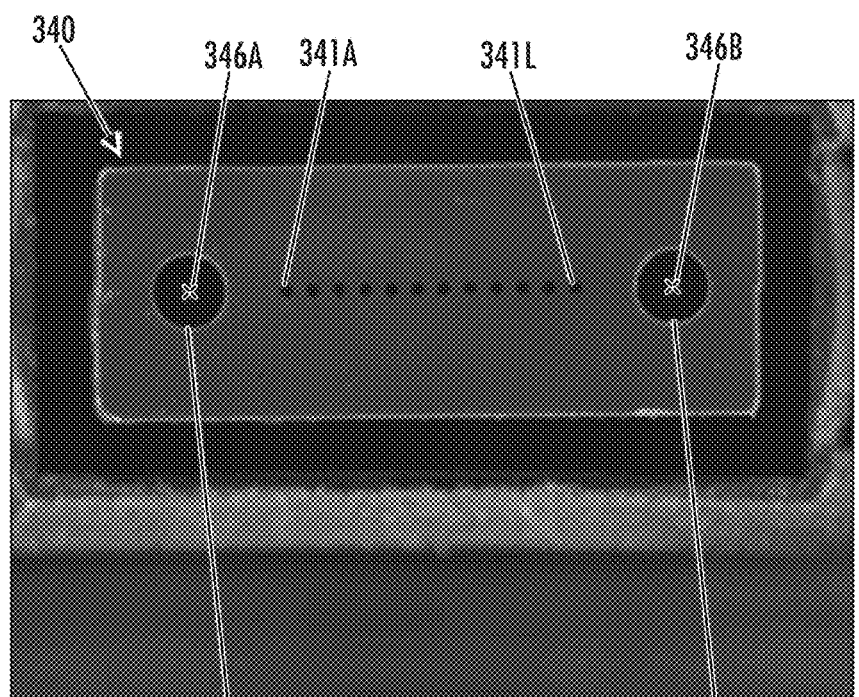

One implementation of the sixth routine may be understood with reference to FIGS. 37A-37F. FIG. 37A is a raw digital image (obtained with a FastMT-80× microscope) of an end portion of a female MPO connector 340 showing a ferrule end surface 344 with pinholes 342A, 342B arranged proximate to ends of a linear array of twelve optical fibers 341A-342L. As shown in FIG. 37B, preliminary masks 342A', 342B' of the two pinholes 342A, 342B are identified by thresholding, followed by size and eccentricity checks. To demonstrate the robustness of the routine, an artificial defect 343 has been manually added to the left pinhole 342A. Thereafter, the perimeter pixel coordinates of the preliminary pinhole masks are extracted, with such perimeter pixel coordinates being shown in FIG. 37C as a peripheral line 345 with right upwardly-sloping fill surrounding the preliminary mask 342A' without incursion into the artificial defect 343. Any voids in the preliminary pinhole masks are then filled via orthogonal (horizontal and vertical) interpolation to form an interpolated pinhole mask 346, as shown in FIG. 37D. Due to partial filling of the defect area, a reduced size defect area 343' is shown in FIG. 37D. For every valid pixel in the interpolated pinhole mask 346, the radial distances from such pixel to all perimeter pixels of the interpolated pinhole mask 346 are calculated. The number of radial distances that satisfy the requirement of being within the median distance ±5 pixels are counted. A plot of number of valid radial distances versus interpolated pinhole mask coordinate is shown in FIG. 37E. The mask coordinate corresponding to the maximum number of validated radials corresponds to, and is selected as, the x and y coordinates of the pinhole. FIG. 37F provides the raw image of FIG. 37A with the pinhole centers 346A, 346B identified (shown as superimposed crosses), and with all other features therein being the same as described in connection with FIG. 37A.

The preceding description of FIGS. 37A-37F represents one implementation of the "dynamic pin/pinhole location routine." In certain embodiments, one or more steps described in connection with FIGS. 37A-37F may be modified or omitted. Another implementation of the "dynamic pin/pinhole location routine" is described hereinafter, without reference to specific figures. According to such an implementation, a method is provided for determining position of pins or pinhole features from a digital image of at least a portion of an end of an optical fiber connector (e.g., an MPO connector) in which one or more optical fibers is/are arranged on an end surface of the ferrule in the digital image. The end surface includes pins or pinhole features for promoting alignment with a mating optical fiber connector. One step includes applying a universal threshold value across the digital image to generate a binary image of sub-unity value features. Another step includes checking size and eccentricity of sub-unity value features to identify preliminary pin or pinhole feature masks each having perimeter pixel coordinates. A further step includes filling any voids in the preliminary pin or pinhole feature masks by horizontal and vertical interpolation to form interpolated pin or pinhole feature masks. Yet another step includes, for each interpolated pin or pinhole feature mask, calculating radial distances from each pixel of multiple pixels within the interpolated pin or pinhole feature mask to perimeter pixels of the interpolated pin or pinhole feature mask, comparing the radial distances to a median radial distance to the perimeter pixels for the multiple pixels, and validating pixels having corresponding radial distances within a specified distance of the median radial distance. Still another step includes, for each interpolated pin or pinhole feature mask, selecting a validated pixel corresponding to a maximum number of validated radial distances within a specified distance of the median radial distance as a center of the pin or pinhole feature.

In certain embodiments, the digital image is an ensemble normalized digital image derived from an image of at least a portion of the end of the fiber optic connector. In certain embodiments, the specified distance is within a range of 5 pixels or 5 microns of the median radial distance. In certain embodiments, for each interpolated pin or pinhole feature mask, generating a final pin or pinhole feature mask utilizing the center of the pin or pinhole feature and utilizing the median radial distance.

Dynamic Fiber Pattern Location Routine 2

A seventh routine (which may be referred to hereinafter as "dynamic fiber pattern location routine 2") is now introduced, with such routine being useful for dynamically locating and masking optical fibers of a multi-fiber connector.

Figure 38A:
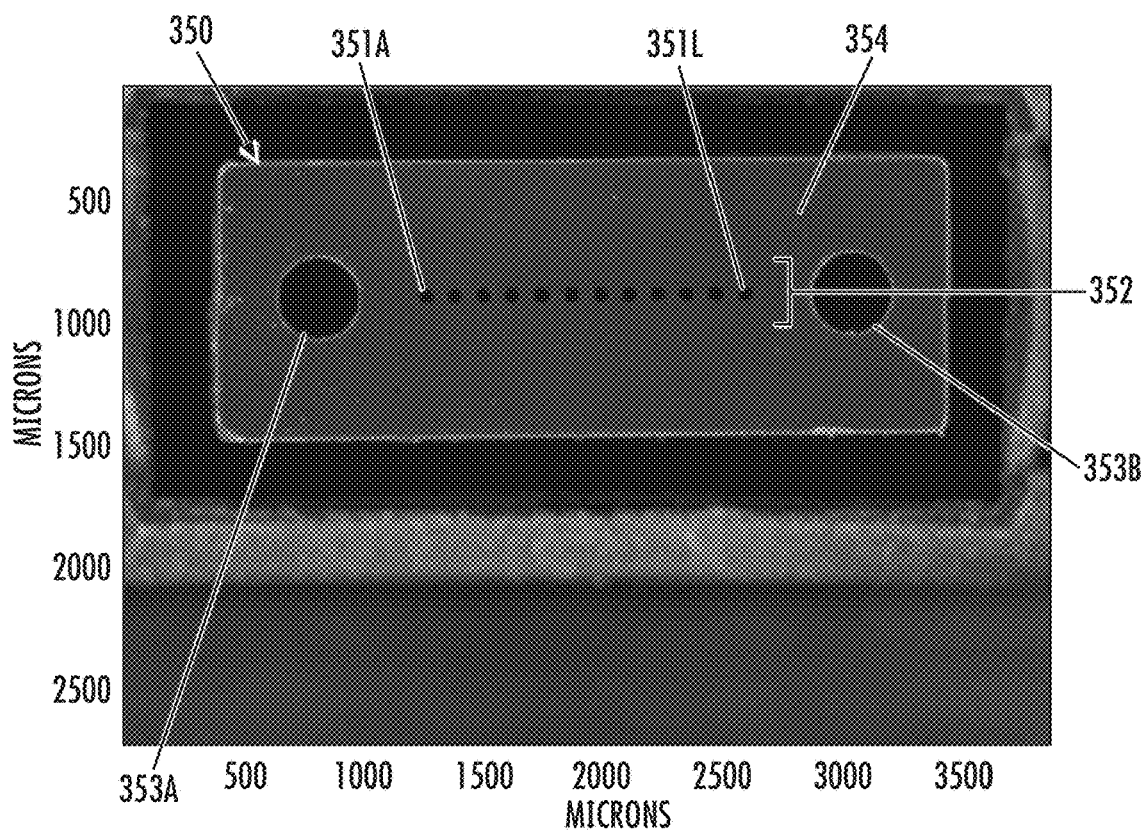
FIG. 38A is a raw digital microscope image obtained with the above-mentioned fourth microscope (FastMT-80×) of an end portion of a female MPO connector showing a ferrule end surface with pinholes arranged proximate to ends of a linear array of twelve optical fibers.
Figure 38B:
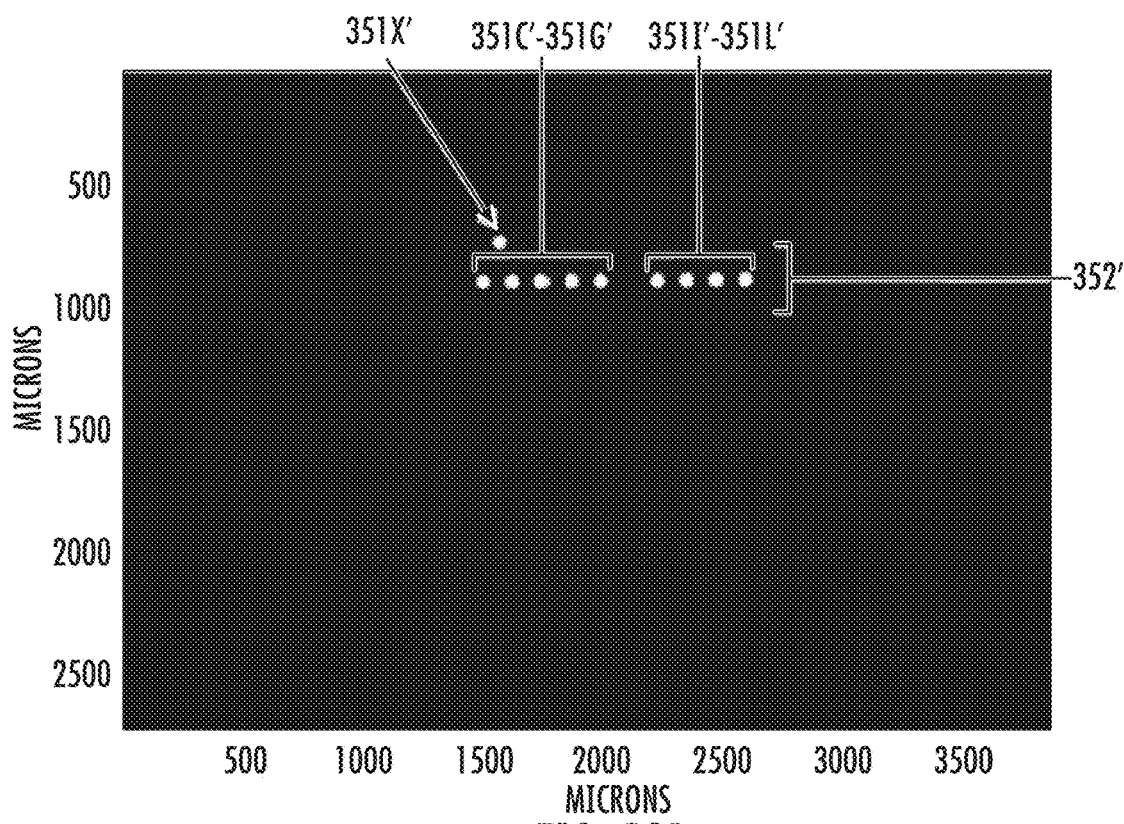
FIGS. 38B-38D provide images derived from the raw image of FIG. 38A, upon execution of steps of a method for dynamically locating and masking fibers of the linear array of optical fibers shown in FIG. 38A.
Figure 38C:
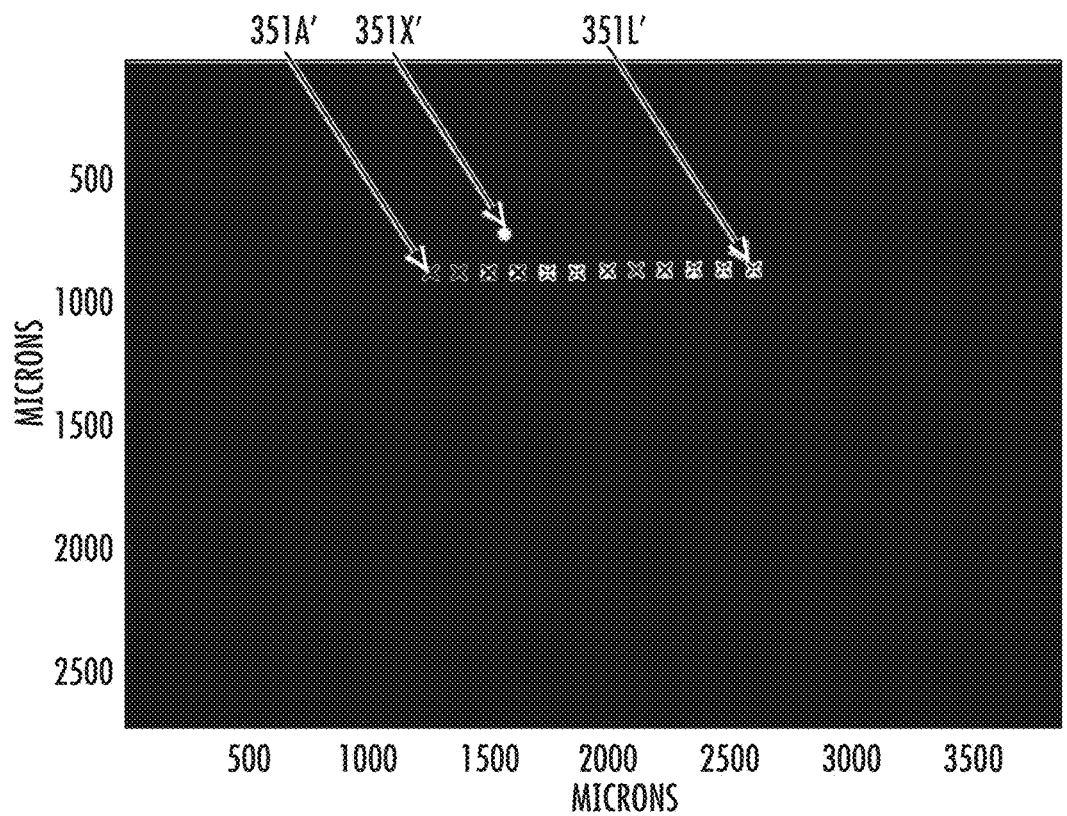
Figure 38D:
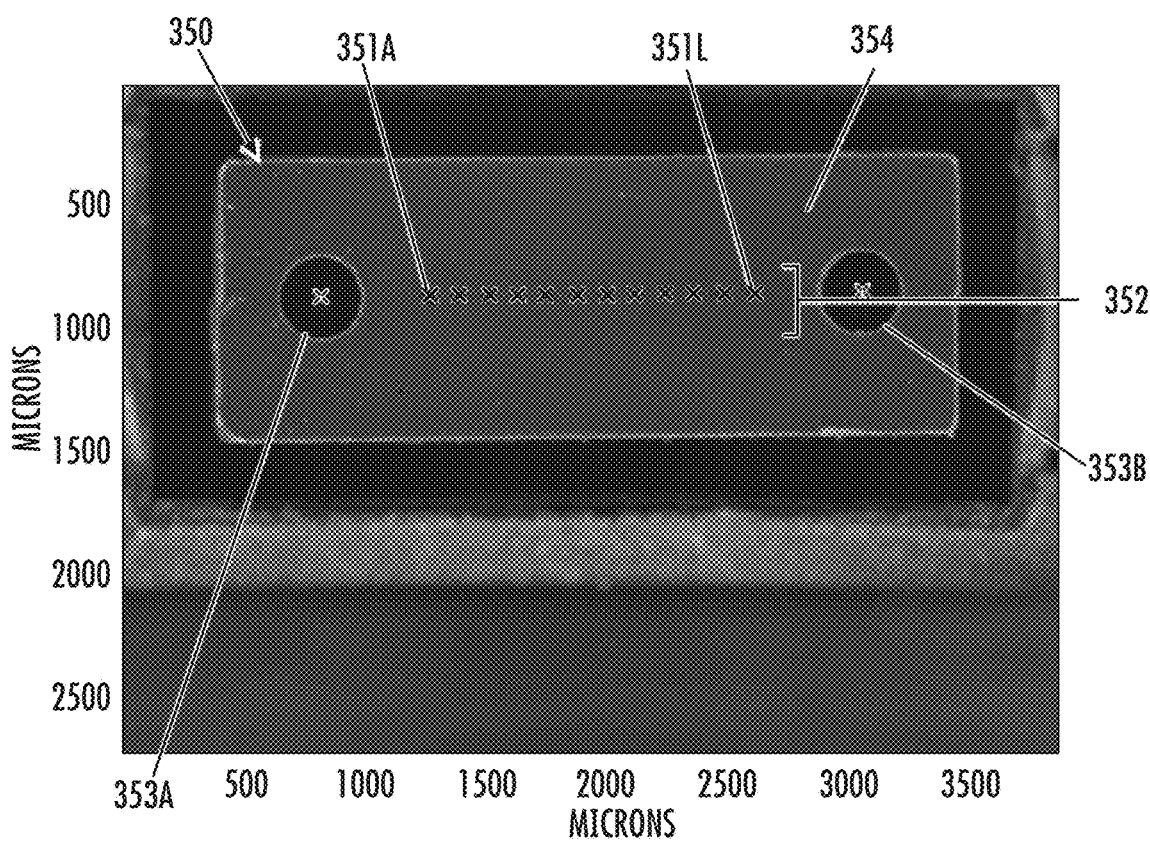

One implementation of the seventh routine may be understood with reference to FIGS. 38A-38D. FIG. 38A is a raw digital image obtained with a FastMT-80× microscope of an end portion of a female MPO connector 350 showing a ferrule end surface 354 with pinholes 353A, 353B arranged proximate to ends of a linear array 352 of twelve optical fibers 351A-351L. Preliminary masks of the fibers are identified by a minimum dynamic threshold (e.g., based on a specified percentage of maximum intensity value), and then size and eccentricity checks are performed. Such thresholding would ideally resulting in twelve fiber masks (corresponding to all twelve fibers 351A-351L shown in FIG. 38A), however more or less than twelve fiber masks can be returned. FIG. 38B shows multiple fiber masks obtained by thresholding applied to the image of FIG. 38A, including fiber masks arranged in a linear array 352'. To show the robustness of "dynamic fiber pattern location routine 2", the first, second, and eighth masks have been manually removed (leaving the third through seventh masks 351C'-351G' and ninth through twelfth masks 351I'-351L') and a spurious mask 321X' was introduced in a position lacking alignment with the other fiber masks of the linear array 352'. Thereafter, the centroid coordinates of the returned fiber masks are calculated, and the median difference value for both x and y coordinates are calculated. The difference of x and y pixels between adjacent fiber locations are compared to the median values. If the differences are greater than the median values ±3 pixels (approximately 3 μm), then the two individual fiber masks exhibiting the difference are removed (as assumed not to embody valid fiber masks). The absence of the eighth fiber mask in FIG. 38B results in larger-than-median differences being identified for the sixth and seventh fiber masks 351G', 351I' so that such masks are subsequently removed. For removed masks that lie within (i.e., between) spatially validated masks, the removed mask positions are linearly interpolated using the median difference, as indicated by superimposed crosses in FIG. 38C applied to positions for the seventh through ninth fiber masks 351G'-351I'. To both the left and right of the validated fiber masks (i.e., fiber masks 351E'-351F' and 351J'-351L' in FIG. 38C, each indicated with a superimposed cross), fiber mask positions are extrapolated beyond spatially validated positions. These are validated by applying a ±50 pixel interrogation square around the position upon the original raw image. Provided the summation of all pixel values within this interrogation square are between known bounds, the position is considered valid. Otherwise, the position corresponds to the ferrule surface and not to a genuine fiber. This metric is used to discard false positive, extrapolated fiber positions. In FIG. 35C, the leftmost four fiber masks 321A'-321D' are determined by extrapolation and validated, with positions marked by superimposed crosses. Following the validation steps, the spurious fiber mask 351X' is invalidated and removed. FIG. 38D shows the raw image of FIG. 38A overlaid with twelve superimposed crosses showing all fibers 351A-351L of the array 352 being correctly identified, and also showing superimposed crosses indicating center points of the pinholes 353A, 353B.

The preceding description of FIGS. 38A-38D represents one implementation of the "dynamic fiber pattern location routine 2." In certain embodiments, one or more steps described in connection with FIGS. 38A-38D may be modified or omitted.

Dynamic Ferrule Boundary Determination Routine 2

An eighth routine (which may be referred to hereinafter as "dynamic ferrule boundary determination routine 2") is now introduced, with such routine being useful for determining boundaries of a ferrule from a digital image of at least a portion of an end of an optical fiber connector, with the image showing multiple fibers having respective ends arranged in a linear pattern and an end surface of the ferrule.

Figure 39A:
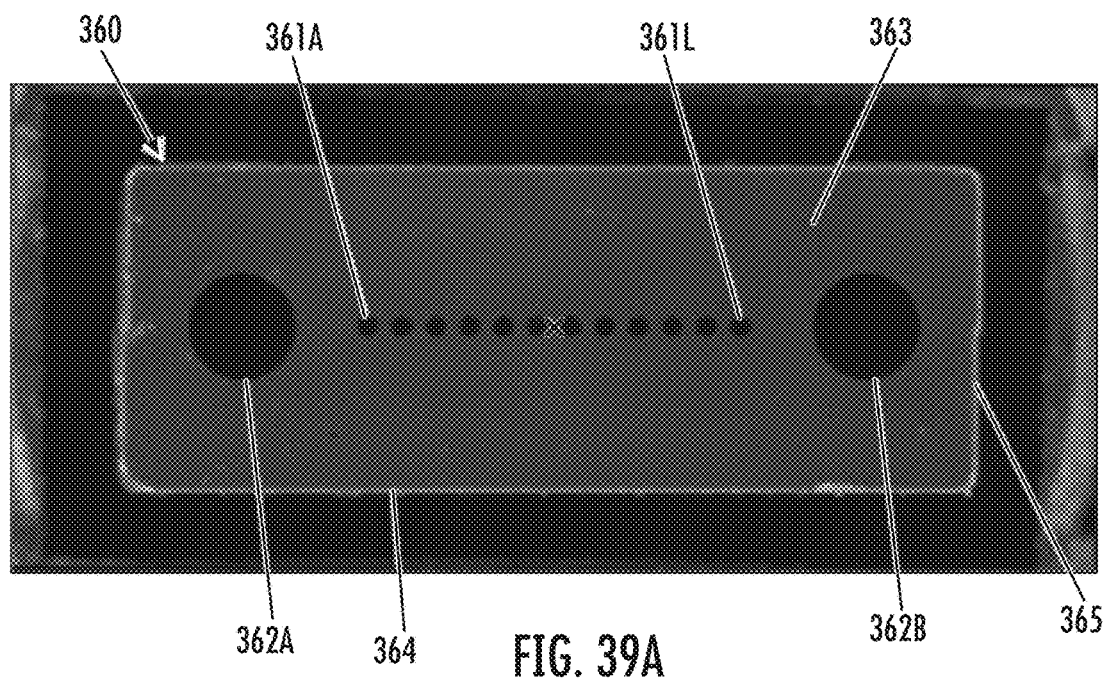
FIG. 39A is a digital microscope image obtained with the above-mentioned fourth microscope (FastMT-80×) of an end portion of a female MPO connector showing a ferrule end surface with pinholes arranged proximate to ends of a linear array of twelve optical fibers, following rotation of a raw image so that the linear array of optical fibers is horizontal in the image.
Figure 39B:
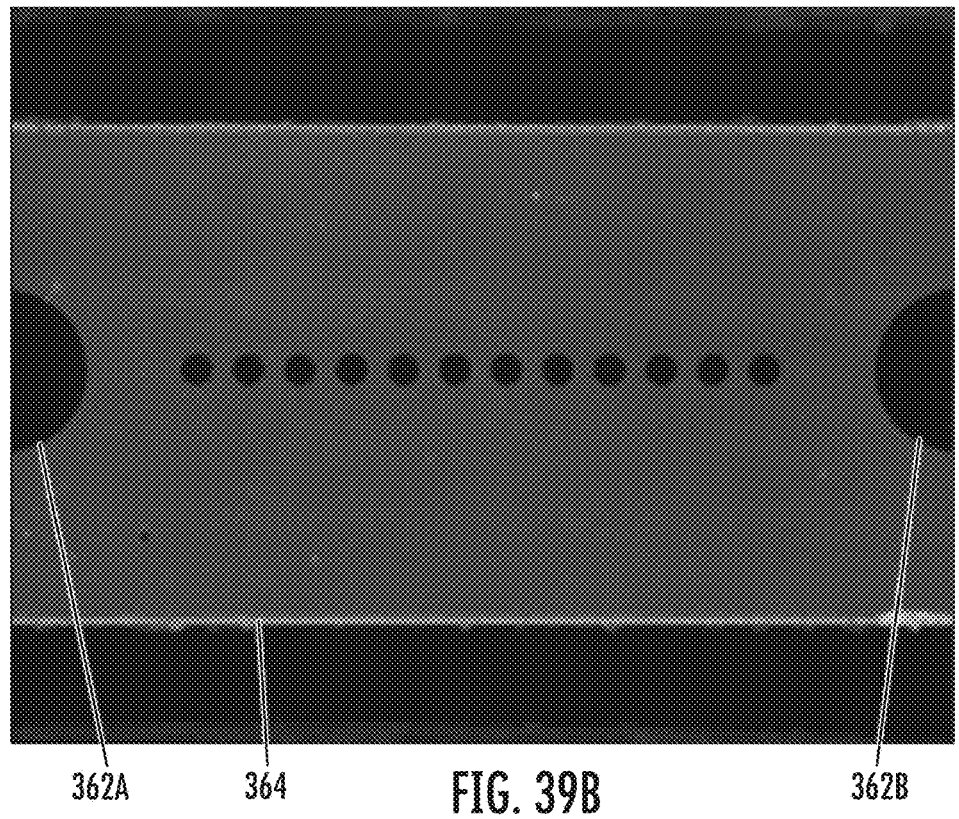
FIGS. 39B and 39E-39G provide images derived from the image of FIG. 39A, upon execution of steps of a method for dynamically locating and masking fibers of the linear array of optical fibers shown in FIG. 39A.
Figure 39C:
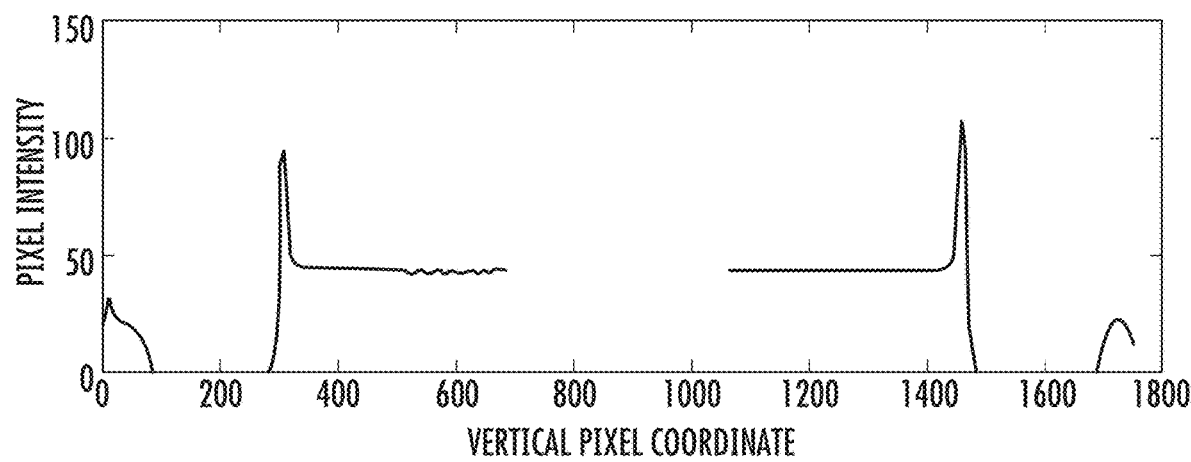
FIGS. 39C and 39D provide plots of pixel intensity and pixel intensity gradient, respectively, versus vertical pixel coordinate, embodying information useful in performing the method for dynamically locating and masking fibers of the linear array of optical fibers shown in FIG. 39A.
Figure 39D:
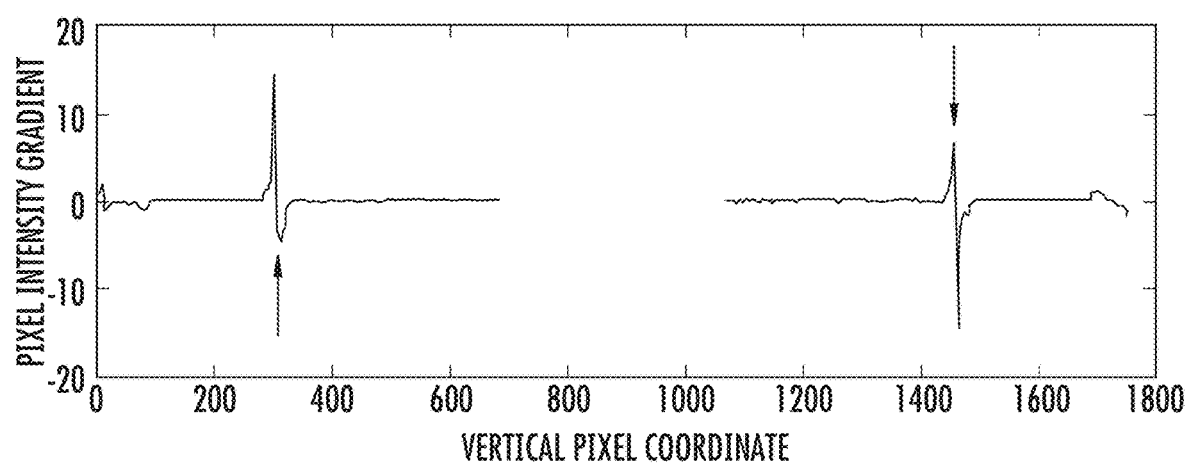
Figure 39E:
Figure 39F:
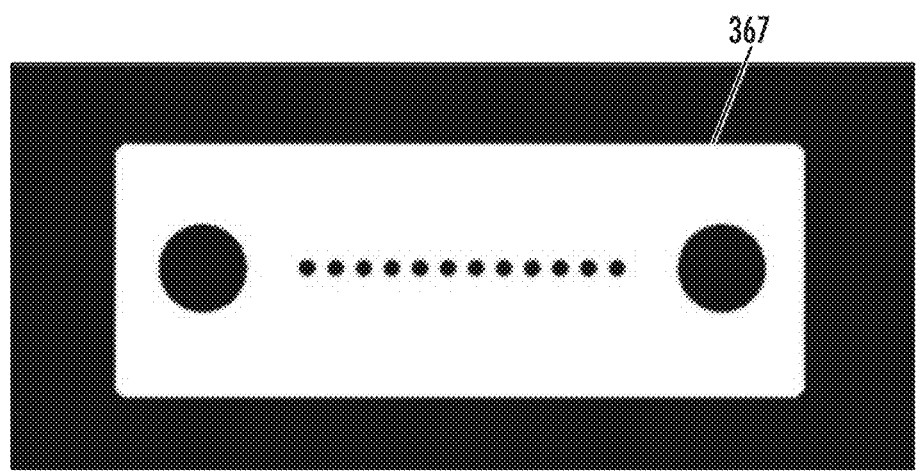
Figure 39G:
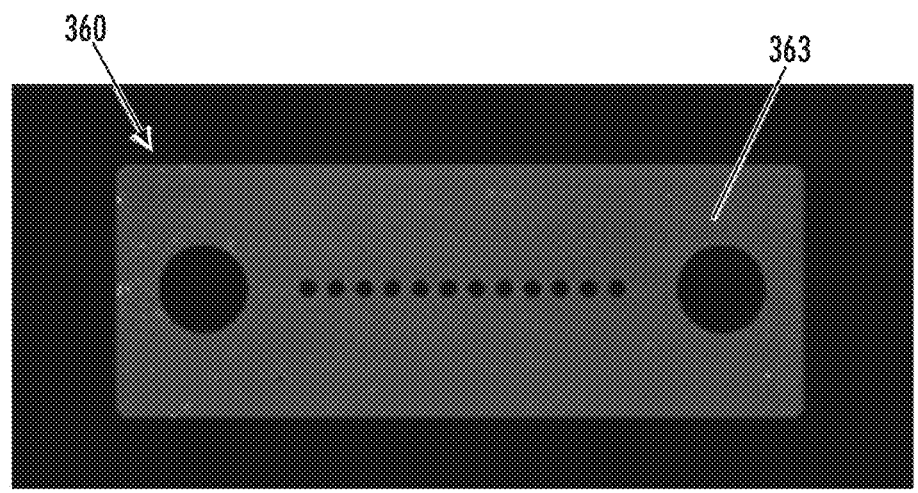

One implementation of the eighth routine may be understood with reference to FIGS. 39A-39G. FIG. 39A is a digital image (obtained with a FastMT-80× microscope) of an end portion of a female MPO connector 360 showing a ferrule end surface 363 bounded by lateral walls 364, 365 with pinhole regions 362A, 362B arranged proximate to a linear array of twelve optical fibers 361A-361L, following rotation of a raw image so that the array of optical fibers 361A-361L is horizontally arranged, and following masking (removal) of the originally images areas of the pinhole regions 362A, 362B and the optical fibers 361A-361L. As shown in FIG. 39B, the image of FIG. 39A is cropped left and right centered on locations of the pinholes 362A, 362B. For each row of pixels in the cropped image of FIG. 39B, the median value is determined to filter out any contamination signal, as shown in the plot of pixel intensity versus vertical pixel coordinate shown in FIG. 39C. The resultant median profile is differentiated, top to bottom, as shown in FIG. 39D. The minimum value and maximum values for the top and bottom edges are then identified from the gradient profile (indicated as vertical arrows in FIG. 39D) as locations for the top and bottom boundaries. The foregoing process is repeated for the left and right boundaries by cropping the raw image at top and bottom with the same median filtering and subsequent differentiation. The corner features are subsequently added. FIG. 39E is a ferrule boundary mask image 366 with corners included. FIG. 39F is a final mask image 367, in which the ferrule boundary mask is combined with the pin/pinhole and fiber masks to satisfactorily mask the raw image, leaving just the ferrule surface. FIG. 39G shows the surface of the ferrule 363 of the connector 360 of FIG. 39A following application the mask of FIG. 39F.

The preceding description of FIGS. 39A-39G represents one implementation of the "dynamic ferrule boundary determination routine 2." In certain embodiments, one or more steps described in connection with FIGS. 39A-39G may be modified or omitted. Another implementation of the "dynamic ferrule boundary determination routine 2" is described hereinafter, without reference to specific figures. According to such an implementation, a method is provided for determining boundaries of a ferrule from a digital image of at least a portion of an end of an optical fiber connector in which respective ends of multiple fibers are arranged in a linear pattern in a ferrule, with the image showing respective ends of the multiple fibers and an end surface of the ferrule. One step includes generating a first cropped image from the digital image, with the first cropped image being cropped along two edges thereof in a direction perpendicular to the linear pattern, wherein cropping locations of the first cropped image are determined from locations of the pins or pinhole features on the end surface of the ferrule. Another step includes, for each row of pixels of the cropped image perpendicular to the linear pattern, median filtering pixel intensity values to remove outlying pixel intensity values potentially attributable to contamination and to generate a first median filtered pixel intensity profile, followed by calculating gradient magnitude values of the first median filtered pixel intensity profile to generate a first gradient profile, and selecting minimum and maximum values from the first gradient profile to identify a first pair of opposing edges, respectively, of the ferrule. A further step includes generating a second cropped image from the digital image, with the second cropped image being cropped along two edges thereof in a direction parallel to the linear pattern, wherein cropping locations of the second cropped image are determined from locations of the pins or pinhole features on the end surface of the ferrule. Yet another step includes, for each row of pixels of the cropped image parallel to the linear pattern, median filtering pixel intensity values to remove outlying pixel intensity values potentially attributable to contamination and to generate a second median filtered pixel intensity profile, followed by calculating gradient magnitude values of the second median filtered pixel intensity profile to generate a second gradient profile, and selecting minimum and maximum values from the second gradient profile to identify a second pair of opposing edges, respectively, of the ferrule. According to the preceding method, the first pair of opposing edges and the second pair of opposing edges correspond to lateral boundaries of the ferrule. In certain embodiments, a further step includes adding corner features of the ferrule at or proximate to extrapolated intersections between respective edges of the first pair of opposing edges and the second pair of opposing edges.

Contamination Detection Routine 1

A ninth routine (which may be referred to hereinafter as "contamination detection routine 1" is now introduced, with such routine being useful for identifying contamination on various types of connectors (e.g., single fiber and multi-fiber varieties).

Figure 40A:
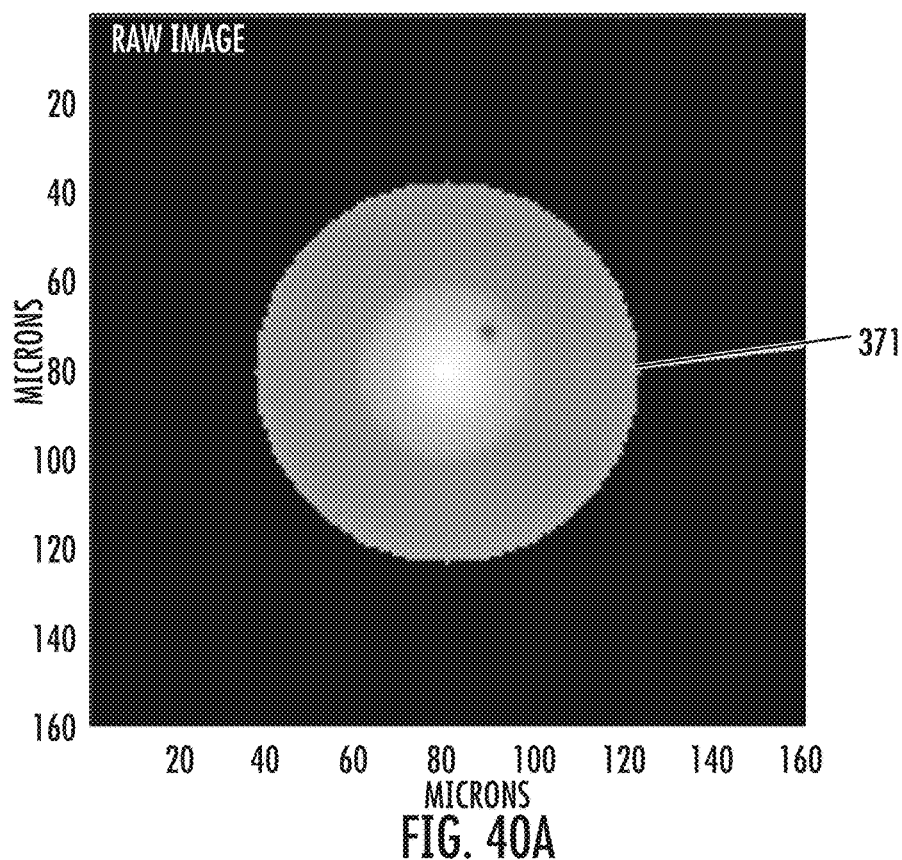
FIG. 40A is a masked digital microscope image obtained of an end portion of an LC single fiber connector, following masking to eliminate imaging of the ferrule.
Figure 40B:
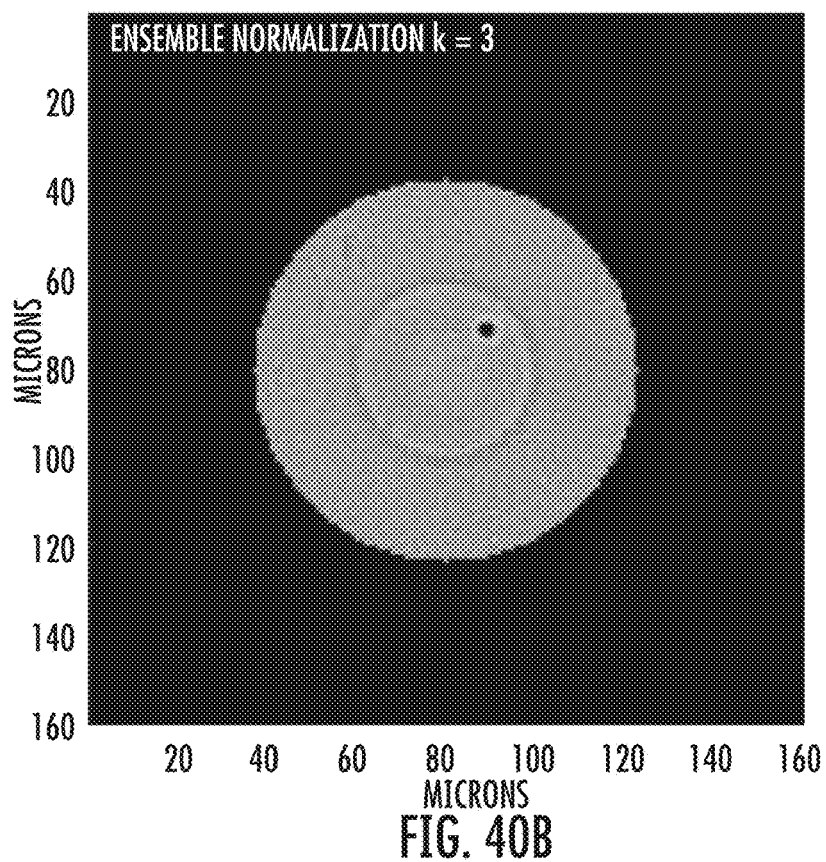
FIGS. 40B-40F provide images derived from the image of FIG. 40A, upon execution of steps of a method for identifying contamination on the fiber region shown in FIG. 40A.
Figure 40C:
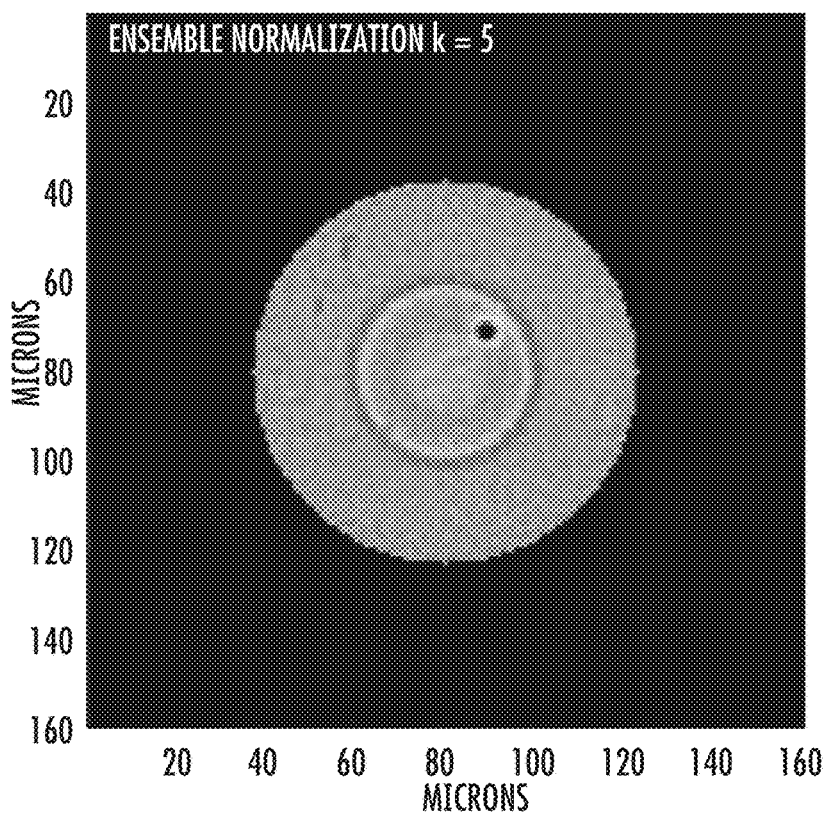
Figure 40D:
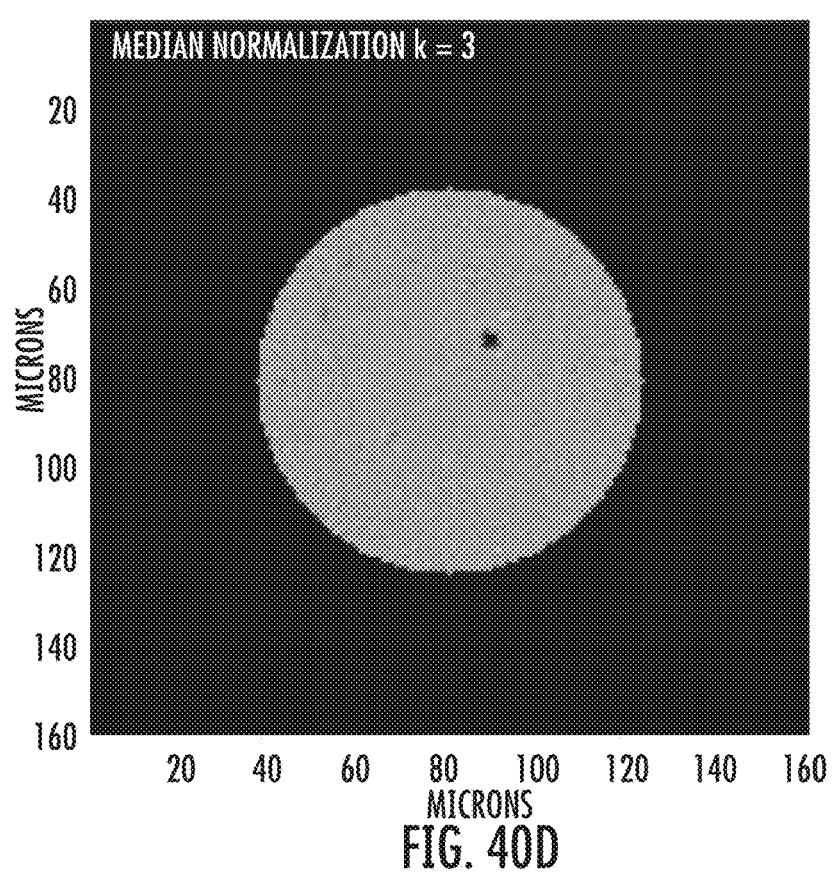
Figure 40E:
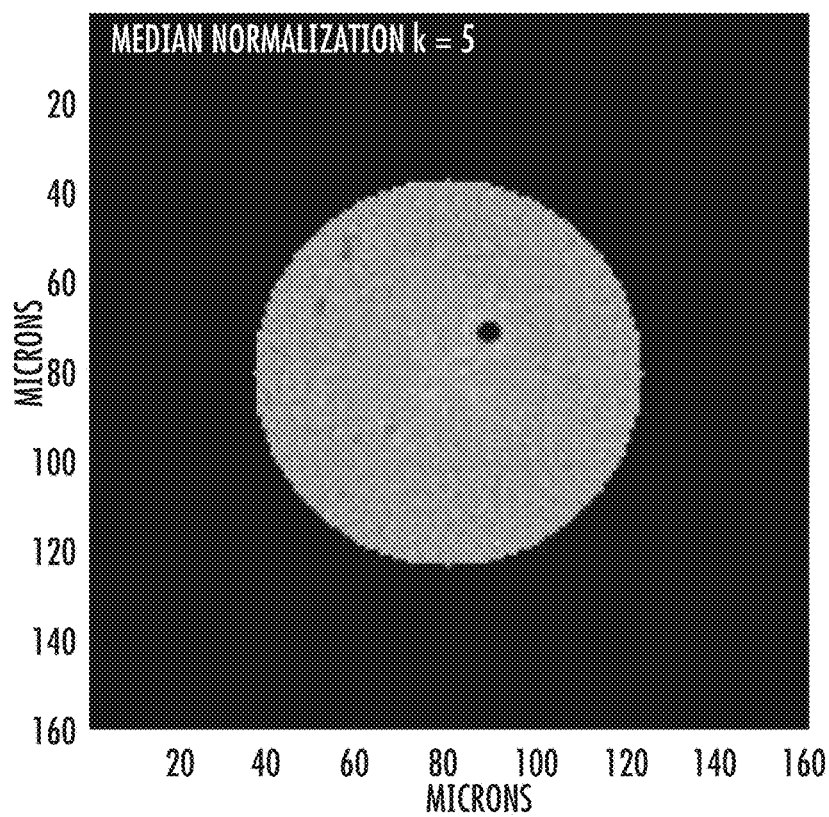
Figure 40F:
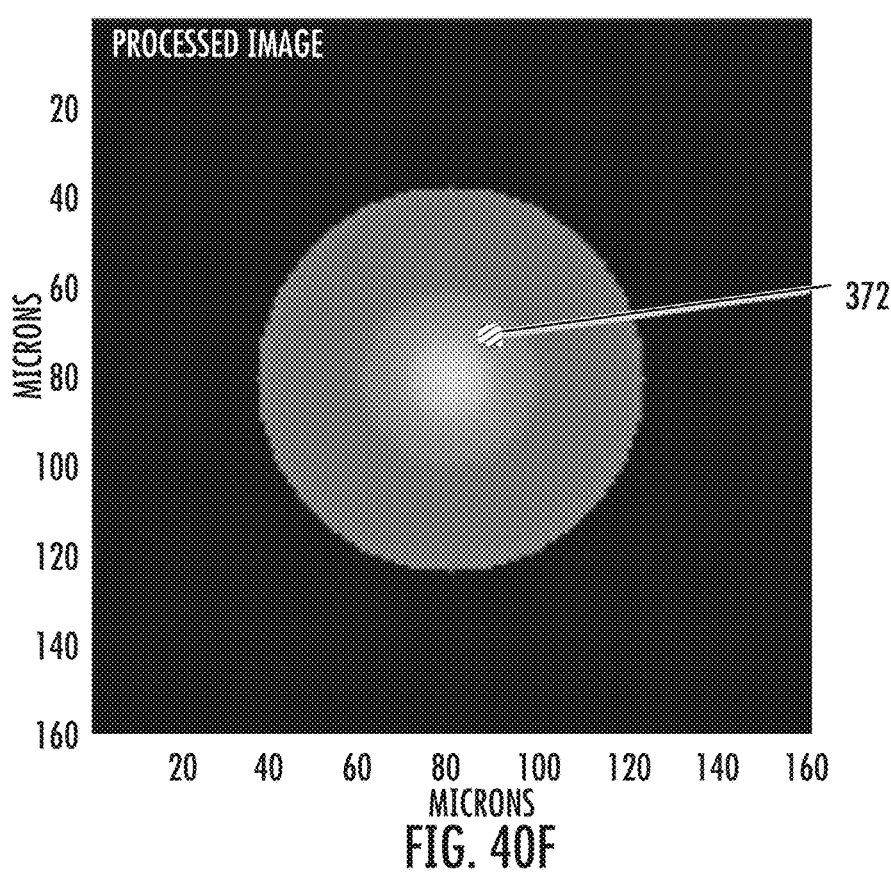

One implementation of the ninth routine may be understood with reference to FIGS. 40A-40F and FIGS. 41A-41F. FIG. 40A is a masked digital microscope image of an end portion of an LC-type single fiber connector centered following masking to eliminate imaging of the ferrule (only an optical fiber 371 appears in the image). A 2D extrapolation is performed in the masked regions to avoid kernel padding bias errors. Thereafter, for a user-defined range of kernel sizes (e.g., pixel groups of 3×3 and 5×5, etc.), a number of 2D ensemble and median averaging steps are performed to remove the inherent image structure, remove uneven illumination, and improve the contrast signal of contamination. FIGS. 40B and 40C show the results of 2D ensemble averaging of the image of FIG. 40A for kernel sizes of 3×3 and 5×5, respectively, with a color scale of [0.9 1.1]. FIGS. 40D and 40E show the results of 2D median averaging of the image of FIG. 40A for kernel sizes of 3×3 and 5×5, respectively, with a color scale of [0.9 1.1]. After each normalization, a universal threshold value can be applied across the entire image to identify contaminants. For each contaminant, a boundary closing an infill procedure is performed. The results from each normalization procedure are summed before final boundary closing and infill procedures. FIG. 40F is a processed image showing presence of a contaminant 372 in a core of the optical fiber.

Figure 41A:
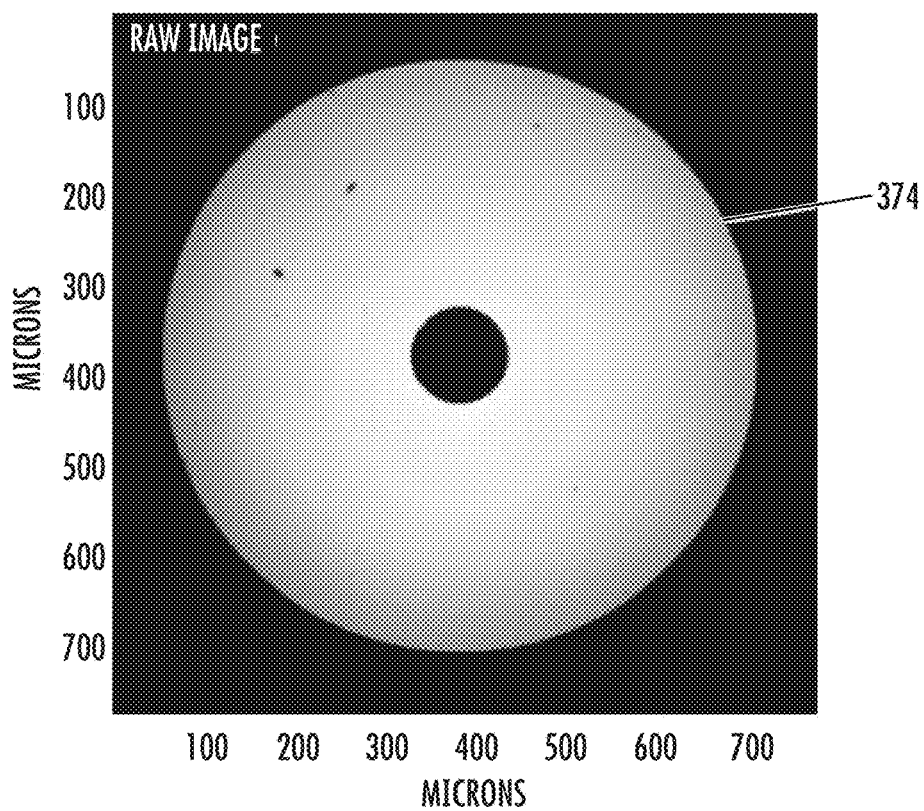
FIG. 41A is a masked digital microscope image of an end portion of an LC single fiber connector including only an annular ferrule region, following masking to eliminate any image contents in the fiber region surrounded by the ferrule.
Figure 41B:
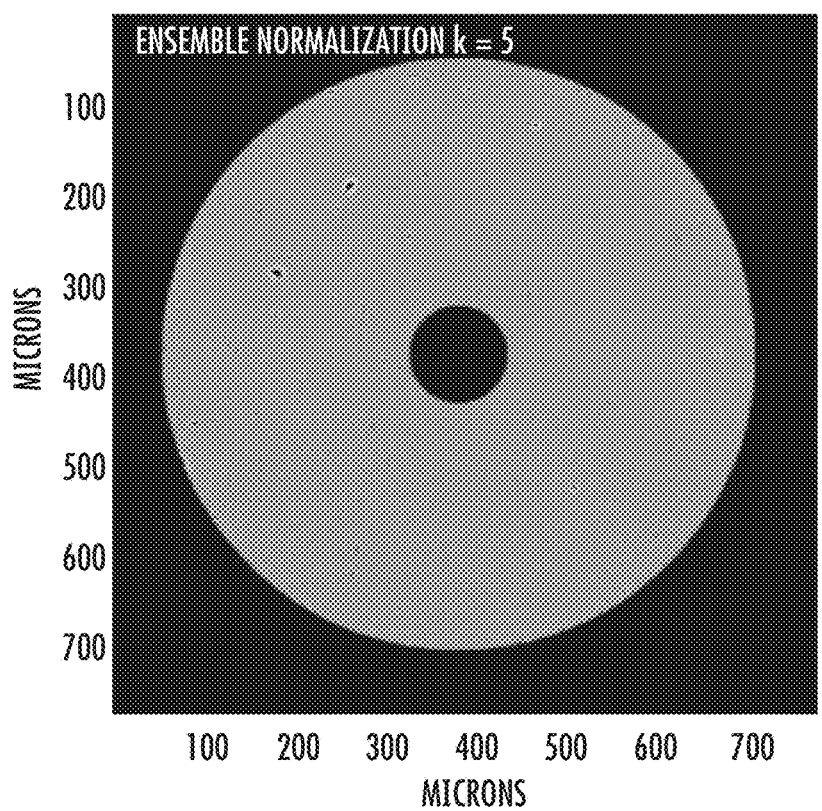
FIGS. 41B-41F provide images derived from the image of FIG. 41A, upon execution of steps of a method for identifying contamination on the annular ferrule region shown in FIG. 41A.
Figure 41C:
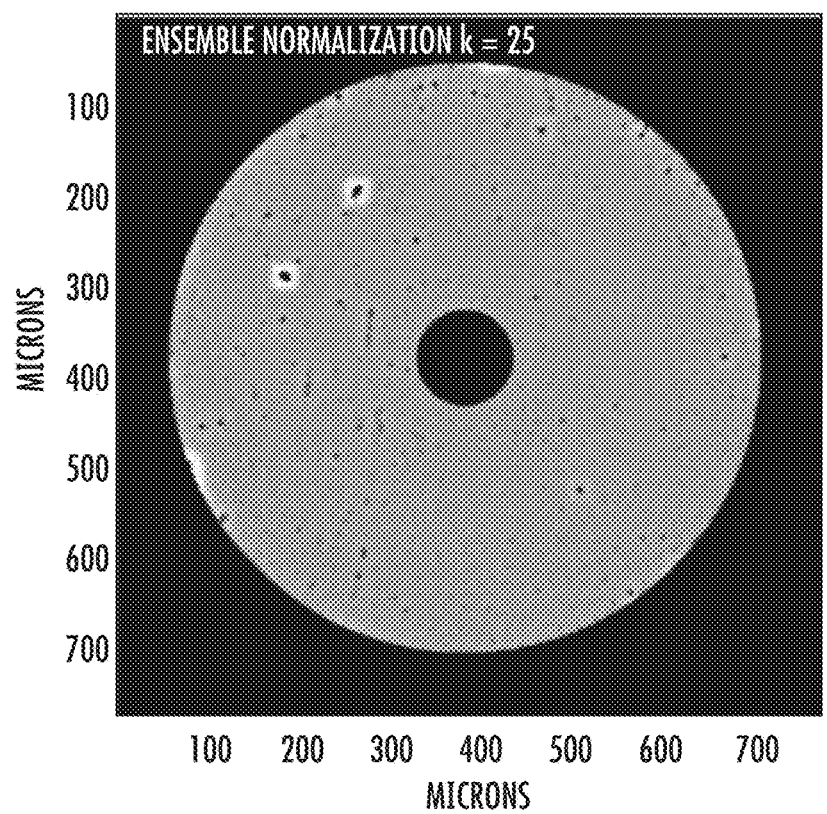
Figure 41D:
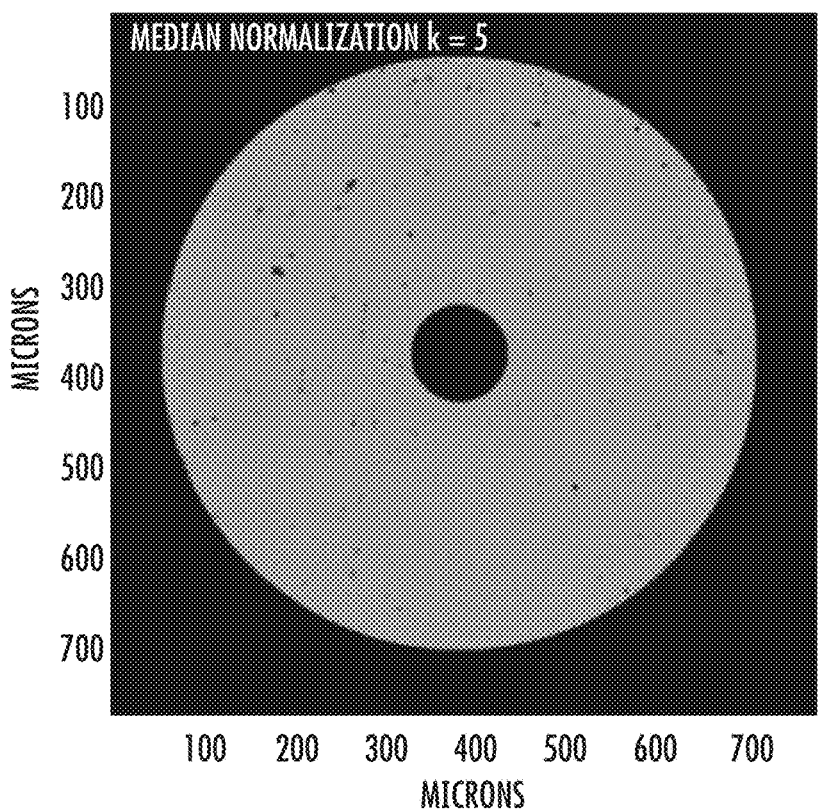
Figure 41E:
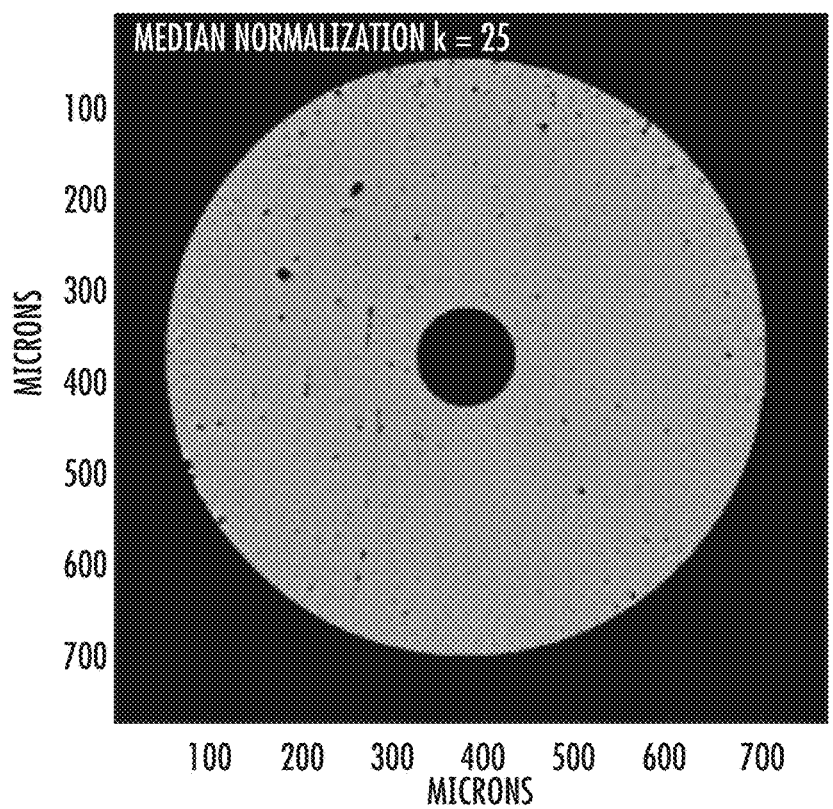
Figure 41F:
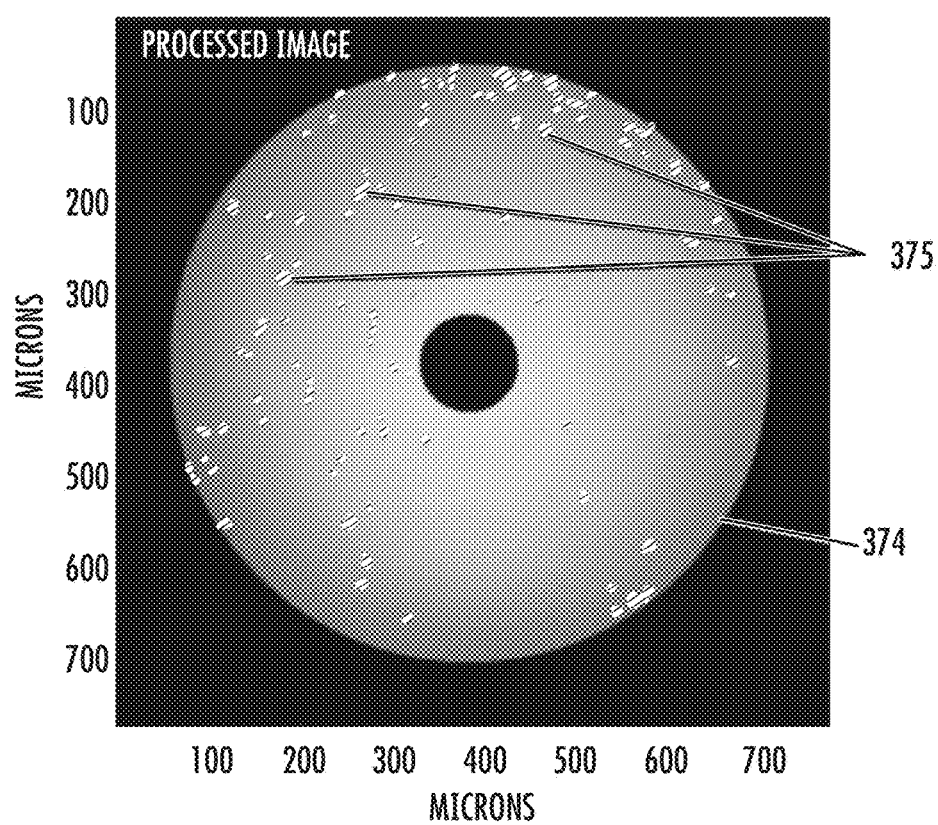

FIG. 41A is a masked digital microscope image of an end portion of an LC-type single fiber connector following masking to eliminate imaging of the optical fiber 371 (FIG. 40A) such that the image only shows a ferrule 374. A 2D extrapolation is performed in the masked regions to avoid kernel padding bias errors. Thereafter, for a user-defined range of kernel sizes (e.g., pixel groups of 5×5 to 25×25, or any subsets thereof), a number of 2D ensemble and median averaging steps are performed to remove the inherent image structure, remove uneven illumination, and improve the contrast signal of contamination. FIGS. 41B and 41C show the results of 2D ensemble averaging of the ferrule image of FIG. 41A for kernel sizes of 3×3 and 25×25, respectively, with a color scale of [0.9 1.1]. FIGS. 41D and 41E show the results of 2D median averaging of the image of FIG. 41A for kernel sizes of 3×3 and 25×25, respectively, with a color scale of [0.9 1.1]. After each normalization, a universal threshold value can be applied across the entire image to identify contaminants. For each contaminant, a boundary closing an infill procedure is performed. The results from each normalization procedure are summed before final boundary closing and infill procedures. FIG. 41F is a processed image showing presence of various contaminants 375 (depicted with right upwardly-sloping fill) on the ferrule 374.

Ensemble normalization is effective to improve contamination detection for small contaminants over large scales. Median normalization is effective in removing high intensity gradient image structures, thereby allowing contamination identification. When normalization is performed by the ensemble mean, it is very susceptible to gradients, resulting in dark rings for sharp transitions in raw pixel intensity (such as a fiber core/cladding interface). A dark ring has the potential to be identified as a contaminant. Median normalization can beneficially eliminate ring artifacts. Different contaminants respond differently to normalization performed with different kernel sizes. One benefit of using both ensemble and median normalization is that median normalization will not affect pixel black value of a contaminants, whereas ensemble normalization will cause black value of contaminants to be reduced (such that the contaminant will appear progressively darker) for larger kernel sizes. It has been observed that kernel sizes in a range of from 3×3 to 7×7 may be particularly desirable for detecting contaminants on fiber portions of a connector, whereas kernel sizes in a range of from 3×3 to 25×25 may be particularly desirable for detecting contaminants on ferrule portions of a connector.

As noted above, a universal threshold value can be applied across the entire image to identify contaminants after each normalization. It has been observed that contaminants consistently exhibit a pixel values of less than 0.95 after normalization. Thus, any pixel having a value of less than 0.95 is identified as a contaminant. The desired outcome is to drive contaminant pixel intensity to a value of less than 0.95 without introducing false positive contamination results.

The preceding description of FIGS. 40A-40F and FIGS. 41A-41F represents one implementation of the "contamination detection routine 1." In certain embodiments, one or more steps described in connection with FIGS. 40A-40F and FIGS. 41A-41F may be modified or omitted.

Contamination Detection Routine 2

A tenth routine (which may be referred to hereinafter as "contamination detection routine 2" routine) is now introduced, with such routine being useful for identifying contamination on multi-fiber (e.g., MPO-type) connectors. One implementation of the tenth routine may be understood with reference to FIGS. 42A-42D.

Figure 42A:
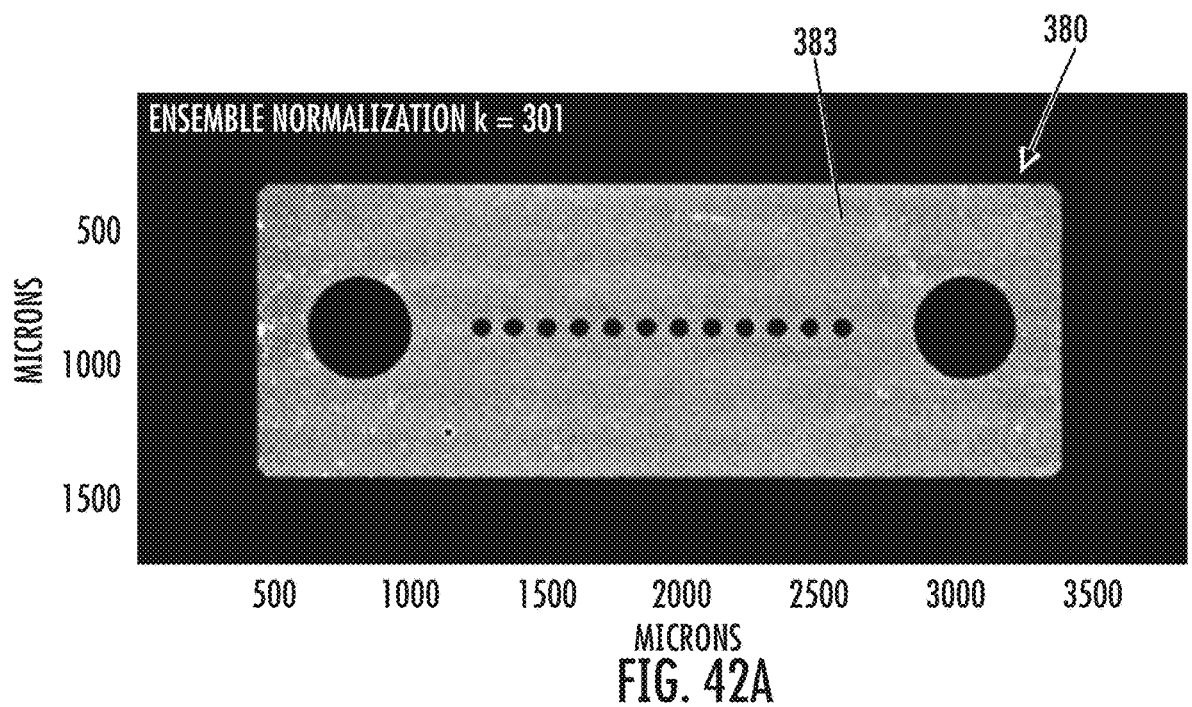
FIG. 42A is a masked, ensemble normalized (k=301) digital microscope image of an end surface of a ferrule of an MPO connector, following masking to eliminate any image contents in pinhole and fiber regions.
Figure 42B:
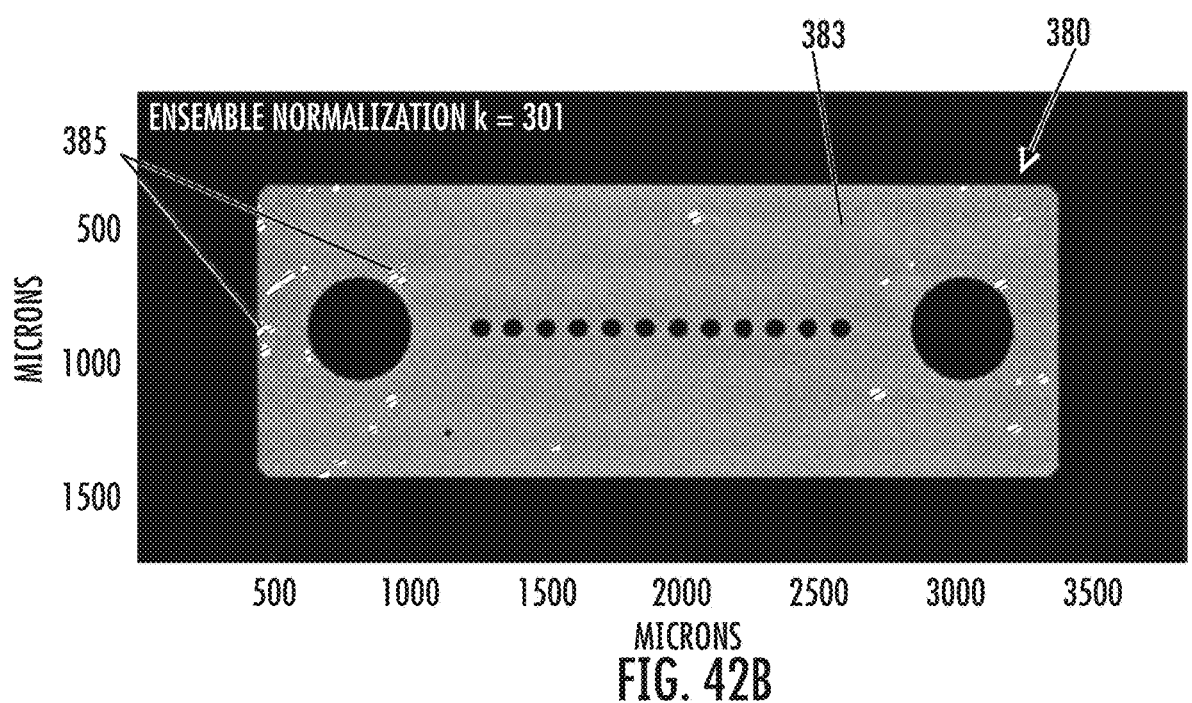
FIG. 42B is an image derived from the image of FIG. 42A, following execution of steps of a method for identifying contamination on the ferrule, with contamination depicted with right upwardly-sloping fill.
Figure 42C:
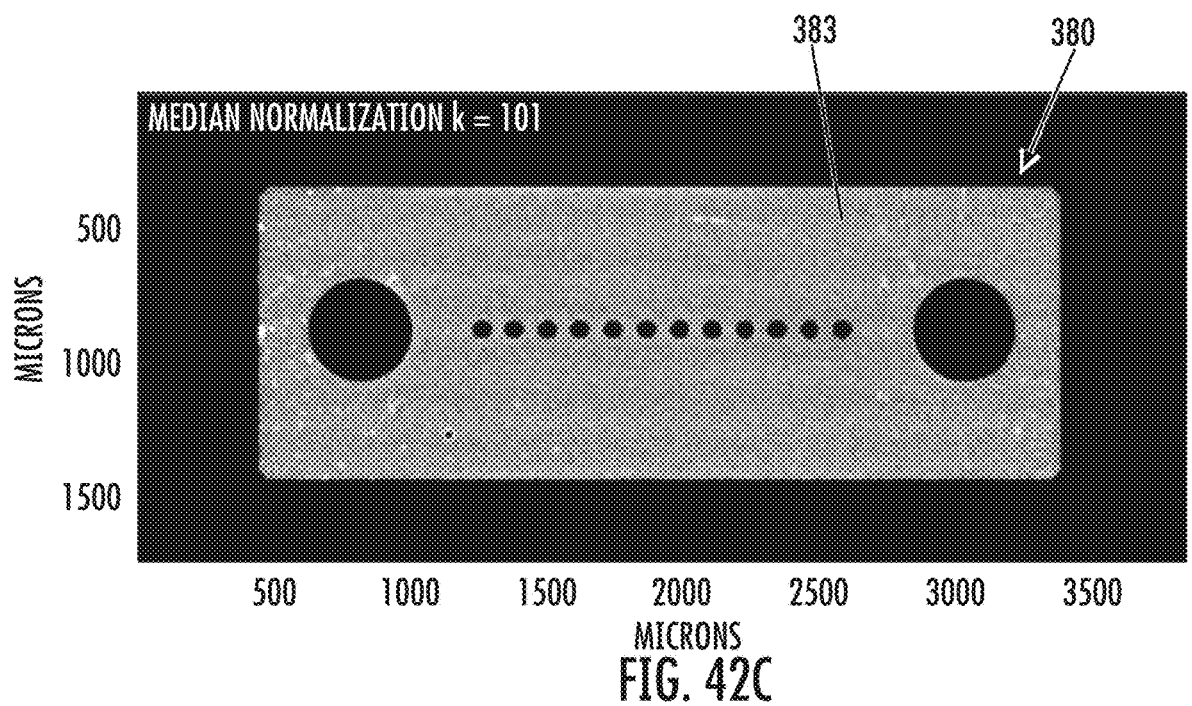
FIG. 42C is a masked, median normalized (k=101) digital microscope image of an end surface of a ferrule an MPO connector (i.e., the same MPO connector shown in FIG. 42A), following masking to eliminate any image contents in pinhole and fiber regions.
Figure 42D:
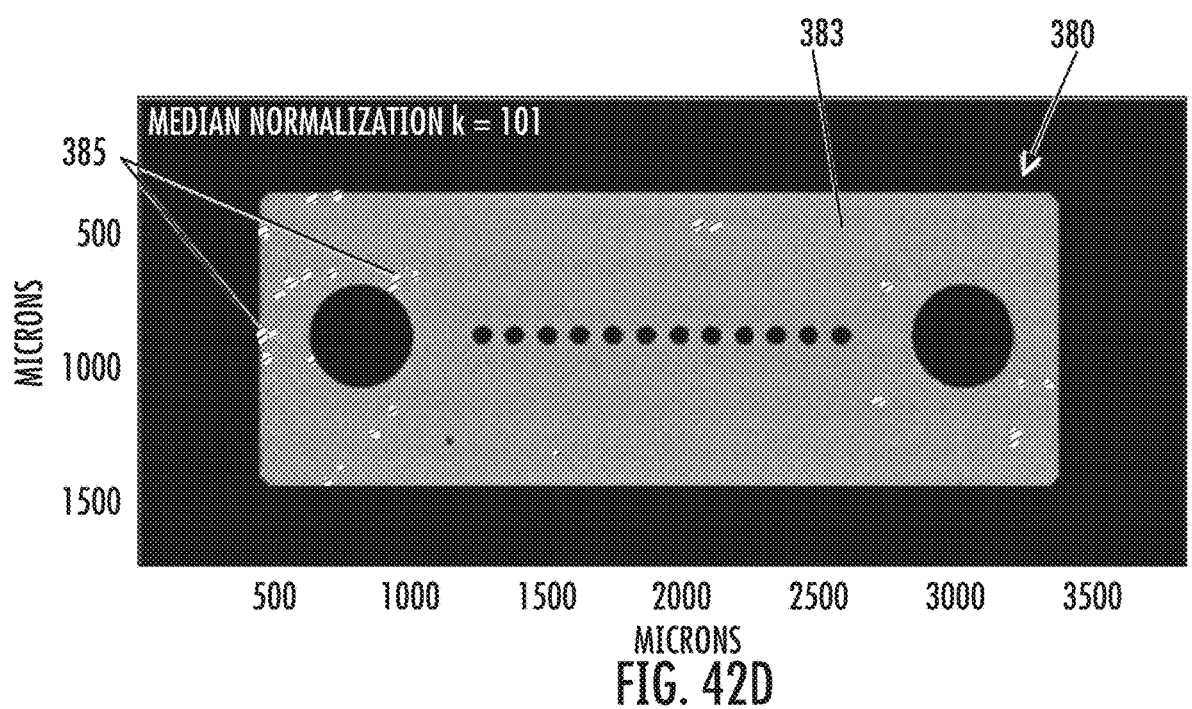
FIG. 42D is an image derived from the image of FIG. 42C, following execution of steps of a method for identifying contamination on the ferrule, with contamination depicted with right upwardly-sloping fill.

Once the pin/pinhole, fibers, and ferrule boundaries have been located it is masked. A 2D extrapolation is performed in the masked regions to avoid kernel padding bias errors. For a user defined range of kernel sizes, a number of ensemble and median normalizations are performed to remove the inherent image structure, remove uneven illumination, and improve the contrast signal of contamination. FIG. 42A is a masked, ensemble normalized (k=301) digital microscope image of an end surface of a ferrule 383 of an MPO connector 380, following masking to eliminate any image contents in pinhole and fiber regions, with a color scale of [0.9 1.1]. FIG. 43A is a masked, ensemble normalized (k=501) digital microscope image of the end surface of the ferrule 383 of an MPO connector 380, following masking to eliminate any image contents in pinhole and fiber regions, with a color scale of [0.9 1.1]. After each normalization a universal threshold value can be applied across the entire image to identify contaminants. For each contaminant a boundary closing and infill procedure is performed. The results from each normalization procedure are summed before final boundary closing and infill procedures. FIG. 42B is a processed image showing presence of various contaminants 385 (depicted with right upwardly-sloping fill) on the surface of the ferrule 383 of the connector 380. Similarly, FIG. 43B is a processed image showing presence of various contaminants 385 (depicted with right upwardly-sloping fill) on the surface of the ferrule 383 of the connector 380.

Generic Contamination Detection Routine

Having described both the "contamination detection routine 1" and "contamination detection routine 2," an eleventh routine (which may be referred to hereinafter as "generic contamination detection routine") is now introduced, with broad aspects of such routine being generic to and encompassing both of the preceding "contamination detection routine 1" and "contamination detection routine 2."

The "generic contamination detection routine" is useful for identifying contaminants from a digital image of an end of an optical fiber connector in which one or more optical fibers is/are surrounded by a ferrule, with each of the one or more optical fibers comprising a respective fiber core and an associated fiber cladding. According to such a routine, one step includes, for each kernel size of a plurality of different kernel sizes, performing two-dimensional ensemble averaging and utilizing a result of the two-dimensional ensemble averaging to normalize the digital image to yield an ensemble normalized image. Another step includes, for each kernel size of the plurality of different kernel sizes, performing two-dimensional median averaging and utilizing a result of the two-dimensional median averaging to normalize the digital image to yield a median normalized image. A further step includes applying a first universal threshold value across each ensemble normalized image to generate a thresholded ensemble normalized image with a binary representation of contaminants relative to areas devoid of contaminants. Yet another step includes applying a second universal threshold value across each median normalized image to generate a thresholded median normalized image with a binary representation of contaminants relative to areas devoid of contaminants. Still another step includes, for each kernel size of the plurality of different kernel sizes, summing the binary representation of contaminants of the thresholded ensemble normalized image and the binary representation of contaminants of the thresholded median normalized image to yield a contamination probability image including a summation of contamination probability. A further step includes, for each kernel size of the plurality of different kernel sizes, closing boundaries of any continuous contaminant areas that are present in the contamination probability image adjacent to inter-regional edges and/or external edges of the optical fiber connector, and filling any continuous contaminant areas that are present in the contamination probability image. The term "inter-regional edges" refers to the boundary between the fiber core and associated fiber cladding of each of one or more optical fibers, or the boundary between the fiber cladding of each of the one or more optical fibers and the surrounding ferrule. A further step involves identifying at least one of (i) number of closed and filled continuous contaminant areas, (ii) location of each closed and filled continuous contaminant area, and (iii) size of each closed and filled continuous contaminant area, present in the summed threshold normalized image of any one or more kernel sizes of the plurality of different kernel sizes.

In certain embodiments, the first universal threshold value (used for generating the ensemble normalized image) equals the second universal threshold value (used for generating the median ensemble normalized image). In certain embodiments, the plurality of kernel sizes include kernel sizes within a range (but not necessarily encompassing the entire range) of from 3 pixels by 3 pixels to 25 pixels by 25 pixels.

In certain embodiments, a further step of the "generic contamination detection routine" includes extracting at least one subregion image encompassing the one or more optical fibers (i.e., masking the at least one subregion image) from an initial digital image to generate the digital image prior to said performing of the ensemble normalization and the median normalization.

In certain embodiments, further steps of the "generic contamination detection routine" include (a) defining a first mask image representing a portion of an initial digital image that encompasses the one or more optical fibers (including the fiber core and associated fiber cladding); and (b) removing the first mask image from the initial digital image to generate the digital image prior to said performing of the ensemble normalization and the median normalization, to enable detection of contaminants on the end of the optical fiber connector in regions non-coincident with the first mask image. In certain embodiments, further steps of the "generic contamination detection routine" include (c) defining a second mask image representing a portion of an initial digital image that encompasses an end surface of the ferrule, and that is non-coincident with the one or more optical fibers; and (d) removing the second mask image from the initial digital image to generate the digital image prior to said performing of the ensemble normalization and the median normalization, to enable detection of contaminants on the end of the optical fiber connector in regions non-coincident with the second mask image. The preceding steps are consistent with a sequential masking and detection routine as described hereinafter.

In certain embodiments, the one or more optical fibers consists of a single fiber. In certain embodiments, the one or more optical fibers consists of multiple fibers (e.g., linearly arranged, such as on the end of an MPO-type connector)

In certain embodiments involving a single fiber, at least a portion of an end surface of the ferrule is non-perpendicular to a longitudinal axis of the fiber core of the single fiber (e.g., consistent with an APC polished connector). In certain embodiments, the one or more optical fibers comprises a plurality of fibers having respective ends arranged in a linear pattern on the end of the optical fiber connector, and the end of the optical fiber connector further comprises multiple pins or pinhole features (e.g., consistent with an MPO-type connector).

In certain embodiments, the "generic contamination detection routine" may be combined with steps of "dynamic fiber location routine 1" as described previously herein. For example, in certain embodiments, the "generic contamination detection routine" may include determining a center location of a core of a single fiber. In certain embodiments, determination of the center location of the fiber core includes: generating a first binary image derived from the digital image of the end of the optical fiber; determining a centroid position of the first binary image; extracting a subregion of the digital image substantially centered on the centroid position to generate a subregion image, with the subregion containing the core of the single optical fiber; calculating two dimensional spatial gradient magnitude values of the subregion image to identify high intensity boundaries around (i) the fiber cladding and (ii) any contaminants optionally present on the optical fiber; applying a self-determining threshold from the two dimensional spatial gradient magnitude values to generate a second binary image including rings corresponding to at least some of the high intensity boundaries; filling the rings of the second binary image to yield filled rings; comparing the filled rings to identify a position of the fiber cladding; centering a solid subregion of a new, third binary image to the position of the fiber cladding, wherein the solid subregion is matched in shape to the subregion of the digital image; generating a summation of common nonzero pixel values and corresponding pixel locations, and extracting maximum summation values and corresponding pixel locations; and identifying location of the core of the single fiber from pixel locations corresponding to the maximum summation values. In certain embodiments, the location of the fiber core is identified from a mean of multiple x, y coordinates embodying locations corresponding to the maximum summation values.

In certain embodiments involving a single optical fiber, the "generic contamination detection routine" may be combined with steps of the "dynamic ferrule radius sizing routine" as described previously herein for determining a radius of an outer circular boundary of the ferrule. For example, in certain embodiments, determining the radius of the outer circular boundary of the ferrule comprises: calculating two dimensional spatial gradient magnitude values of the digital image to identify an outer high intensity boundary; extracting a radial profile from the center location of the fiber core to the outer high intensity boundary at each angular interval of a plurality of angular intervals; for each radial profile, identifying a location of maximum two dimensional spatial gradient magnitude, and identifying a distance from said location to the center location to provide an estimated ferrule radius value; statistically filtering the estimated ferrule radius values to exclude all estimated ferrule radius values less than a mean estimated ferrule radius value minus two standard deviations from the mean estimated ferrule radius value, and computing a statistically filtered estimated ferrule radius value; and determining a radius of the ferrule outer circular boundary from a difference between the statistically filtered estimated ferrule radius value and a selected distance if necessary to account for illumination roll-off proximate to the ferrule outer circular boundary. In certain embodiments, the angular intervals may be spaced no more than about 1 degree apart. In certain embodiment, a mask image representing the fiber core and associated fiber cladding may be defined, and such mask image may be removed from the digital image prior to the extraction of radial profiles.

In certain embodiments, the "generic contamination detection routine" may be combined with steps of the "dynamic ferrule boundary determination routine 1" as described previously herein for determining a non-circular, non-concentric ferrule outer boundary (e.g., of an APC polished connector, for which a digital image depicts the outer boundary as being non-circular and non-concentric relative to the center location of the fiber core). In certain embodiments, the determining of the outer boundary of the ferrule comprises: performing ensemble normalization of the digital image to generate an ensemble normalized image; applying a universal threshold value across the ensemble normalized image to generate a binary image of sub-unity value features including an outer high intensity boundary; removing a largest single feature within an interior of the binary image; extracting a radial profile from a fiber core center position to the outer high intensity boundary at each angular interval of a plurality of angular intervals, yielding a plurality of radial profiles for the plurality of angular intervals; for each radial profile, identifying a radius value for a non-zero pixel value farthest from the fiber core center position, yielding a plurality of radius values for the plurality of radial profiles; median filtering the plurality of radius values to remove outlying radius values and to yield median filtered radius values; polynomially fitting x coordinates of the median filtered radius values; polynomially fitting y coordinates of the median filtered radius values; identifying an estimated ferrule outer boundary from corresponding pairs of polynomially fitted x and y coordinates; and reducing a radial distance from each pair of polynomially fitted x and y coordinates to the fiber core center position by a selected value to yield a plurality of pairs of inset fitted x and y coordinates corresponding to coordinates of the ferrule outer boundary to facilitate contaminant detection.

In certain embodiments, the "generic contamination detection routine" may be combined with steps of the "dynamic fiber pattern location routine 1" as described previously herein for determining position of multiple fibers in a linear pattern. For example, in certain embodiments, the end of the optical fiber connector comprises an end surface of a ferrule and multiple optical fibers having respective ends arranged in a linear pattern on the end surface in the digital image, and a method further comprises determining positions of the multiple optical fibers. In certain embodiments, the determining of positions of the multiple optical fibers comprises: smoothing the digital image by at least one of 2D ensemble normalization or 2D median normalization to generate a normalized image in which spurious pixels of the end surface of the ferrule exhibit reduced intensity; applying a threshold value across the normalized image, with the threshold value based on a selected percentage of a maximum pixel intensity value to identify a plurality of proposed fiber masks; calculating centroid x, y coordinates of each proposed fiber mask of the plurality of proposed fiber masks, identifying median difference values for centroid x coordinates of the plurality of proposed fiber masks, and identifying median difference values for centroid y coordinates of the plurality of proposed fiber masks; comparing a difference of centroid x and y coordinate values between adjacent proposed fiber masks to the median difference values for centroid x coordinates and centroid y coordinates, and responsive to such comparison: (i) removing any pairs of adjacent fiber masks of the plurality of proposed fiber masks embodying differences between centroid x and y coordinate values greater than a specified threshold than the median difference values for centroid x coordinates and centroid y coordinates, and (ii) spatially validating any other adjacent fiber masks of the plurality of proposed fiber masks embodying differences between centroid x and y coordinate values within a specified threshold of the median difference values for centroid x coordinates and centroid y coordinates to yield spatially validated fiber masks; and for any removed pairs of adjacent fiber masks that lie between spatially validated fiber masks, linearly interpolating positions of replacement fiber masks using the median difference values for centroid x coordinates and centroid y coordinates. In certain embodiments, the preceding method further includes extrapolating potential fiber mask positions arranged beyond two outermost spatially validated masks by applying interrogation regions to the digital image, comparing standard deviation of pixel values within the interrogation regions to at least one equally sized region positioned around at least one spatially validated fiber mask, and using the standard deviation comparison to validate or invalidate one or more potential fiber mask positions arranged beyond the two outermost spatially validated masks.

In certain embodiments, the "generic contamination detection routine" may be combined with steps of the "dynamic fiber location routine 2" as described previously herein for dynamically determining position of fibers among multiple fibers having respective ends arranged in a linear array on an end surface of a ferrule. For example, in certain embodiments, a center position of an individual optical fiber of the multiple optical fibers is determined. In certain embodiments, the determining of a center position of an individual optical fiber of the multiple optical fibers comprises: extracting a subregion of the digital image to generate a subregion image containing the individual optical fiber; performing ensemble normalization of the digital image to generate an ensemble normalized image; applying a universal threshold value across the ensemble normalized image to generate a binary image of sub-unity value features embodying a first fiber mask including multiple pixels each having x and y coordinates; for each pixel of the first fiber mask, investigating overlap with the first fiber mask by generating a circular binary mask centered on the pixel being investigated and tabulating a summation of nonzero pixel values in common with the first fiber mask as well as x and y coordinate values of the pixel being investigated; and identifying center coordinates for a fiber core of the individual optical fiber as either (i) x and y coordinates for a single pixel being investigated embodying a maximum summation value or (ii) mean x and y coordinates for multiple pixels being investigated embodying equal maximum summation values.

In certain embodiments, the "generic contamination detection routine" may be combined with steps of the "dynamic pin/pinhole location routine" as described previously herein for dynamically locating and masking pinholes. For example, in certain embodiments, location of pins or pinhole features included on the end surface of the ferrule may be determined. In certain embodiments, the determination of location of the pins or pinhole features comprises: applying a universal threshold value across the digital image to generate a binary image of sub-unity value features; checking size and eccentricity of sub-unity value features to identify preliminary pin or pinhole feature masks each having perimeter pixel coordinates; filling any voids in the preliminary pin or pinhole feature masks by horizontal and vertical interpolation to form interpolated pin or pinhole feature masks; for each interpolated pin or pinhole feature mask, calculating radial distances from each pixel of multiple pixels within the interpolated pin or pinhole feature mask to perimeter pixels of the interpolated pin or pinhole feature mask, comparing the radial distances to a median radial distance to the perimeter pixels for the multiple pixels, and validating pixels having corresponding radial distances within a specified distance of the median radial distance; and for each interpolated pin or pinhole feature mask, selecting a validated pixel corresponding to a maximum number of validated radial distances within a specified distance of the median radial distance as a center of the pin or pinhole feature. In certain embodiments, the digital image is an ensemble normalized digital image derived from an image of at least a portion of the end of the fiber optic connector. In certain embodiments, the specified distance is within a range of 5 pixels or 5 microns of the median radial distance. In certain embodiments, a method further comprises, for each interpolated pin or pinhole feature mask, generating a final pin or pinhole feature mask utilizing the center of the pin or pinhole feature and utilizing the median radial distance.

In certain embodiments, the "generic contamination detection routine" may be combined with steps of the "dynamic ferrule boundary determination routine 2" as described previously herein for dynamically locating ferrule boundaries of a multi-fiber (e.g., MPO-type) connector. For example, in certain embodiments, boundaries of the ferrule are determined, according to steps comprising: generating a first cropped image from the digital image, with the first cropped image being cropped along two edges thereof in a direction perpendicular to the linear pattern, wherein cropping locations of the first cropped image are determined from locations of pins or pinhole features on the end surface of the ferrule; for each row of pixels of the cropped image perpendicular to the linear pattern, median filtering pixel intensity values to remove outlying pixel intensity values potentially attributable to contamination and to generate a first median filtered pixel intensity profile, followed by calculating gradient magnitude values of the first median filtered pixel intensity profile to generate a first gradient profile, and selecting minimum and maximum values from the first gradient profile to identify a first pair of opposing edges, respectively, of the ferrule; generating a second cropped image from the digital image, with the second cropped image being cropped along two edges thereof in a direction parallel to the linear pattern, wherein cropping locations of the second cropped image are determined from locations of pins or pinhole features on the end surface of the ferrule; and for each row of pixels of the cropped image parallel to the linear pattern, median filtering pixel intensity values to remove outlying pixel intensity values potentially attributable to contamination and to generate a second median filtered pixel intensity profile, followed by calculating gradient magnitude values of the second median filtered pixel intensity profile to generate a second gradient profile, and selecting minimum and maximum values from the second gradient profile to identify a second pair of opposing edges, respectively, of the ferrule; wherein the first pair of opposing edges and the second pair of opposing edges corresponding to lateral boundaries of the ferrule. Certain embodiments further include a step of adding corner features of the ferrule at or proximate to extrapolated intersections between respective edges of the first pair of opposing edges and the second pair of opposing edges.

Sequential Masking and Detection Routine

A twelfth routine (which may be referred to hereinafter as "sequential masking and detection routine") is now introduced, with such routine being useful for identifying contaminants from a digital image of an end of an optical fiber connector in which one or more optical fibers is/are surrounded by a ferrule, with each of the one or more optical fibers having a respective fiber core and associated fiber cladding. One step includes defining a first mask image representing a first portion of the end of the optical fiber connector. Another step includes detecting contaminants in at least one first region of the digital image, wherein the at least one first region is non-coincident with the first mask image. Yet another step includes defining a second mask image representing a second portion of the end of the optical fiber connector. A further step includes detecting contaminants in at least one second region of the digital image, wherein the at least one second region is non-coincident with the second mask image.

Sequential masking and detection permits detection of contaminants in a first region non-coincident (e.g., non-overlapping) with a first mask image, and in a second region non-coincident with a second mask image. Such sequential masking and detection may be desirable, for example, when a first step or group of image processing steps may be particularly suitable for (e.g., to discern contaminants on) one portion of a connector (e.g., a ferrule portion), and when a second step or group of image processing steps may be particularly suitable for a different portion of a connector (e.g., a fiber portion, or a pin/pinhole portion).

In certain embodiments, after sequential masking and detection, detected contaminants present in different regions of a digital image may be combined in a single image and/or record (e.g., data set).

In certain embodiments of the sequential masking and detection routine, the first mask image encompasses the one or more optical fibers (including fiber core(s) and associated cladding), and the second mask image corresponds to the ferrule. In this manner, techniques optimized for detecting contaminants on the fiber core and/or fiber cladding need not be applied to the ferrule of an optical fiber connector, and vice-versa. In certain embodiments, an optical fiber connector further includes pins or pinhole features, and the first mask image additionally encompasses the pins or pinhole features.

In certain embodiments, the sequential masking and detection routine further includes establishing at least one point of reference on the end of the optical fiber connector, and utilizing the at least one point of reference in at least one of defining the first mask image or defining the second mask image. In certain embodiments, the at least one point of reference may include a center location of the fiber core of the one or more optical fibers, or an outer boundary of the ferrule, or (if pins or pinhole features are provided) a center location of at least one pin or pinhole feature of the optical connector.

In certain embodiments, the sequential masking and detection routine further includes processing the digital image to extract the first mask image or the second mask image, wherein following said processing, said detecting of contaminants in the at least one first region or the at least one second region includes numerous steps. A first step includes, for each kernel size of a plurality of different kernel sizes, performing two-dimensional ensemble averaging and utilizing a result of the two-dimensional ensemble averaging to normalize the digital image to yield an ensemble normalized image. A second step includes, for each kernel size of the plurality of different kernel sizes, performing two-dimensional median averaging and utilizing a result of the two-dimensional median averaging to normalize the digital image to yield an median normalized image. A third step includes applying a first universal threshold value across each ensemble normalized image to generate a thresholded ensemble normalized image with a binary representation of contaminants relative to areas devoid of contaminants. A fourth step includes applying a second universal threshold value across each median normalized image to generate a thresholded median normalized image with a binary representation of contaminants relative to areas devoid of contaminants. A fifth step includes, for each kernel size of the plurality of different kernel sizes, summing the binary representation of contaminants of the thresholded ensemble normalized image and the binary representation of contaminants of the thresholded median normalized image to yield an contamination probability image including a summation of contamination probability. A sixth step includes, for each kernel size of the plurality of different kernel sizes, closing boundaries of any continuous contaminant areas that are present in the contamination probability image adjacent to inter-regional edges and/or external edges of the end of the optical fiber connector, and filling any continuous contaminant areas that are present in the contamination probability image. A seventh step includes identifying at least one of (i) number of closed and filled continuous contaminant areas, (ii) location of each closed and filled continuous contaminant area, and (iii) size of each closed and filled continuous contaminant area, present in the summed threshold normalized image of any one or more kernel sizes of the plurality of different kernel sizes.

In certain embodiments, multiple kernel sizes within a range of from 3 pixels by 3 pixels to 25 pixels by 25 pixels (or any desirable subrange thereof) may be used.

Software Implementing Multiple Routines and/or Routines of Method Steps

It is to be recognized that routines and/or routines of method steps disclosed herein may be employed sequentially and/or in parallel in various combinations and permutations. Any routines or method steps disclosed herein are contemplated for use with any one or more other routines or method steps, unless specifically indicated to the contrary. FIGS. 43-48 specify combinations according to certain embodiments, but are not intended to embody an exhaustive list of potential or contemplated combinations and permutations of routines and/or routines of method steps disclosed herein.

Figure 43:
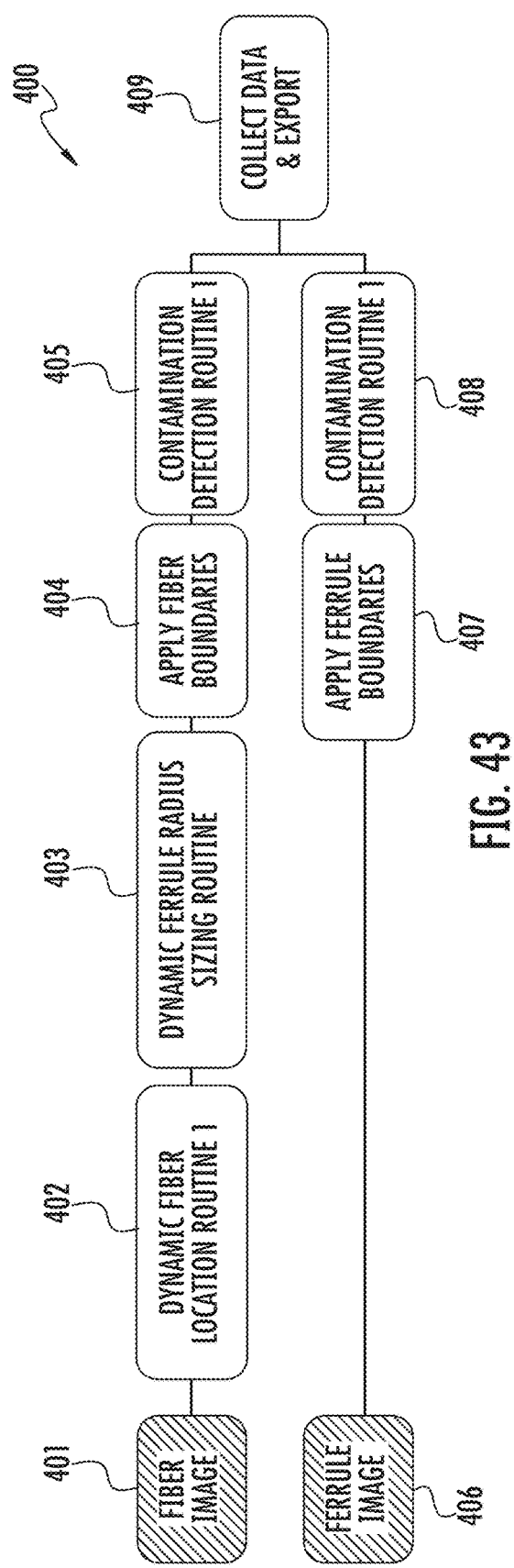
FIG. 43 is a flow diagram identifying routines or routines used in a software-implemented multi-step method for identifying contamination on fiber and ferrule portions of an end of a single fiber (e.g., LC) connector, incorporating a dynamic ferrule radius sizing routine.

FIG. 43 is a flow diagram identifying routines or routines used in a software-implemented multi-step method 400 for identifying contamination on fiber and ferrule portions of an end of a single fiber (e.g., LC) connector, incorporating a dynamic ferrule radius sizing routine 403, and termed "Software 1." As shown, steps 401 and 406 include capturing or recording fiber and ferrule images, respectively, wherein two images are recorded per sample and the exposure time is tailored for either the fiber or ferrule region. Utilizing the fiber image, further steps include the dynamic fiber location routine 402 and the dynamic ferrule sizing routine 403, followed by application of fiber boundaries 404 and the "contamination detection 1" routine (or the "generic contamination detection routine" disclosed herein). Utilizing the ferule image, further steps include applying ferrule boundaries and the "contamination detection 1" routine. Thereafter, a further step 409 includes collecting and exporting data derived from both the fiber image and the ferrule image.

Figure 44:
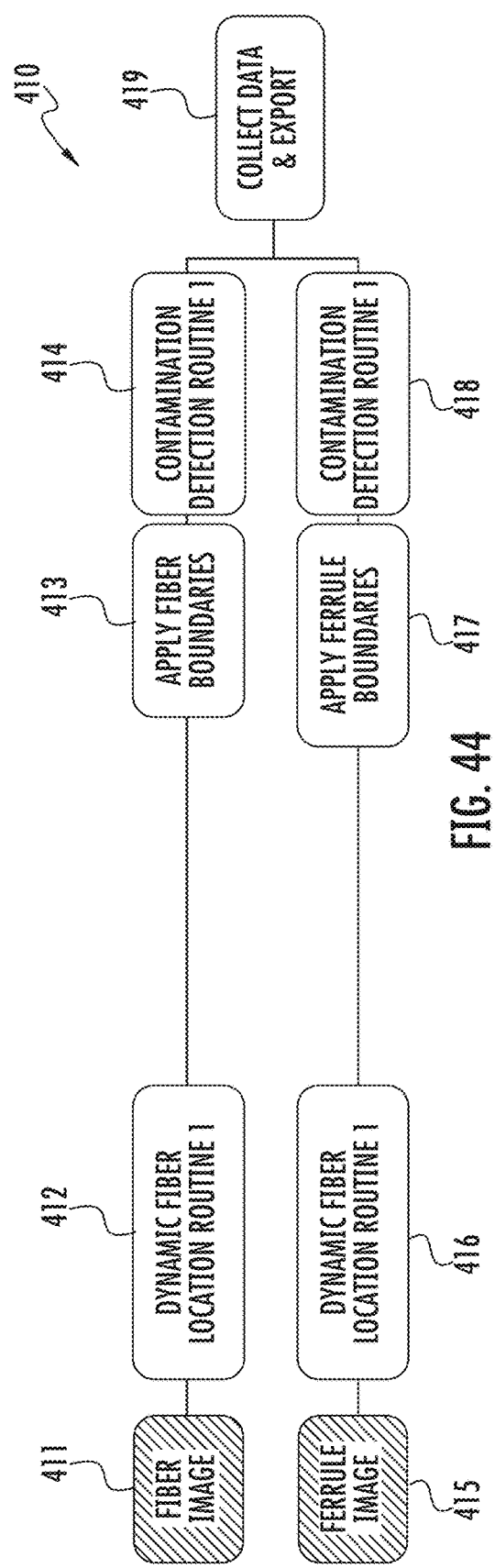
FIG. 44 is a flow diagram identifying routines or routines used in a software-implemented multi-step method for identifying contamination on fiber and ferrule portions of an end of a single fiber (e.g., LC) connector, without dynamic ferrule radius sizing.

FIG. 44 is a flow diagram identifying routines or routines used in a software-implemented multi-step method 410 for identifying contamination on fiber and ferrule portions of an end of a single fiber (e.g., LC) connector, without dynamic ferrule radius sizing, and termed "Software 2." As shown, steps 411 and 415 include capturing or recording fiber and ferrule images, respectively, wherein two images are recorded per sample and the exposure time is tailored for either the fiber or ferrule region. Utilizing the fiber image, further steps include the dynamic fiber location routine 412, followed by application of fiber boundaries 414 and the "contamination detection 1" routine (or the "generic contamination detection routine" disclosed herein). Utilizing the ferule image, further steps include applying ferrule boundaries 407 and the "contamination detection 1" routine 408. Thereafter, a further step 419 includes collecting and exporting data derived from both the fiber image and the ferrule image FIG. 45 is a flow diagram identifying routines or routines used in a software-implemented multi-step method 420 for identifying contamination on an end of angled physical contact single fiber (e.g., LC-APC or SC-APC) connector, incorporating a dynamic ferrule boundary determination routine 423, and termed "Software 3". As shown, steps 421 and 426 include capturing or recording fiber and ferrule images, respectively, wherein two images are recorded per sample and the exposure time is tailored for either the fiber or ferrule region. Utilizing the fiber image, further steps include the dynamic fiber location routine 423, followed by application of fiber boundaries 424 and the contamination detection 1 routine (or "the generic contamination detection routine" disclosed herein). Utilizing the ferule image, further steps include applying ferrule boundaries 427 and the "contamination detection 1" routine 428. Thereafter, a further step 429 includes collecting and exporting data derived from both the fiber image and the ferrule image FIG. 46 is a flow diagram identifying routines or routines used in a software-implemented multi-step method 430 for identifying contaminants only on fiber portions of an end of a multi-fiber (e.g., MPO) connector, and termed "Software 4." As shown, step 431 includes capturing or recording a raw image, followed by utilization of the "dynamic fiber location routine 1" 432, and sequential performance (for instances 1 to 12) of steps 433 to 435. Step 433 involves use of the "dynamic fiber location routine 2," followed by steps of application of fiber boundaries 434 and the "contamination detection 1" routine 435 (or the generic contamination detection routine disclosed herein). Thereafter, a further step 436 includes collecting and exporting data derived from both the fiber image and the ferrule image FIG. 47 is a flow diagram identifying routines or routines used in a software-implemented multi-step method 440 for identifying contaminants only on a ferrule surface of an end of a female multi-fiber (e.g., MPO) connector, and termed "Software 5." Step 441 involves capturing or recording a raw image, followed by utilization of the "dynamic pin/pinhole location routine 442 and utilization of the dynamic fiber pattern location routine 2. Thereafter, the image is rotated at step 444, and the "dynamic ferrule boundary determination routine 2" is employed at step 445. Following performance of the "contamination detection 2" step 446, a further step 447 includes collecting and exporting data derived from both the fiber image and the ferrule image.

FIG. 48 is a flow diagram identifying routines or routines used in a software-implemented multi-step method 450 for identifying contaminants only on a ferrule surface of an end of a male multi-fiber (e.g., MPO) connector, and termed "Software 6." Step 451 involves capturing or recording a raw image, followed by utilization of the "dynamic fiber pattern location routine 2" 452 and utilization of the "dynamic pin/pinhole location routine" 453. Thereafter, the image is rotated at step 454, and the "dynamic ferrule boundary determination routine 2" is employed at step 455. Following performance of the "contamination detection 2" step 456, a further step 457 includes collecting and exporting data derived from both the fiber image and the ferrule image.

Any of the preceding routines or method steps may be omitted, replaced, or supplemented within the scope of the present disclosure.

Systems for Image Processing and Contaminant Detection

FIG. 49 is a schematic diagram of a generalized representation of a computing system 1000 that may be used to execute methods disclosed herein for processing digital microscopy images of ends of optical fiber connectors for detection of contaminants. The computer system 1000 is configured to execute instructions from a computer-readable medium to perform these and/or any of the functions or processing steps described herein.

The computer system 1000 may be connected (e.g., networked) to other machines in a local area network, an intranet, an extranet, or the Internet. The computer system 1000 may be implemented in a circuit or circuits included in an electronic board or card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 1000 in this embodiment includes a processing device or processor 1002, a main memory 1004 (e.g., read-only memory (ROM), flash memory, dynamic random access memory (DRAM), such as synchronous DRAM (SDRAM), etc.), and a static memory 1006 (e.g., flash memory, static random access memory (SRAM), etc.), which may communicate with each other via a data bus 1008. Alternatively, the processing device 1002 may be connected to the main memory 1004 and/or static memory 1006 directly or via some other connectivity means. The processing device 1002 may be a controller, and the main memory 1004 or static memory 1006 may be any type of memory. While only a single processing device 1002 is illustrated, the term "device" shall also be taken to include any collection of devices that individually or jointly execute a set (or multiple sets) of instructions to perform any one or more of the methodologies discussed herein.

The processing device 1002 represents one or more general-purpose processing devices, such as a microprocessor, central processing unit, or the like. More particularly, the processing device 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1002 is configured to execute processing logic in instructions for performing the operations and steps discussed herein.

The computer system 1000 may further include a network interface device 1010. The computer system 1000 also may include an input 1012 (e.g., an alphanumeric input device such as a keyboard, and/or a cursor control device such as a mouse or pointer), configured to receive input and selections to be communicated to the computer system 1000 when executing instructions. The computer system 1000 also may include an output 1014, including but not limited to a video display unit, an output data storage medium, a printer, or the like.

The computer system 1000 may include a data storage device that includes instructions 1016 stored in a computer readable medium 1018. The instructions 1016 may also reside, completely or at least partially, within the main memory 1004 and/or within the processing device 1002 during execution thereof by the computer system 1000, with the main memory 1004 and the processing device 1002 also constituting computer readable medium. The instructions 1016 may further be transmitted or received over a network 1011 via the network interface device 1010.

While the computer readable medium 1018 is shown in an embodiment to be a single medium, the term "computer-readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding, or carrying a set of instructions for execution by the processing device and that cause the processing device to perform any one or more of the methodologies of the embodiments disclosed herein. The term "computer readable medium" shall accordingly be taken to include, but not be limited to, solid-state memories, optical media, and magnetic media.

Certain embodiments of the present disclosure are directed to a non-transitory computer readable medium containing program instructions for causing a processor to perform a method including any set of steps disclosed herein.

FIG. 50 is a simplified schematic side view of a digital microscope system 1020 suitable for capturing digital images of an end of a fiber optic connector 1026. The digital microscope system 1020 includes a CCD camera 1022 together with a microscope and light source 1024 that are arranged over a connector holder 1028 that supports the fiber optic connector 1026. In use, the microscope and light source 1024 provide a magnified image of the end of the fiber optic connector 1026 to the CCD camera 1022, which serves to capture the image in digital form. A memory (not shown) associated with the CCD camera 1022 stores images captured by the CCD camera 1022. In certain embodiments, the digital microscope system 1020 of FIG. 50 may be operatively linked to the computer system 1000 of FIG. 49, to permit digital microscopy images of an end of the fiber optic connector 1026 to be captured by the CCD camera 1022 and subsequently processed by the computer system 1000 to identify contaminants utilizing routines and/or methods disclosed herein.

Technical benefits realized by aspects of the present disclosure include improved fiber identification, improved fiber pattern identification, dynamic boundary detection, and enhanced contamination detection, boundary identification, and sizing capabilities.

Those skilled in the art will appreciate that other modifications and variations can be made without departing from the spirit or scope of the invention.

Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

What is claimed is:

1. A method for identifying contaminants from a digital image of an end of an optical fiber connector in which one or more optical fibers is surrounded by a ferrule, wherein each of the one or more optical fibers includes a respective fiber core and associated fiber cladding, the method comprising:
    defining a first mask image representing a first portion of the end of the optical fiber connector;
    detecting contaminants in at least one first region of the digital image, wherein the at least one first region is non-coincident with the first mask image;
    defining a second mask image representing a second portion of the end of the optical fiber connector; and
    detecting contaminants in at least one second region of the digital image, wherein the at least one second region is non-coincident with the second mask image;
        wherein the first mask image is non-coincident with the second mask image.

2. The method of claim 1, wherein the first mask image encompasses the fiber core and associated fiber cladding of at least one optical fiber of the one or more optical fibers, and the second mask image corresponds to the ferrule.

3. The method of claim 2, wherein the optical fiber connector further comprises a plurality of pins or pinhole features, and the first mask image additionally encompasses the plurality of pins or pinhole features.

4. The method of any of claim 1, further comprising establishing at least one point of reference on the end of the optical fiber connector, and utilizing the at least one point of reference in at least one of defining the first mask image or defining the second mask image.

5. The method of claim 4, wherein the at least one point of reference comprises a center location of the fiber core of the one or more optical fibers.

6. The method of claim 4, wherein the end of the optical fiber connector further comprises a plurality of pins or pinhole features, and the at least one point of reference comprises a center location of at least one pin or pinhole feature of the plurality of pins or pinhole features.

7. The method of claim 4, wherein the at least one point of reference comprises an outer boundary of the ferrule.

8. The method of claim 1, further comprising processing the digital image to extract the first mask image or the second mask image, wherein following said processing, said detecting of contaminants in the at least one first region or the at least one second region comprises:
    for each kernel size of a plurality of different kernel sizes, performing two-dimensional ensemble averaging and utilizing a result of the two-dimensional ensemble averaging to normalize the digital image to yield an ensemble normalized image;
    for each kernel size of the plurality of different kernel sizes, performing two-dimensional median averaging and utilizing a result of the two-dimensional median averaging to normalize the digital image to yield an median normalized image;
    applying a first universal threshold value across each ensemble normalized image to generate a thresholded ensemble normalized image with a binary representation of contaminants relative to areas devoid of contaminants;
    applying a second universal threshold value across each median normalized image to generate a thresholded median normalized image with a binary representation of contaminants relative to areas devoid of contaminants;
    for each kernel size of the plurality of different kernel sizes, summing the binary representation of contaminants of the thresholded ensemble normalized image and the binary representation of contaminants of the thresholded median normalized image to yield a contamination probability image including a summation of contamination probability;
    for each kernel size of the plurality of different kernel sizes, closing boundaries of any continuous contaminant areas that are present in the contamination probability image adjacent to inter-regional edges and/or external edges of the end of the optical fiber connector, and filling any continuous contaminant areas that are present in the contamination probability image; and
    identifying at least one of (i) number of closed and filled continuous contaminant areas, (ii) location of each closed and filled continuous contaminant area, and (iii) size of each closed and filled continuous contaminant area, present in the summed threshold normalized image of any one or more kernel sizes of the plurality of different kernel sizes.

9. A non-transitory computer readable medium containing program instructions for causing a processor to perform a method according to claim 1.

* * * * *